United States Patent
Yilmaz et al.

(10) Patent No.: US 12,328,781 B2
(45) Date of Patent: Jun. 10, 2025

(54) MASTER NODE, A SECONDARY NODE, A USER EQUIPMENT AND METHODS THEREIN FOR HANDLING OF A SECONDARY CELL GROUP (SCG)

(71) Applicant: Telefonaktiebolaget LM Ericsson (publ), Stockholm (SE)

(72) Inventors: Osman Nuri Can Yilmaz, Espoo (FI); Lian Araujo, Solna (SE); Patrik Rugeland, Stockholm (SE); Oumer Teyeb, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 479 days.

(21) Appl. No.: 17/430,780

(22) PCT Filed: Feb. 13, 2019

(86) PCT No.: PCT/SE2019/050122
§ 371 (c)(1),
(2) Date: Aug. 13, 2021

(87) PCT Pub. No.: WO2020/167170
PCT Pub. Date: Aug. 20, 2020

(65) Prior Publication Data
US 2022/0141904 A1    May 5, 2022

(51) Int. Cl.
*H04W 76/16*    (2018.01)
*H04W 76/19*    (2018.01)
(Continued)

(52) U.S. Cl.
CPC .......... *H04W 76/16* (2018.02); *H04W 76/19* (2018.02); *H04W 76/20* (2018.02); *H04W 76/27* (2018.02)

(58) Field of Classification Search
CPC ..... H04L 5/001; H04L 5/0035; H04L 5/0098; H04W 36/0069; H04W 76/15;
(Continued)

(56) References Cited

U.S. PATENT DOCUMENTS 10,506,658 B2 * 12/2019 Kato ................. H04W 74/0833
10,952,116 B2 *  3/2021 Chen ..................... H04W 76/15
(Continued)

FOREIGN PATENT DOCUMENTS

WO    2018174791 A1    9/2018
WO    2018232124 A1    12/2018

OTHER PUBLICATIONS

3GPP, "3GPP TS 37.340 V15.4.0", 3rd Generation Partnership Project; Technical Specification Group Radio Access Network; Evolved Universal Terrestrial Radio Access (E-UTRA) and NR; Multi-connectivity; Stage 2 (Release 15), Dec. 2018, 1-67.
(Continued)

*Primary Examiner* — Thomas R Cairns
*Assistant Examiner* — Kai Chang
(74) *Attorney, Agent, or Firm* — Weisberg I.P. Law, P.A.

(57) ABSTRACT

A Master Node (MN) 110 and a method therein for handling of a Secondary Cell Group (SCG) for a UE 120 operable in a dual connectivity mode with the MN and a Secondary Node (SN) 111 operating in a network 100. A Master Cell Group (MCG) is 5 associated with the MN and the SCG is associated with the SN. The MN decides to perform a first operation relating to a suspension or a resumption of the SCG independently from a second operation relating to a suspension or a resumption of the MCG. The MN transmits, to the UE, an indication indicating the first operation and indicating the second operation. Further, the MN transmits, to the SN, an indication 10 indicating the first operation relating to the suspension or the resumption of the SCG.

7 Claims, 26 Drawing Sheets

Method in SN 111, 112

(51) Int. Cl.
*H04W 76/20* (2018.01)
*H04W 76/27* (2018.01)

(58) Field of Classification Search
CPC ..... H04W 76/16; H04W 76/19; H04W 76/20; H04W 76/27; H04W 76/34
See application file for complete search history.

(56) References Cited

U.S. PATENT DOCUMENTS

| | | | |
|---|---|---|---|
| 11,310,004 B2* | 4/2022 | Paladugu | H04L 5/001 |
| 2016/0242191 A1* | 8/2016 | Liao | H04W 24/10 |
| 2017/0222876 A1* | 8/2017 | Van Der Velde | H04W 12/041 |
| 2017/0374672 A1* | 12/2017 | Selvaganapathy | H04W 76/15 |
| 2019/0182881 A1* | 6/2019 | Teyeb | H04L 5/001 |
| 2019/0253908 A1* | 8/2019 | Fan | H04W 24/10 |
| 2019/0356536 A1* | 11/2019 | Lee | H04L 41/0654 |
| 2020/0059395 A1* | 2/2020 | Chen | H04W 28/082 |
| 2020/0170069 A1* | 5/2020 | Shih | H04W 76/19 |
| 2020/0245390 A1* | 7/2020 | Ali | H04W 36/00698 |
| 2021/0067409 A1* | 3/2021 | Byun | H04L 41/0813 |
| 2021/0152350 A1* | 5/2021 | Ai | H04W 76/19 |
| 2021/0204355 A1* | 7/2021 | Teyeb | H04L 5/0098 |
| 2021/0274587 A1* | 9/2021 | Jung | H04W 12/0433 |
| 2021/0352750 A1* | 11/2021 | Cheng | H04W 76/27 |
| 2022/0038929 A1* | 2/2022 | Tsuboi | H04W 76/15 |
| 2022/0117027 A1* | 4/2022 | Martinez Tarradell | H04W 76/15 |
| 2022/0132615 A1* | 4/2022 | Sharma | H04W 48/20 |
| 2022/0150739 A1* | 5/2022 | Da Silva | H04W 24/10 |

OTHER PUBLICATIONS

3GPP, "3GPP TS 24.501 V15.2.1", 3rd Generation Partnership Project; Technical Specification Group Core Network and Terminals; Non-Access-Stratum (NAS) protocol for 5G System (5GS); Stage 3 (Release 15), Jan. 2019, 1-455.

3GPP, , "3GPP TS 36.321 V15.4.0", 3rd Generation Partnership Project; Technical Specification Group Radio Access Network; Evolved Universal Terrestrial Radio Access (E-UTRA); Medium Access Control (MAC) protocol specification (Release 15), Dec. 2018, 1-131.

3GPP, , "3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, 1-918.

3GPP, "3GPP TS 38.322 V15.4.0", 3rd Generation Partnership Project; Technical Specification Group Radio Access Network; NR; Radio Link Control (RLC) protocol specification (Release 15), Dec. 2018, 1-33.

3GPP, , "3GPP TS 38.323 V15.4.0", 3rd Generation Partnership Project; Technical Specification Group Radio Access Network; NR; Packet Data Convergence Protocol (PDCP) specification (Release 15), Dec. 2018, 1-26.

3GPP, "3rd Generation Partnership Project; Technical Specification Group Radio Access Network; NR; Medium Access Control (MAC) protocol specification (Release 15)", 3GPP TS 38.321 V15.4.0, Dec. 2018, 1-77.

3GPP, "3rd Generation Partnership Project; Technical Specification Group Radio Access Network; NR; Radio Resource Control (RRC) protocol specification (Release 15)", TS 38.331 V15.4.0, Dec. 2018, 1-474.

Huawei, "DC based handover", 3GPP TSG-RAN WG2#104, Tdoc R2-1817395, Spokane, USA, Nov. 12-16, 2018, 1-6.

3GPP, "3GPP TS 36.300 V15.4.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Dec. 2018, 1-363.

Huawei (Rapporteur), "Report and summary of email discussion [87#22] [LTE/DC] S-RLF and Reestablishment", 3GPP TSG-RAN WG2 Meeting #87, R2-144540, Shanghai, China, Oct. 6-10, 2018, 1-29.

* cited by examiner

Fig. 12  Method in MN 110

Fig. 13  Method in UE 120

Fig. 14 Method in SN 111, 112

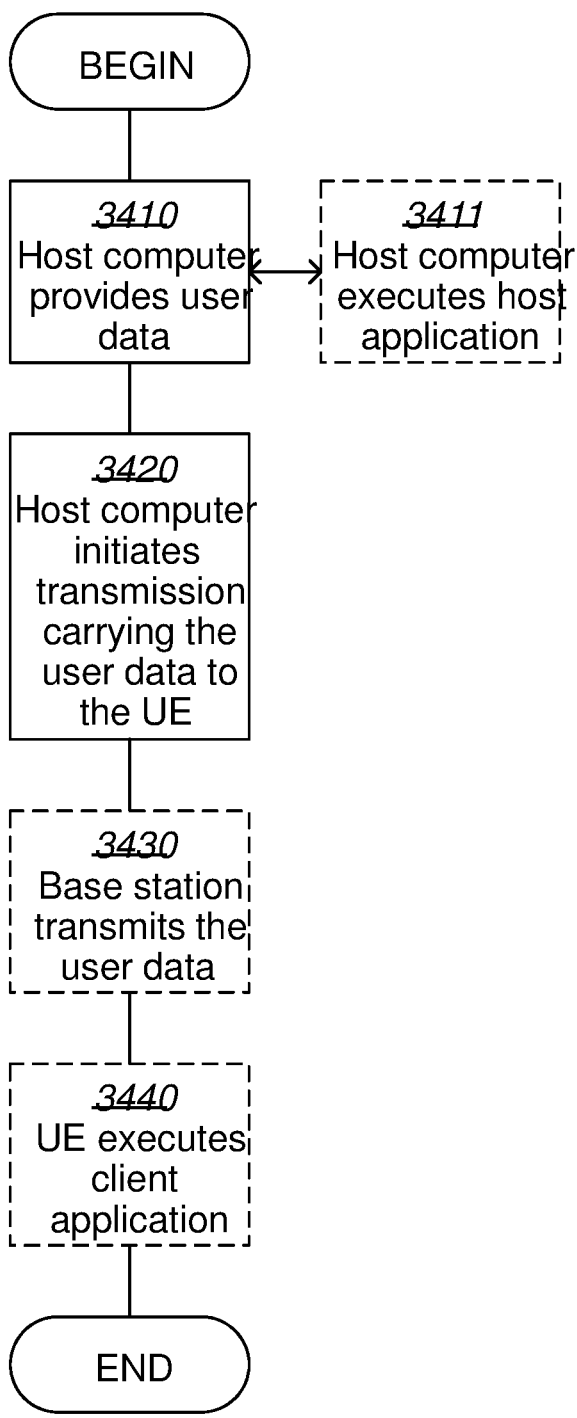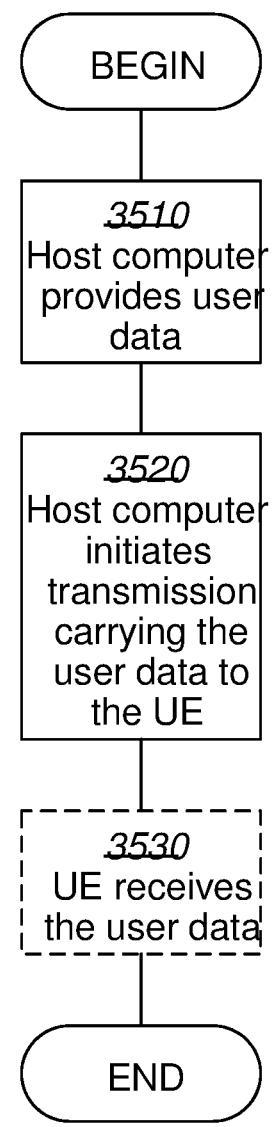
FIG. 31
FIG. 32

MASTER NODE, A SECONDARY NODE, A USER EQUIPMENT AND METHODS THEREIN FOR HANDLING OF A SECONDARY CELL GROUP (SCG)

TECHNICAL FIELD

Embodiments herein relate to a Master Node (MN), a Secondary Node (SN), a User Equipment (UE) and to methods therein. In some aspects, they relate to handling of a Secondary Cell Group (SCG) for the UE.

BACKGROUND

In a typical wireless communication network, wireless devices, also known as wireless communication devices, mobile stations, stations (STAs) and/or User Equipments (UEs), communicate via a Local Area Network such as a W-Fi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a W-Fi access point or a Radio Base Station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In 3GPP Dual-Connectivity (DC) solution has been specified, both for LTE and NR, as well as between LTE and NR. In DC two nodes are involved, a Master Node (MN) and a Secondary Node (SN). Multi-Connectivity (MC) is a case when there are more than two nodes involved. DC may also be used in Ultra Reliable Low Latency Communications (URLLC) cases in order to enhance the robustness and to avoid connection interruptions.

Inter-RAT and Inter 5GC in Interworking LTE and NR 5G in 3GPP introduces both a new core network (5GC) and a New Radio access network (NR). The 5GC will however, also support other RATs than NR. It has been agreed that LTE, here also referred to as E-UTRA, also will be connected to 5GC. LTE base stations referred to as eN Bs, that are connected to 5GC are referred to as new generation-eNB (ng-eNBs) and is part of NG-RAN which also comprises NR base stations called gNBs. FIG. 1 depicts a 5G System (5GS) architecture comprising 5GC and NG-RAN. It shows how the base stations are connected to each other and the nodes in 5GC. The interface between the base stations are referred to as Xn. The interface between the base stations and core network nodes such as Access and Mobility Function/User Plane Function (AMF/UPF) nodes and the core network are referred to as NG.

Currently in an LTE (E-UTRA) connected to the 5GC and NR, state transitions are supported, see FIG. 2. FIG. 2 depicts UE state machine and state transitions between NR/5GC, E-UTRA/EPC and E-UTRA/5GC.

As can be seen it is possible to move an ongoing UE connection wherein the UE is in RRC_CONNECTED state, between the two RATs using handover procedure. Additionally (not shown) it is possible for the network to move the UE to the other RAT by sending a Release message with re-direct information. When the UE is in RRC-IDLE or RRC-INACTIVE state a cell reselection procedure will be used when transiting between the RATs. Within the RATs there is also an RRC Re-establishment procedure which may be triggered if the UE loses the radio connection, referred to as Radio Link Failure, or at an intra-RAT or inter-RAT handover failure.

In NR and E-UTRA, i.e. LTE connected to 5GC, a new RRC state called RRC_INACTIVE has been introduced. When used herein, NG-RAN refers to either NR or LTE connected to 5G Core (5GC) network.

In RRC_INACTIVE, the UE stores certain configurations, e.g. Data Radio Bearer (DRB) configurations and physical layers parameters. When the UE need to resume the connection, it transmits an RRCConnectionResumeRequest or RRCResumeRequest message in LTE and NR respectively. The UE may then reuse the stored settings and reduce the time and signaling needed to enter RRC_CONNECTED.

LTE and NR/EPS and 5GS

There are different ways to deploy 5G network with or without interworking with LTE and EPC, which different ways are referred to as different options. In principle, NR and LTE may be deployed without any interworking, denoted by NR Stand-Alone (SA) operation, that is gNB in NR may be connected to 5GC (Option 2) and eNB may be connected to EPC (Option 1) with no interconnection between the two.

On the other hand, the first supported version of NR is the so-called E-UTRAN-NR Dual Connectivity (EN-DC), (Option 3). In Option 3, a deployment, dual connectivity between NR and LTE is applied with LTE as a master node and NR as a secondary node. The RAN node (gNB) supporting NR, may not have a control plane connection to EPC, instead it relies on the LTE as Master node (MeNB). This is also referred to as Non-standalone NR. It should be noted that that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE may also be connected to 5GC using eLTE, E-UTRA/5GC, or LTE/5GC and the node may be referred to as an ng-eNB (Option 5). eLTE means that LTE is connected to 5GC. In these cases, both NR and LTE are seen as part of the NG-RAN (and both the ng-eNB and the gNB may be referred to as NG-RAN nodes).

It is worth noting that, Option 4 and Option 7 are other variants of dual connectivity between LTE and NR which will be standardized as part of NG-RAN connected to 5GC, denoted by MR-DC (Multi-Radio Dual Connectivity). The following is comprised under the MR-DC umbrella:

EN-DC (Option 3): LTE is the master node and NR is the secondary node (EPC CN employed)
NE-DC (Option 4): NR is the master node and LTE is the secondary node (5GCN employed)
NGEN-DC (Option 7): LTE is the master node and NR is the secondary node (5GCN employed)
NR-DC (variant of Option 2): Dual connectivity where both the master and secondary nodes are NR (5GCN employed).

As the migration for these options may differ for different operators, it is possible to have deployments with multiple options in parallel in the same network e.g. there may be an eNB base station supporting options 3, 5 and 7 in the same network as an NR base station supporting options 2 and 4. In combination with dual connectivity solutions between LTE and NR it is also possible to support Carrier Aggregation (CA) in each cell group, i.e. Master Cell Group (MCG) and Secondary Cell Group (SCG), and dual connectivity between nodes on same RAT, e.g. NR-NR DC. For the LTE cells, a consequence of these different deployments is the co-existence of LTE cells associated to eNBs connected to EPC, 5GC or both EPC/5GC.

Background RRC Connection Resume in LTE

In 3GPP LTE Release-13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:

Reduce latency e.g. for smart phones accessing Internet.
Reduced signaling leads to reduce battery consumption for machine type devices sending very little data.

The Release-13 solution is based on that the UE sends an RRCConnectionResumeRequest message to the network and in response may receive an RRCConnectionResume message from the network. The RRCConnectionResume message is not encrypted but integrity protected.

The resume procedure in LTE may be found in the 3GPP RRC specifications TS 36.331. As the UE performing resume is in RRC_IDLE (with suspended AS context), that triggers a transition from RRC_IDLE to RRC_CONNECTED. Hence, that is modelled in the specifications in the same subclause that captures the RRC connection establishment (subclause 5.3.3 RRC connection establishment).

Background RRC Connection Resume in NR and eLTE

The RRC state model is updated in NR and in eLTE, i.e. LTE connected to 5GC, and a new RRC_INACTIVE state is introduced in addition to the existing RRC_IDLE and RRC_CONNECTED states inherited from LTE. In RRC_INACTIVE, the UE context from a previous RRC connection is stored in the RAN and is re-used the next time an RRC connection is established. The UE context includes information such as the UE security configuration, configured radio bearers etc. By storing the UE context in the RAN, the signaling required for security activation and bearer establishment is avoided, which signaling is normally required when transitioning from RRC_IDLE to RRC_CONNECTED. This improves latency and reduces the signaling overhead.

A UE state machine and state transitions in NR is depicted in FIG. 3.

The NR RRC_INACTIVE mode is realized by introducing two new procedures: "RRC connection suspend", also called RRC connection release with Suspended Configuration (SuspendConfig) and "RRC connection resume". See FIG. 4. The gNB suspends a connection with UL and DL data transmissions and moves the UE from NR RRC_CONNECTED to NR RRC_INACTIVE by sending an RRCRelease message with suspend indication or configuration to the UE. This may happen for example after the UE has been inactive for a certain period which causes the gNB internal inactivity timer to expire. Both the UE and the gNB stores the UE context and the associated identifier, referred to as I-Radio Network Temporary Identifier (I-RNTI). It has been recently updated that two identifiers will be configured in the suspend configuration, a long and short I-RNTI. The one to be used in resume depends on an indication from the network in system information of the cell the UE tries to resume in. The two I-RNTI identifiers were introduced to support scenarios when the UE is resuming in a cell which only gives the UE a small scheduling grant for the first UL message. For this purpose, also two different resume messages have been introduced namely RRCResumeRequest and RRCResumeRequest1. In the remainder of this document RRC resume request is used to refer to both messages.

At the next transition to NR RRC_CONNECTED, the UE resumes the connection by sending an RRC resume request including the following information to the gNB which the UE attempts to resume the connection towards. It should be noted that it may be another cell/gNB compared to the cell/gNB where the connection was suspended.

The I-RNTI, either the long or short I-RNTI depending on the system information indication.
A security token, referred to as resumeMAC-I in the specification, which is used to identify and verify the UE at RRC connection resume.
An indication of the cause of the resume, e.g. mobile originated data.

The gNB which serves the cell in which the UE is resuming is sometimes referred to as the target gNB, while the gNB serving the cell in which the UE was suspended in is sometimes referred to as the source gNB. To resume the connection, the target gNB determines which gNB is the source gNB, considering the gNB part of the I-RNTI, and request that gNB to send the UE's context. In the request the target provides, among other things, the UE ID and security token received from the UE as well as the target cell Cell ID.

The source gNB then locates the UE context based on the I-RNTI and verifies the request based on the security token, see next section. If successful, the gNB forwards the UE context to the target gNB, which then responds to the UE with RRC resume to confirm the connection is being resumed. The RRC resume message may also comprise configurations to reconfigure the radio bearers being resumed. Finally, the UE acknowledges the reception of the RRC re-establishment by sending RRC re-establishment complete. See FIG. 5.

It should be noted that the described NR RRC resume procedure works in a similar way in LTE and eLTE, i.e. when LTE is connected to 5GC.

For 3GPP Release 15, it is agreed that the UE releases its lower-layer SCG configuration in RRC_INACTIVE. However, keeping the lower layer SCG configuration in RRC_INACTIVE will be discussed in the scope of the DC and/or CA enhancements, and is likely to be enabled. It is also expected that the suspend and/or resume concerning SCG may be captured within current defined messages and procedures for suspend and/or resume. Therefore, no distinct behavior would be given to SCG configuration compared to MCG configuration when suspended and/or resumed, i.e. when suspending the UE, both MCG and SCG are suspended, which would require some coordination between MN and SN; when resuming the UE, both MCG and SCG are resumed, which would also require some coordination between MN and SN.

It is not only the RRCResume message that may be sent in response to the RRCResumeRequest message.

In NR and eLTE, after the UE sends an RRC Resume Request kind of message, e.g. RRCResumeRequest message or RRCResumeRequest1 message, the UE may receive a message on a Signal Radio Bearer (SRB) SRB1 that should also be encrypted, and integrity protected, as described above:
- RRCRelease with suspend configuration moving the UE to RRC_INACTIVE;
- RRCRelease without suspend configuration moving the UE to RRC_IDLE;
- RRCResume moving the UE to RRC_CONNECTED;

Other messages may also be transmitted, an RRCReject message with wait timer or RRCSetup message (fallback to RRC_IDLE) but on SRB0, i.e. not encrypted or integrity protected. All these possible responses are shown as follows in the specifications:

FIG. 6a depicts a scenario of a RRC connection resume, successful. In this scenario the UE sends an RRCResumeRequest message to the Network. The network then sends an RRCResume message to the UE which responds to the network with an RRCResumeComplete message.

FIG. 6b depicts a scenario of a RRC connection resume fallback to RRC connection establishment, successful. In this scenario the UE sends an RRCResumeRequest message to the Network. The network then sends an RRCSetup message to the UE which responds to the network with an RRCSetupComplete message.

FIG. 6c depicts a scenario of an RRC connection resume followed by network release, successful. In this scenario the UE sends an RRCResumeRequest message to the Network. The network then sends an RRCRelease message to the UE.

FIG. 6d depicts a scenario of an RRC connection resume followed by network suspend, successful. In this scenario the UE sends an RRCResumeRequest message to the Network. The network then sends an RRCRelease with suspend configuration message to the UE.

FIG. 6e depicts a scenario of an RRC connection resume, network reject. In this scenario the UE sends an RRCResumeRequest message to the Network. The network then sends an RRCReject message to the UE.

DC Operations

The general operations related to MR-DC are captured in 3GPP TS 37.340. The ones related to MR-DC with 5GC are reproduced in this section. For EN-DC procedures slightly differing can be found in clause 10 from 3GPP TS 37.340.

Secondary Node Addition

The Secondary Node (SN) Addition procedure is initiated by the MN and is used to establish a UE context at the SN in order to provide radio resources from the SN to the UE. For bearers requiring SCG radio resources, this procedure is used to add at least the initial SCG serving cell of the SCG. This procedure may also be used to configure an SN terminated MCG bearer, where no SCG configuration is needed.

FIG. 7 depicts actions 1-12 of an SN Addition procedure.

Action 1. The MN decides to request the target SN to allocate radio resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. The MN always provides all the needed security information to the SN (even if no SN terminated bearers are setup) to enable SRB3 to be setup based on SN decision. For bearer options that require Xn-U resources between the MN and the SN, MN needs to provide Xn-U TNL address information, Xn-U DL TNL address information for SN terminated bearers and Xn-U UL TNL address information for MN terminated bearers. The SN may reject the request.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in action 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

Action 2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration may be performed. The SN decides for the PScell and other SCG Scells and provides the new SCG radio resource configuration to the MN in a SN RRC configuration message contained in the SN Addition Request Acknowledge message. In case of bearer options that require Xn-U resources between the MN and the SN, the SN provides Xn-U TNL address information for the respective E-RAB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

NOTE 3: In case of MN terminated bearers, transmission of user plane data may take place after action 2.

NOTE 4: In case of SN terminated bearers, data forwarding and the SN Status Transfer may take place after action 2.

NOTE 5: For MN terminated NR SCG bearers for which PDCP duplication with CA is configured the MN allocates 2 separate Xn-U bearers.

For SN terminated NR MCG bearers for which PDCP duplication with CA is configured the SN allocates 2 separate Xn-U bearers.

Action 3. The MN sends the MN RRC reconfiguration message to the UE including the SN RRC configuration message, without modifying it.

Action 4. The UE applies the new configuration and replies to MN with MN RRC reconfiguration complete message, including a SN RRC response message for SN, if needed. In case the UE is unable to comply with (part of) the configuration included in the MN RRC reconfiguration message, it performs the reconfiguration failure procedure.

Action 5. The MN informs the SN that the UE has completed the reconfiguration procedure successfully via SN Reconfiguration Complete message, including the encoded SN RRC response message, if received from the UE.

Action 6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

Action 7. In case of SN terminated bearers using RLC AM, the MN sends SN Status Transfer.

Action 8. In case of SN terminated bearers using RLC AM, and dependent on the bearer characteristics of the respective QoS Flows, the MN may take actions to minimise service interruption due to activation of MR-DC (Data forwarding).

Action 9-12. For SN terminated bearers, the update of the UP path towards the 5GC is performed via PDU Session Path Update procedure.

Secondary Node (SN) Release, MN Initiated

The SN Release procedure may be initiated either by the MN or by the SN and is used to initiate the release of the UE context and relevant resources at the SN. The recipient node of this request can reject it, e.g., if a SN change procedure is triggered by the SN.

FIG. 8 depicts actions 1-8 of an example signalling flow for an MN initiated SN Release procedure.

Action 1. The MN initiates the procedure by sending the SN Release Request message. If data forwarding is requested, the MN provides data forwarding addresses to the SN.

Action 2. The SN confirms SN Release by sending the SN Release Request Acknowledge message. If appropriate, the SN may reject SN Release, e.g., if the SN change procedure is triggered by the SN.

Action 3/4. If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure.

NOTE 1: If data forwarding is applied, timely coordination between actions 1 and 2 of FIG. 8 may minimize gaps in service provision, this is however regarded to be an implementation matter.

Action 5. If the released bearers use RLC AM, the SN sends the SN Status transfer.

Action 6. Data forwarding from the SN to the MN takes place.

Action 7. If applicable, the PDU Session path update procedure is initiated.

Action 8. Upon reception of the UE Context Release message, the SN can release radio and C-plane related resource associated to the UE context. Any ongoing data forwarding may continue.

MN Initiated SN Change

The MN initiated SN change procedure is used to transfer a UE context from the source SN to a target SN and to change the SCG configuration in UE from one SN to another.

The Secondary Node Change procedure may always involve signaling over MCG SRB towards the UE.

FIG. 9 shows actions 1-15 of an example signalling flow for the SN Change initiated by the MN.

Action 1/2. The MN initiates the SN change by requesting the target SN to allocate resources for the UE by means of the SN Addition procedure. The MN may include measurement results related to the target SN. If data forwarding is needed, the target SN provides data forwarding addresses to the MN. The target SN includes the indication of the full or delta RRC configuration.

NOTE: The MN may send the SN Modification Request message (to the source SN) to request the current SCG configuration before action 1 of FIG. 9.

Action 3. If the allocation of target SN resources was successful, the MN initiates the release of the source SN resources including a Cause indicating SCG mobility. The Source SN may reject the release. If data forwarding is needed the MN provides data forwarding addresses to the source SN. If direct data forwarding is used for SN terminated bearers, the MN provides data forwarding addresses as received from the target SN to source SN. Reception of the SN Release Request message triggers the source SN to stop providing user data to the UE and, if applicable, to start data forwarding.

Action 4/5. The MN triggers the UE to apply the new configuration. The MN indicates the new configuration to the UE in the MN RRC reconfiguration message including the target SN RRC configuration message. The UE applies the new configuration and sends the MN RRC reconfiguration complete message, including the encoded SN RRC response message for the target SN, if needed. In case the UE is unable to comply with (part of) the configuration included in the MN RRC reconfiguration message, it performs the reconfiguration failure procedure.

Action 6. If the RRC connection reconfiguration procedure was successful, the MN informs the target SN via SN Reconfiguration Complete message with the encoded SN RRC response message for the target SN, if received from the UE.

Action 7. If configured with bearers requiring SCG radio resources the UE synchronizes to the target SN.

Action 8. For SN terminated bearers using RLC AM, the source SN sends the SN Status transfer, which the MN sends then to the target SN.

Action 9. If applicable, data forwarding from the source SN takes place. It may be initiated as early as the source SN receives the SN Release Request message from the MN.

Action 10-14. If one of the PDU session/QoS Flow was terminated at the source SN, path update procedure is triggered by the MN.

Action 15. Upon reception of the UE Context Release message, the source SN can release radio and C-plane related resource associated to the UE context. Any ongoing data forwarding may continue.

SN Initiated SN Change

The SN initiated SN change procedure is used to transfer a UE context from the source SN to a target SN and to change the SCG configuration in UE from one SN to another.

FIG. 10 shows an example signalling flow for the SN Change initiated by the SN.

Action 1. The source SN initiates the SN change procedure by sending the SN Change Required message, which contains a candidate target node ID and may include the SCG configuration (to support delta configuration) and measurement results related to the target SN.

Action 2/3. The MN requests the target SN to allocate resources for the UE by means of the SN Addition procedure, including the measurement results related to the target SN received from the source SN. If data forwarding is needed, the target SN provides data forwarding addresses to the MN. The target SN includes the indication of the full or delta RRC configuration.

Action 4/5. The MN triggers the UE to apply the new configuration. The MN indicates the new configuration to the UE in the MN RRC reconfiguration message including the SN RRC configuration message generated by the target SN. The UE applies the new configuration and sends the MN RRC reconfiguration complete message, including the encoded SN RRC response message for the target SN, if needed. In case the UE is unable to comply with (part of) the configuration included in the MN RRC reconfiguration message, it performs the reconfiguration failure procedure.

Action 6. If the allocation of target SN resources was successful, the MN confirms the change of the source SN. If data forwarding is needed the MN provides data forwarding addresses to the source SN. If direct data forwarding is used for SN terminated bearers, the MN provides data forwarding addresses as received from the target SN to source SN. Reception of the SN Change Confirm message triggers the source SN to stop providing user data to the UE and, if applicable, to start data forwarding.

Action 7. If the RRC connection reconfiguration procedure was successful, the MN informs the target SN via SN Reconfiguration Complete message with the encoded SN RRC response message for the target SN, if received from the UE.

Action 8. The UE synchronizes to the target SN.

Action 9. For SN terminated bearers using RLC AM, the source SN sends the SN Status transfer, which the MN sends then to the target SN.

Action 10. If applicable, data forwarding from the source SN takes place. It may be initiated as early as the source SN receives the SN Change Confirm message from the MN.

Action 11-15. If one of the PDU session/QoS Flow was terminated at the source SN, path update procedure is triggered by the MN.

Action 16. Upon reception of the UE Context Release message, the source SN can release radio and C-plane related resource associated to the UE context. Any ongoing data forwarding may continue.

RRC Message Structures

In this section, the structure of the messages, reconfiguration and resume and also related Information Elements (IEs) are shown, considering that the MN is a gNB. For (ng-) eNB as the MN, different messages are defined in clause 6.2.2 from 3GPP TS 36.331 RRCConnectionReconfiguration, and RRCConnectionResume messages, though the behavior is similar to gNB as the MN, as detailed in section 2.13 and 2.14.

NR RRCReconfiguration message

The NR RRCReconfiguration message is shown below:

```
-- ASN1START
-- TAG-RRCRECONFIGURATION-START
RRCReconfiguration ::=              SEQUENCE {
    rrc-TransactionIdentifier         RRC-TransactionIdentifier,
    criticalExtensions                CHOICE {
        rrcReconfiguration              RRCReconfiguration-IEs,
        criticalExtensionsFuture        SEQUENCE { }
    }
}
RRCReconfiguration-IEs ::=          SEQUENCE {
    radioBearerConfig                 RadioBearerConfig
OPTIONAL, -- Need M
    secondaryCellGroup                OCTET STRING (CONTAINING
CellGroupConfig)                      OPTIONAL, -- Need M
    measConfig                        MeasConfig
OPTIONAL, -- Need M
    lateNonCriticalExtension          OCTET STRING
OPTIONAL,
    nonCriticalExtension              RRCReconfiguration-v1530-IEs
OPTIONAL
}
RRCReconfiguration-v1530-IEs ::=    SEQUENCE {
    masterCellGroup                   OCTET STRING (CONTAINING
CellGroupConfig)                      OPTIONAL, -- Need M
    fullConfig                        ENUMERATED {true}
OPTIONAL, -- Cond FullConfig
    dedicatedNAS-MessageList          SEQUENCE (SIZE(1..maxDRB)) OF
```

-continued

```
DedicatedNAS-Message                    OPTIONAL, -- Cond nonHO
  masterKeyUpdate                         MasterKeyUpdate
OPTIONAL, -- Cond MasterKeyChange
  dedicatedSIB1-Delivery                OCTET STRING (CONTAINING
SIB1)                                     OPTIONAL, -- Need N
  dedicatedSystemInformationDelivery    OCTET STRING (CONTAINING
SystemInformation)                        OPTIONAL, -- Need N
  otherConfig                           OtherConfig
OPTIONAL, -- Need N
  nonCriticalExtension                  RRCReconfiguration-v15xy-IEs
OPTIONAL
}
RRCReconfiguration-v15xy-IEs ::=        SEQUENCE {
  mrdc-SecondaryCellGroup                 CHOICE {
    nr-SCG                                  OCTET STRING,
    eutra-SCG                               OCTET STRING
                                          }
OPTIONAL,   -- Need M
  radioBearerConfig2                    OCTET STRING (CONTAINING
RadioBearerConfig)                        OPTIONAL,  -- Need M
  sk-Counter                            INTEGER (0..65535)
OPTIONAL,  -- Cond S-KeyChange
  nonCriticalExtension                  SEQUENCE { }
OPTIONAL
}
MasterKeyUpdate ::=                     SEQUENCE {
  keySetChangeIndicator                   BOOLEAN,
  nextHopChainingCount                    NextHopChainingCount,
  nas-Container                           OCTET STRING
      OPTIONAL,   -- Cond securityNASC
  ...
}
```

The information elements underlined above are described below.

RadioBearerConfig: This is the IE that holds the configuration of the radio bearers (DRBs and SRBs). A UE may have two radio bearer configurations (radioBearerConfig and radioBearerConfig2). RadioBeaerConfig2 is usually used when the UE is in DC, but it may be used even before the UE is standalone mode (i.e. to prepare for a DC). The radioBearerConfig and radioBearerConfig2 are mainly distinguished by the security configuration (keys, algorithms) used by the PDCP. Normally, radioBearerConfig holds the configuration of the bearers associated with the master key while radioBearerConfig2 holds the configuration of the bearers associated with the secondary key. However, it is up to the network to decide which IE to associate to which key, because the radio bearer configuration contains the key to use as well (i.e. radioBeaerConfig2 can be associated with the secondary key). The structure of the radioBearerConfig is shown below:

```
-- ASN1START
-- TAG-RADIO-BEARER-CONFIG-START
RadioBearerConfig ::=       SEQUENCE {
  srb-ToAddModList            SRB-ToAddModList
OPTIONAL,  -- Cond HO-Conn
  srb3-ToRelease              ENUMERATED{true}
OPTIONAL,  -- Need N
  drb-ToAddModList            DRB-ToAddModList
OPTIONAL,  -- Cond HO-toNR
  drb-ToReleaseList           DRB-ToReleaseList
OPTIONAL,  -- Need N
  securityConfig              SecurityConfig
OPTIONAL,  -- Need M
  ...
}
SRB-ToAddModList ::=        SEQUENCE (SIZE (1..2)) OF SRB-
ToAddMod
```

```
SRB-ToAddMod ::=            SEQUENCE {
  srb-Identity                SRB-Identity,
  reestablishPDCP             ENUMERATED{true}
OPTIONAL,  -- Need N
  discardOnPDCP               ENUMERATED{true}
OPTIONAL,  -- Need N
  pdcp-Config                 PDCP-Config
OPTIONAL,  -- Cond PDCP
  ...
}
DRB-ToAddModList ::=        SEQUENCE (SIZE (1..maxDRB)) OF
DRB-ToAddMod
DRB-ToAddMod ::=            SEQUENCE {
  cnAssociation               CHOICE {
    eps-BearerIdentity          INTEGER (0..15),
-- EPS-DRB-Setup
    sdap-Config                 SDAP-Config
-- 5GC
  }                           OPTIONAL, -- Cond DRBSetup
  drb-Identity                DRB-Identity,
  reestablishPDCP             ENUMERATED{true}
OPTIONAL,  -- Need N
  recoverPDCP                 ENUMERATED{true}
OPTIONAL,  -- Need N
  pdcp-Config                 PDCP-Config
OPTIONAL,  -- Cond PDCP
  ...
}
DRB-ToReleaseList ::=       SEQUENCE (SIZE (1..maxDRB)) OF
DRB-Identity
SecurityConfig ::=          SEQUENCE {
  securityAlgorithmConfig     SecurityAlgorithmConfig
OPTIONAL,  -- Cond RBTermChange
  keyToUse                    ENUMERATED{master, secondary}
OPTIONAL,  -- Cond RBTermChange
  ...
}
``` sk-counter: is an integer that is used to derive the secondary key. When the UE is configured with DC (or pre-prepared for DC), the sk-counter is provided to it, and it derives the secondary key based on that. From the secondary key, and the indicated algorithms in the SecurityConfig included in the radioBearerConfig, the encryption and integrity protection keys are derived and the PDCPs of all the radio bearers associated with the secondary key will use these keys to perform encryption/decryption and integrity protection/verification.

mastercellGroup: This includes the lower layer (RLC, MAC, PHY) configuration during standalone configuration, and also for the master leg during a DC setup.

mrdc-SecondaryCellGroup: This includes the lower layer configuration for the secondary cell group when DC is configured. For the case of NE-DC, this will include eutra-SCG, while for the case of NR-DC, it will include the NR cell group configuration.

In the case of EN-DC, NR is the secondary cell group and for this case, the IE secondaryCellGroup is used (i.e. the master cell group in this case will be an EUTRA cell group and is provided to the UE via the LTE RRCConnectionReconfiguration message)

The structure of the cell group config IE is shown below (cellGroupl D of 0 indicates the master cell):

| CellGroupConfig information element |
| --- |
| ```
-- ASN1START
-- TAG-CELL-GROUP-CONFIG-START
-- Configuration of one Cell-Group:
CellGroupConfig ::=                       SEQUENCE {
    cellGroupId                               CellGroupId,
    rlc-BearerToAddModList                    SEQUENCE (SIZE(1..maxLC-
ID)) OF RLC-BearerConfig                  OPTIONAL,   -- Need N
    rlc-BearerToReleaseList                   SEQUENCE (SIZE(1..maxLC-
ID)) OF LogicalChannelIdentity            OPTIONAL,   -- Need N
    mac-CellGroupConfig                       MAC-CellGroupConfig
OPTIONAL,   -- Need M
    physicalCellGroupConfig                   PhysicalCellGroupConfig
OPTIONAL,   -- Need M
    spCellConfig                              SpCellConfig
OPTIONAL,   -- Need M
    sCellToAddModList                         SEQUENCE (SIZE
(1..maxNrofSCells)) OF SCellConfig            OPTIONAL,   -- Need N
    sCellToReleaseList                        SEQUENCE (SIZE
(1..maxNrofSCells)) OF SCellIndex             OPTIONAL,   -- Need N
    ...,
    [[
    reportUplinkTxDirectCurrent-v1530         ENUMERATED {true}
OPTIONAL   -- Cond BWP-Reconfig
    ]]
}
-- Serving cell specific MAC and PHY parameters for a SpCell:
SpCellConfig ::=                          SEQUENCE {
    servCellIndex                             ServCellIndex
OPTIONAL,   -- Cond SCG
    reconfigurationWithSync                   ReconfigurationWithSync
OPTIONAL,   -- Cond ReconfWithSync
    rlf-TimersAndConstants                    SetupRelease { RLF-
TimersAndConstants }                              OPTIONAL,   -- Need
M
    rlmInSyncOutOfSyncThreshold               ENUMERATED {n1}
OPTIONAL,   -- Need S
    spCellConfigDedicated                     ServingCellConfig
OPTIONAL,   -- Need M
    ...
}
ReconfigurationWithSync ::=               SEQUENCE {
    spCellConfigCommon                        ServingCellConfigCommon
OPTIONAL,   -- Need M
    newUE-Identity                            RNTI-Value,
    t304                                      ENUMERATED {ms50, ms100, ms150,
ms200, ms500, ms1000, ms2000, ms10000},
    rach-ConfigDedicated                      CHOICE {
        uplink                                    RACH-ConfigDedicated,
        supplementaryUplink                       RACH-ConfigDedicated
    }
OPTIONAL,   -- Need N
    ...,
    [[
    smtc                                      SSB-MTC
OPTIONAL   -- Need S
    ]]
}
SCellConfig ::=                           SEQUENCE {
    sCellIndex                                SCellIndex,
    sCellConfigCommon                         ServingCellConfigCommon
OPTIONAL,    -- Cond SCellAdd
    sCellConfigDedicated                      ServingCellConfig
``` |

-continued

| CellGroupConfig information element |
|---|
| OPTIONAL, -- Cond SCellAddMod |
| ..., |
| [[ |
| smtc                               SSB-MTC |
| OPTIONAL    -- Need S |
| ]] |
| } |
| -- TAG-CELL-GROUP-CONFIG-STOP |
| -- ASN1STOP |

RRCResume

The structure of the RRCResume message is shown below:

| RRCResume message |
|---|
| -- ASN1START |
| -- TAG-RRCRESUME-START |
| RRCResume ::=                    SEQUENCE { |
|   rrc-TransactionIdentifier         RRC-TransactionIdentifier, |
|   criticalExtensions                CHOICE { |
|     rrcResume                         RRCResume-IEs, |
|     criticalExtensionsFuture          SEQUENCE { } |
|   } |
| } |
| RRCResume-IEs ::=                SEQUENCE { |
|   radioBearerConfig                 RadioBearerConfig |
| OPTIONAL, -- Need M |
|   masterCellGroup                   OCTET STRING (CONTAINING |
| CellGroupConfig)                      OPTIONAL, -- Need M |
|   measConfig                        MeasConfig |
| OPTIONAL, -- Need M |
|   fullConfig                        ENUMERATED {true} |
| OPTIONAL, -- Need N |
|   lateNonCriticalExtension          OCTET STRING |
| OPTIONAL, |
|   nonCriticalExtension              RRCResume-v15xx-IEs |
| OPTIONAL |
| } |
| RRCResume-v15xx-IEs ::=          SEQUENCE { |
|   radioBearerConfig2-r15x           OCTET STRING (CONTAINING |
| RadioBearerConfig)                    OPTIONAL, -- Need M |
|   sk-Counter-r15x                   INTEGER (0..65535) |
| OPTIONAL, -- Need N |
|   mrdc-SecondaryCellGroup           CHOICE { |
|     nr-SCG                            OCTET STRING, |
|     eutra-SCG                         OCTET STRING |
|   } |
| OPTIONAL,  -- Need M |
|   nonCriticalExtension              SEQUENCE{ } |
| OPTIONAL |
| } |

It should be noted that the NR specification is still evolving and the RRCReconfiguration and RRCResume messages shown above are not exactly the ones that can be found in the agreed specifications right now. For example, as of this writing, neither the reconfiguration nor the resume message contains the mrdc-SecondaryCellGroup field. It is assumed that these will be introduced in the upcoming versions and the names that will be used in the specifications might end up being different.

SUMMARY

As a part of developing embodiments herein a problem was identified by the inventors and will first be discussed.

In the prior art, an MCG resume operation or a joint mechanism for the MCG and the SCG is defined for suspend and/or resume operations between the network and the UE. Therefore, it is not possible to address cases where it would be desirable to perform suspend and/or resume operations related only to the SCG, e.g. the SCG configuration, such as:

1) From RRC_INACTIVE to RRC_CONNECTED State:
   a. For light load transmissions, the UE would resume both the MCG and the SCG, if available, even if the given transmission could be handled reasonably with only MCG.
   b. The SCG to be resumed may be temporarily not in good SN coverage, which could trigger SCG RLF. This would lead to MN decision on keeping, changing, or releasing the SCG. However, if the MN decides to keep current configuration, further SCG RLFs may be triggered for the same reason, since the MN does not have the option to temporarily suspend the SCG only.

2) While in RRC_CONNECTED State:
   a. If there are periods where no SN is suitable for configuration, e.g. in spotty SN coverage, the MN may initiate multiple SN addition and/or release procedures consecutively as the subsequent SN change procedures may not be possible due to the spotty coverage of SNs. In this scenario, the SN to be added cannot benefit from delta configuration against any previously used SCG configuration since an SN addition procedure must be triggered instead of an SN change procedure. Also, processing, exchange of information and negotiation of UE capabilities will all take time for each SN addition procedure.
   b. A UE in long periods without SN transmissions must still monitor Physical Downlink Control CHannel (PDCCH) and Physical Downlink Shared CHannel (PDSCH) on the Primary Secondary Cell (PSCell).
   c. UEs not capable of dynamic power sharing, even in case of long periods without SN transmission, are still limited in the MCG by the tdm-PatternConfig field, which would restrict the subframes that could be used for MCG transmissions, since some subframes would be designated to SCG transmissions. Another limitation is that the UE may be over restricted in the total transmission power it may use for the MCG since the MN and SN may coordinate the maximum transmission power. For instance, in EN-DC, the maximum power transmission $P_{EN-DC}$ of the UE may be configured to be given by $P_{EN-DC}=P_{LTE}+P_{NR}$, wherein $P_{LTE}$ and $P_{NR}$ are accounting for the power used for the MCG transmission and the SCG transmission, respectively.

An object of embodiments herein is to improve the performance of a communications network for handling of the SCG. However, sometimes in this disclosure reference is made to the SCG configuration, and it should be understood that the terms "SCG" and "SCG configurations" may be used interchangeably in this disclosure. The same is applicable also for the terms "MCG" and "MCG configuration"

and it should be understood that the terms "MCG" and "MCG configurations" may be used interchangeably in this disclosure.

According to an aspect of embodiments herein, the object is achieved by a method performed in a Master Node (MN) for handling of a Secondary Cell Group (SCG) for a User Equipment (UE) operable in a dual connectivity mode with the MN and a Secondary Node (SN) operating in a wireless communication network. A Master Cell Group (MCG) is associated with the MN and the SCG is associated with the SN.

The MN decides to perform a first operation relating to a suspension or a resumption of the SCG independently from a second operation relating to a suspension or a resumption of the MCG.

Further, the MN transmits, to the UE, an indication indicating the first operation relating to the suspension or the resumption of the SCG and indicating the second operation relating to the suspension or the resumption of the MCG.

Furthermore, the MN transmits, to the SN, an indication indicating the first operation relating to the suspension or the resumption of the SCG.

According to an aspect of embodiments herein, the object is achieved by a Master Node (MN) for handling of a Secondary Cell Group (SCG) for a User Equipment (UE) configured to operate in a dual connectivity mode with the MN and a Secondary Node (SN) configured to operate in a wireless communication network. A Master Cell Group (MCG) is associated with the MN and the SCG is associated with the SN.

The MN is configured to decide to perform a first operation relating to a suspension or a resumption of the SCG independently from a second operation relating to a suspension or a resumption of the MCG Further, the MN is configured to transmit, to the UE, an indication indicating the first operation relating to the suspension or the resumption of the SCG and indicating the second operation relating to the suspension or the resumption of the MCG.

Furthermore, the MN is configured to transmit, to the SN, an indication indicating the first operation relating to the suspension or the resumption of the SCG.

According to an aspect of embodiments herein, the object is achieved by a method performed in a UE for handling of a Secondary Cell Group (SCG), wherein the UE is operable in a dual connectivity mode with a Master Node (MN) and a Secondary Node (SN) operating in a wireless communication network. A Master Cell Group (MCG) is associated with the MN and the SCG is associated with the SN.

The UE receives, from the MN, an indication indicating an operation relating to a suspension or a resumption of the SCG and indicating a second operation relating to a suspension or a resumption of the MCG, which first operation is decided to be performed independently from the second operation relating to the suspension or the resumption of the MCG.

Further, the UE handles the SCG and the MCG in accordance with the received indication.

According to an aspect of embodiments herein, the object is achieved by a UE for handling of a Secondary Cell Group (SCG), wherein the UE is configured to operate in a dual connectivity mode with a Master Node (MN) and a Secondary Node (SN) configured to operate in a wireless communication network. A Master Cell Group (MCG) is associated with the MN and the SCG is associated with the SN.

The UE is configured to receive, from the MN, an indication indicating an operation relating to a suspension or a resumption of the SCG and indicating a second operation relating to a suspension or a resumption of the MCG, which first operation is decided to be performed independently from the second operation relating to the suspension or the resumption of the MCG.

Further, the UE is configured to handle the SCG and the MCG in accordance with the received indication.

According to an aspect of embodiments herein, the object is achieved by a method performed in a Secondary Node (SN) for assisting a Master node (MN) in handling of a Secondary Cell Group (SCG) for a UE operable in a dual connectivity mode with the MN and the SN operating in a wireless communication network. A Master Cell Group (MCG) is associated with the MN and the SCG is associated with the SN.

The SN receives, from the MN, an indication indicating an operation relating to a suspension or a resumption of the SCG.

Further, the SN performs one or more out of:
  decide to suspend the SCG of the UE that is in an RRC_CONNECTED state with both the SCG and the MCG active, and transmitting, to the MN, an indication that the SCG of the UE is to be suspended;
  decide to resume a suspended SCG of the UE that is in an RRC_CONNECTED state with the MCG active and the SCG suspended, and transmit, to the MN, an indication to resume the suspended SCG of the UE;
  receive, from the MN, an SN addition request to initiate dual connectivity and transmit the SCG to the MN; and
  receive a request to resume a suspended SCG and transmit to, the MN an indication acknowledging the resume request.

According to an aspect of embodiments herein, the object is achieved by a Secondary Node (SN) for assisting a Master node (MN) in handling of a Secondary Cell Group (SCG) for a UE configured to operate in a dual connectivity mode with the MN and the SN configured to operate in a wireless communication network. A Master Cell Group (MCG) is associated with the MN and the SCG is associated with the SN.

The SN is configured to receive, from the MN, an indication indicating an operation relating to a suspension or a resumption of the SCG.

Further, the SN is configured to perform one or more out of:
  decide to suspend the SCG of the UE that is in an RRC_CONNECTED state with both the SCG and the MCG active, and transmitting, to the MN, an indication that the SCG of the UE is to be suspended;
  decide to resume a suspended SCG of the UE that is in an RRC_CONNECTED state with the MCG active and the SCG suspended, and transmit, to the MN, an indication to resume the suspended SCG of the UE;
  receive, from the MN, an SN addition request to initiate dual connectivity and transmit the SCG to the MN; and
  receive a request to resume a suspended SCG and transmit to, the MN an indication acknowledging the resume request.

According to another aspect of embodiments herein, the object is achieved by a computer program, comprising instructions which, when executed on at least one processor, causes the at least one processor to carry out the method performed by the MN.

According to another aspect of embodiments herein, the object is achieved by a computer program, comprising instructions which, when executed on at least one processor, causes the at least one processor to carry out the method performed by the UE.

According to another aspect of embodiments herein, the object is achieved by a computer program, comprising instructions which, when executed on at least one processor, causes the at least one processor to carry out the method performed by the SN.

According to another aspect of embodiments herein, the object is achieved by a carrier comprising the computer program, wherein the carrier is one of an electronic signal, an optical signal, a radio signal or a computer readable storage medium.

Since the MN decides to perform the first operation relating to a suspension or a resumption of the SCG independently from the second operation relating to a suspension or a resumption of the MCG, and since the MN transmits, to the UE, an indication indicating the first operation relating to the suspension or the resumption of the SCG and indicating the second operation relating to the suspension or the resumption of the MCG, the handling of the SCG operations, e.g. the handling of resume or suspend operations, is made independent from the handling of the MCG operations. By handling the SCG independently from the handling of the MCG, the SCG does not for example have to be resumed just because the MCG is to be resumed. Thereby, a more efficient usage of the connection between the UE and the communications network is provided. This results in an improved performance of the communications network.

BRIEF DESCRIPTION OF THE DRAWINGS

Examples of embodiments herein are described in more detail with reference to attached drawings in which:

FIGS. 31-34 are flowcharts illustrating methods implemented in a communication system including a host computer, a base station and a user equipment.

DETAILED DESCRIPTION

Figure 1:
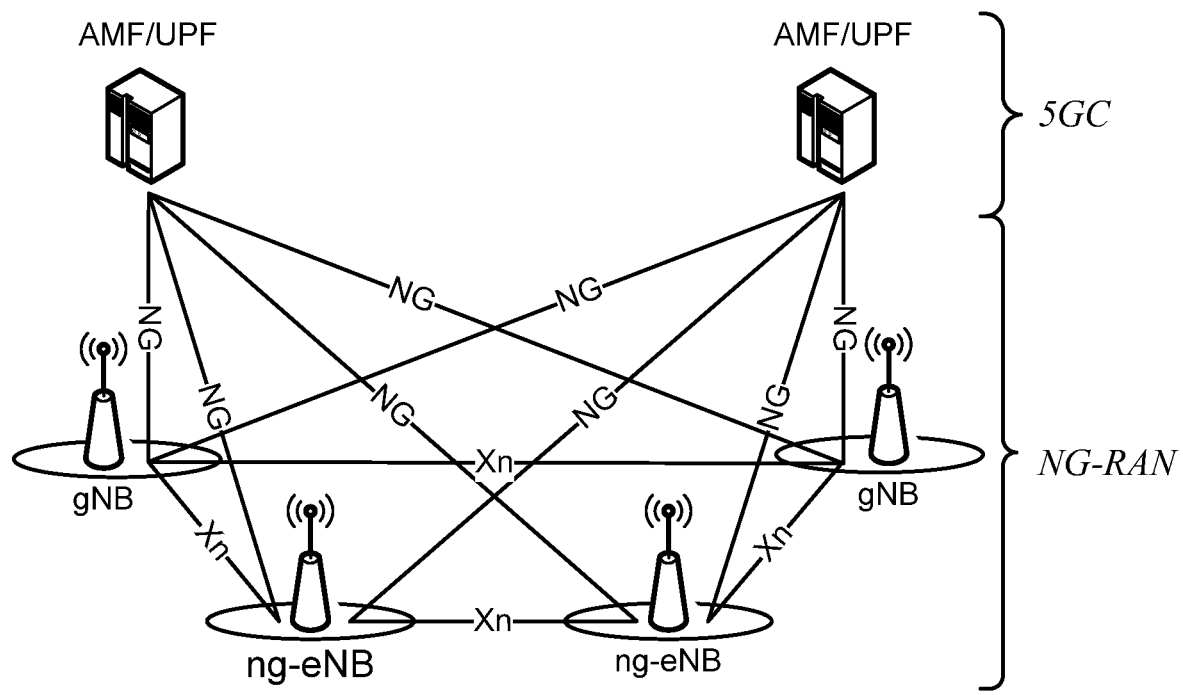
FIG. 1 is a schematic block diagram illustrating a 5G communications system (5GS) architecture comprising 5GC and NG-RAN.
Figure 2:
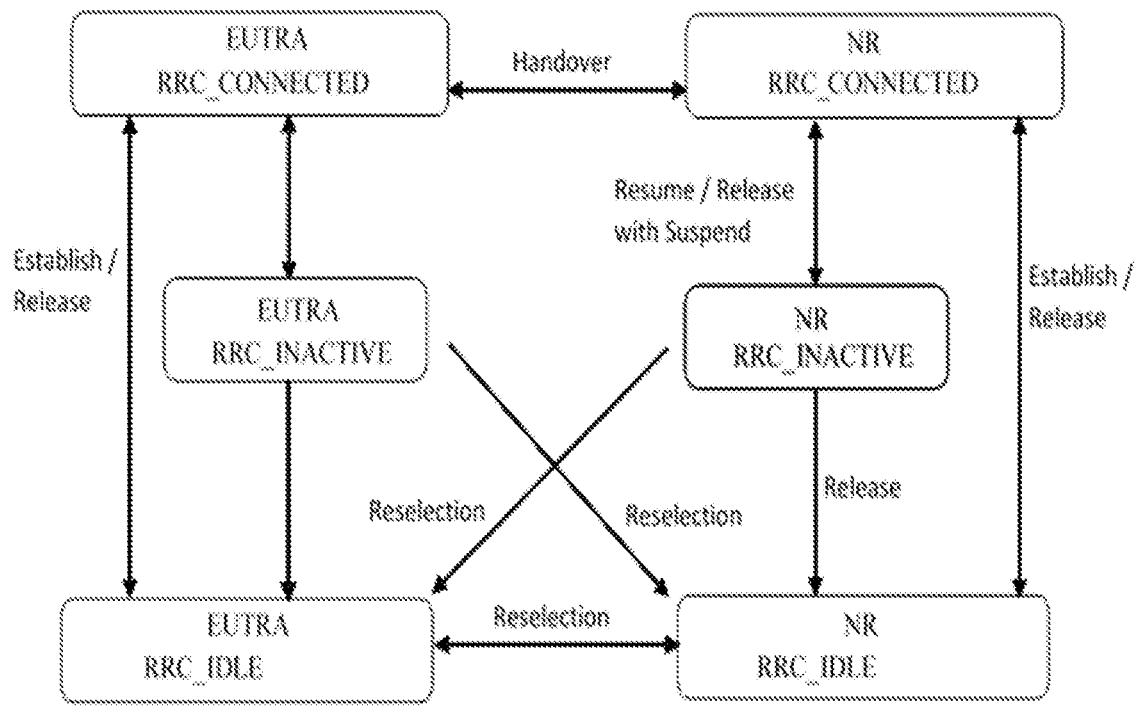
FIG. 2 schematically illustrates a UE state machine and state transitions between NR/5GC, E-UTRA/EPC and E-UTRA/5GC.
Figure 3:
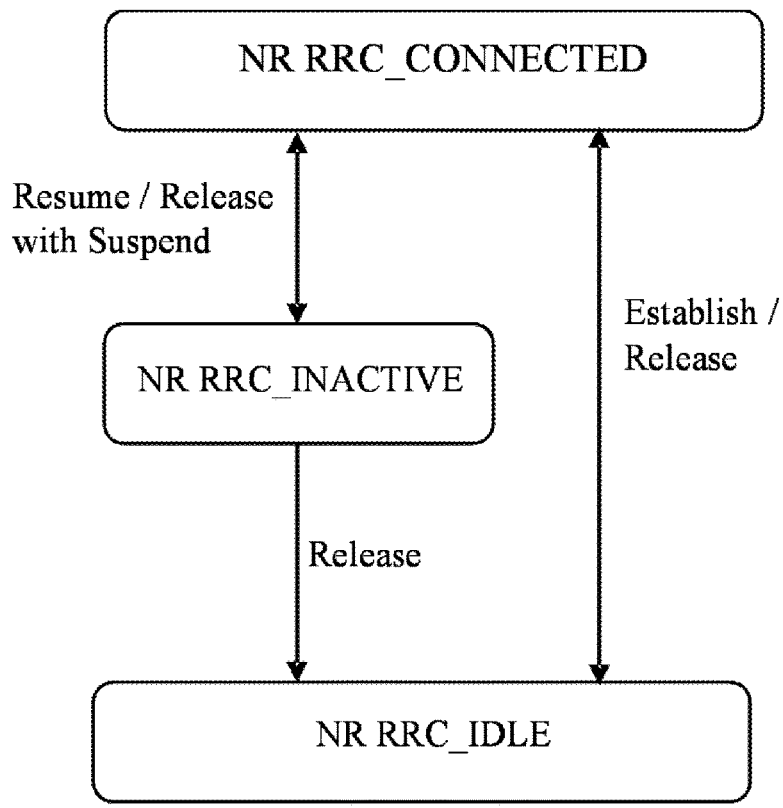
FIG. 3 schematically illustrates a UE state machine and state transitions in NR.
Figure 4:
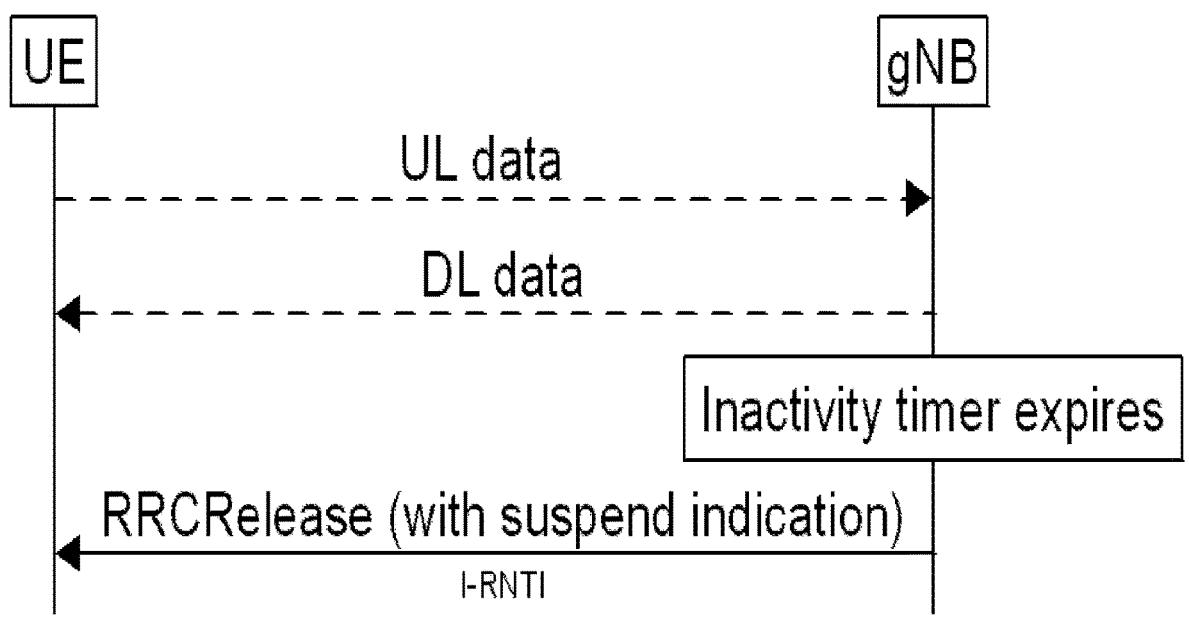
FIG. 4 is a combined block diagram and flowchart illustrating exemplifying signaling in a communications system for RRC release.
Figure 5:
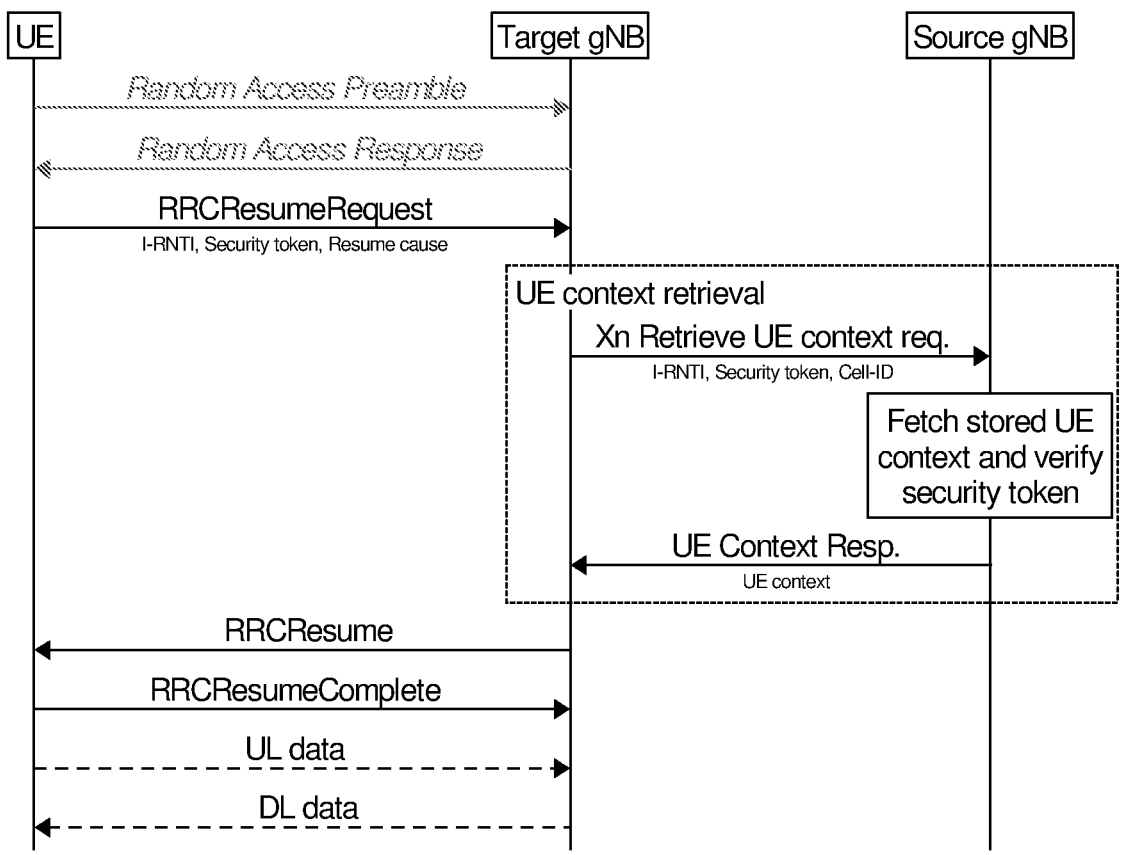
FIG. 5 is a combined block diagram and flowchart illustrating exemplifying signaling in a communications system for RRC resume.
Figure 6A:
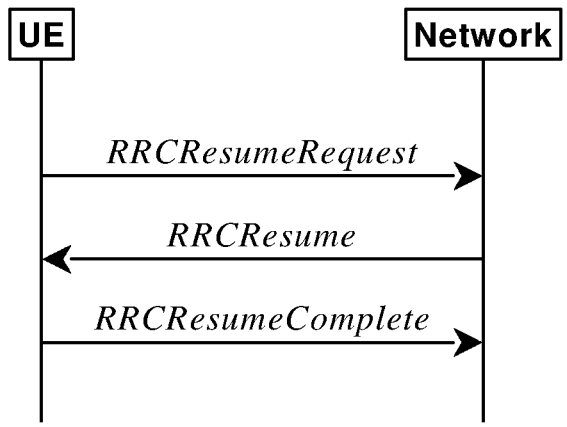
FIGS. 6a-6e are combined block diagrams and flowcharts illustrating exemplifying RRC signaling in a communications.
Figure 6B:
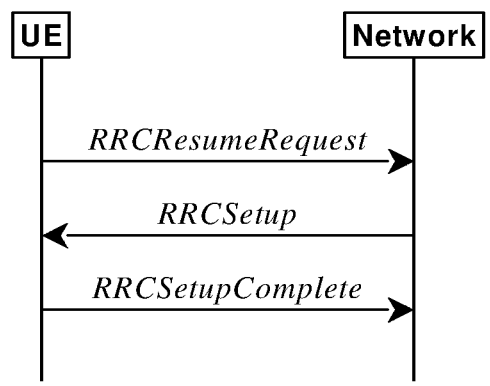
Figure 6C:
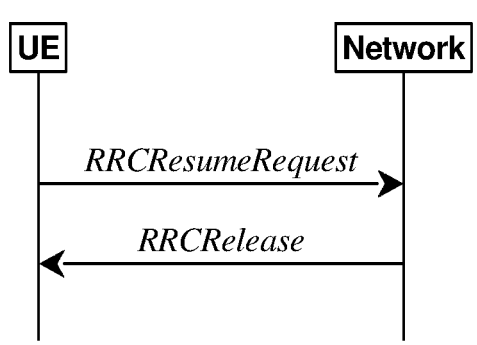
Figure 6D:
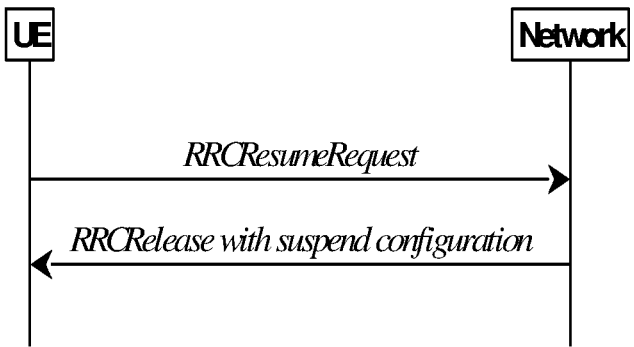
Figure 6E:
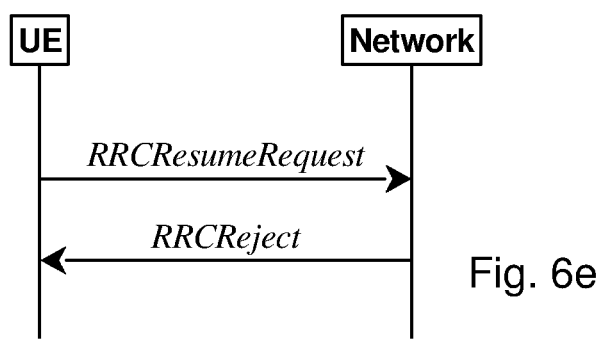
Figure 7:
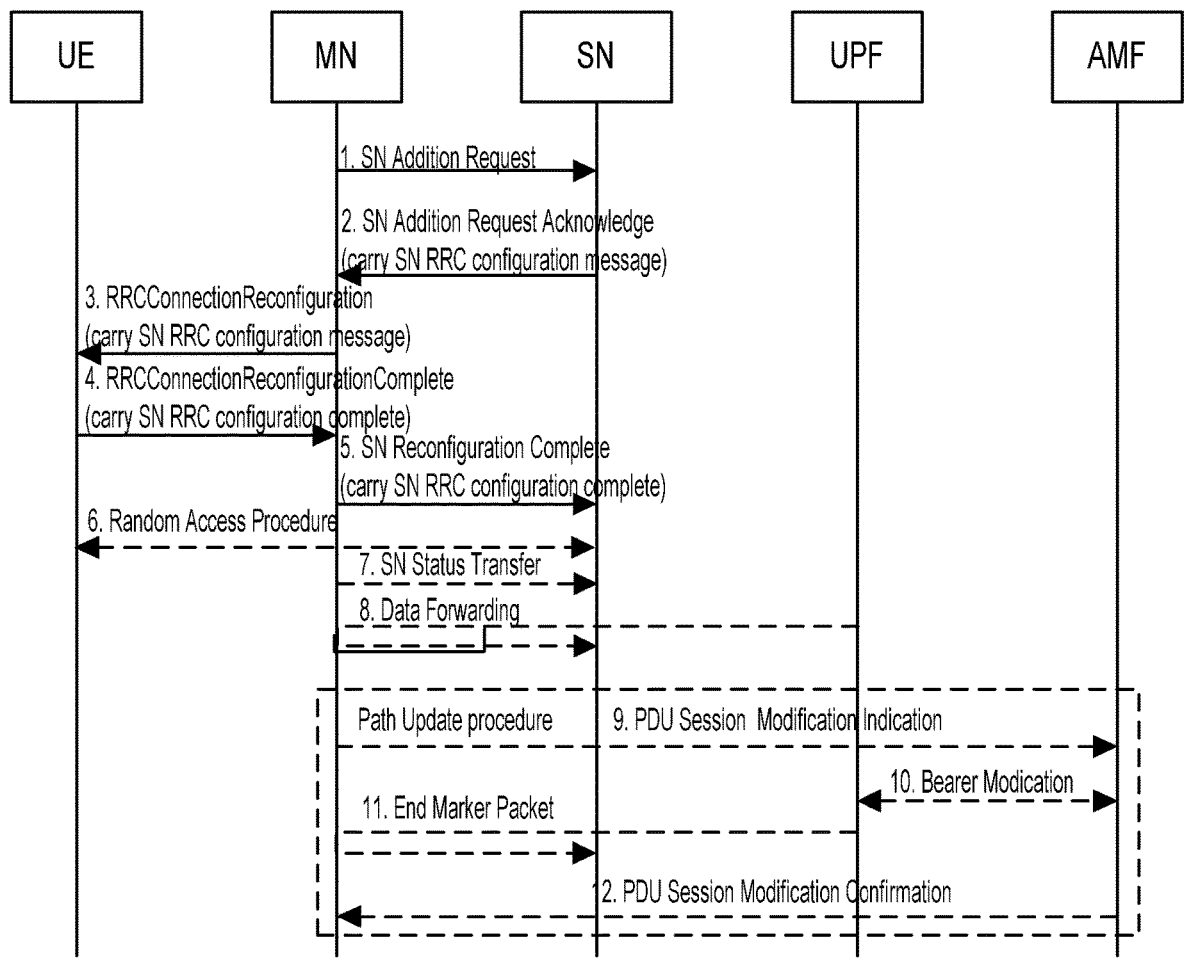
FIG. 7 is a combined block diagram and flowchart illustrating exemplifying signaling in a communications system for Secondary Node addition.

In some embodiments disclosed herein, the RRC resume mechanism is enhanced to permit a UE, with suspended MCG and SCG configurations, to be resumed, i.e. activated, with only the MCG while keeping the SCG suspended, i.e. deactivated. For example, this may be the case when the UE is transitioning from an RRC_INACTIVE state to an RRC_CONNECTED state.

Some embodiments disclosed herein also comprise a mechanism to enable SCG suspend operations and/or SCG resume operations, i.e. SCG deactivating and/or activating operations, while the UE is in an RRC_CONNECTED state, i.e., without affecting the MCG configuration. The SCG suspend and/or resume operations may be initiated either by the MN or by the SN. For the SCG resume, some embodiments disclosed herein comprise a request initiated by the UE. In case of the UE being in connected mode, i.e. in active mode, this may also be referred to as activation/deactivation of the SCG instead of resume/suspend of the SCG to distinguish the cases in inactive and active states even though underlying configuration elements may be the same for inactive and active states.

In some embodiments, the UE may perform a request for an SCG resumption, i.e. an SCG activation, while the UE is in an RRC_CONNECTED state.

Moreover, some embodiments comprise the concept of (re-)configuration of a suspended SCG in order to permit early SCG configuration when performing an SN addition and/or change procedure with the SCG resources. The reconfiguration or setup of the suspended SCG may be performed while the UE is kept in a RRC_CONNECTED state.

Since the aforementioned SCG suspend and/or resume operations may need coordination between the MN and the SN, embodiments herein also relate to methods for such coordination between the MN and the SN. For example, embodiments disclosed herein may comprise transmittal of one or more inter-node messages for coordination between the MN and the SN during e.g. suspend and/or resume operations.

By embodiments disclosed herein, one or more of the following advantages are provided.

Some embodiments disclosed herein enable a more efficient resume of a connection between the UE and the network node, e.g. the MN, when only MCG transmissions are necessary, or when SN coverage may not be suitable to trigger resume of the SCG. By keeping the configurations in a suspended state, a resumption at a later stage will result in a faster connection resumption, with less signaling both between the UE and the network nodes and between the network nodes as compared to establishing a new connection. While the UE is in RRC_CONNECTED, the following advantages may be highlighted:

1. Temporary poor coverage conditions in the SN may not need to be handled with an SCG RLF and release of the SN/SCG in subsequent reconfigurations, but may be handled in a simpler manner, e.g., by suspending the SCG or by not resuming the SCG.
2. It is possible to perform a SN change procedure to a target SN from an out-of-coverage source SN (if the latter is suspended), which enables the use of delta configuration in the target SN which reduces the processing and signaling required.
3. The network, e.g. by means of a network node such as the MN, may trigger an early SCG configuration when performing an SN addition procedure by providing the SCG configurations and initially configuring the SCG in a suspended state. For instance, the capability coordination and/or resource sharing may be done, e.g. configured, in advance.
4. In periods without transmissions on the SN side, e.g. without transmissions from the UE to the SN and from the SN to the UE, suspension of only the SCG will result in: no need for the UE to monitor the PDCCH and the PDSCH on the PSCell; e.g., a UE which is not capable of dynamic power sharing may have a Time-Division Multiplexing (TDM) pattern released and a maximum transmission power on the MCG reconfigured in order to enable the use of more NW resources for MCG transmissions.

When the UE resumes a connection from an RRC INACTIVE state to an RRC_CONNECTED state, the following advantage may be highlighted:

1. When the UE transmits the RRC Resume Request message to the MN it may have recent measurements and/or valid measurements of the old SCG which it hasn't yet reported to the MN. Since the MN is unaware of the measurement quality of the SCG, it may not fully resume the connection to it, but if the UE maintains the configurations in a suspended state until the MN decides that it is valid, the SCG configurations may then quickly be resumed.

Figure 11:
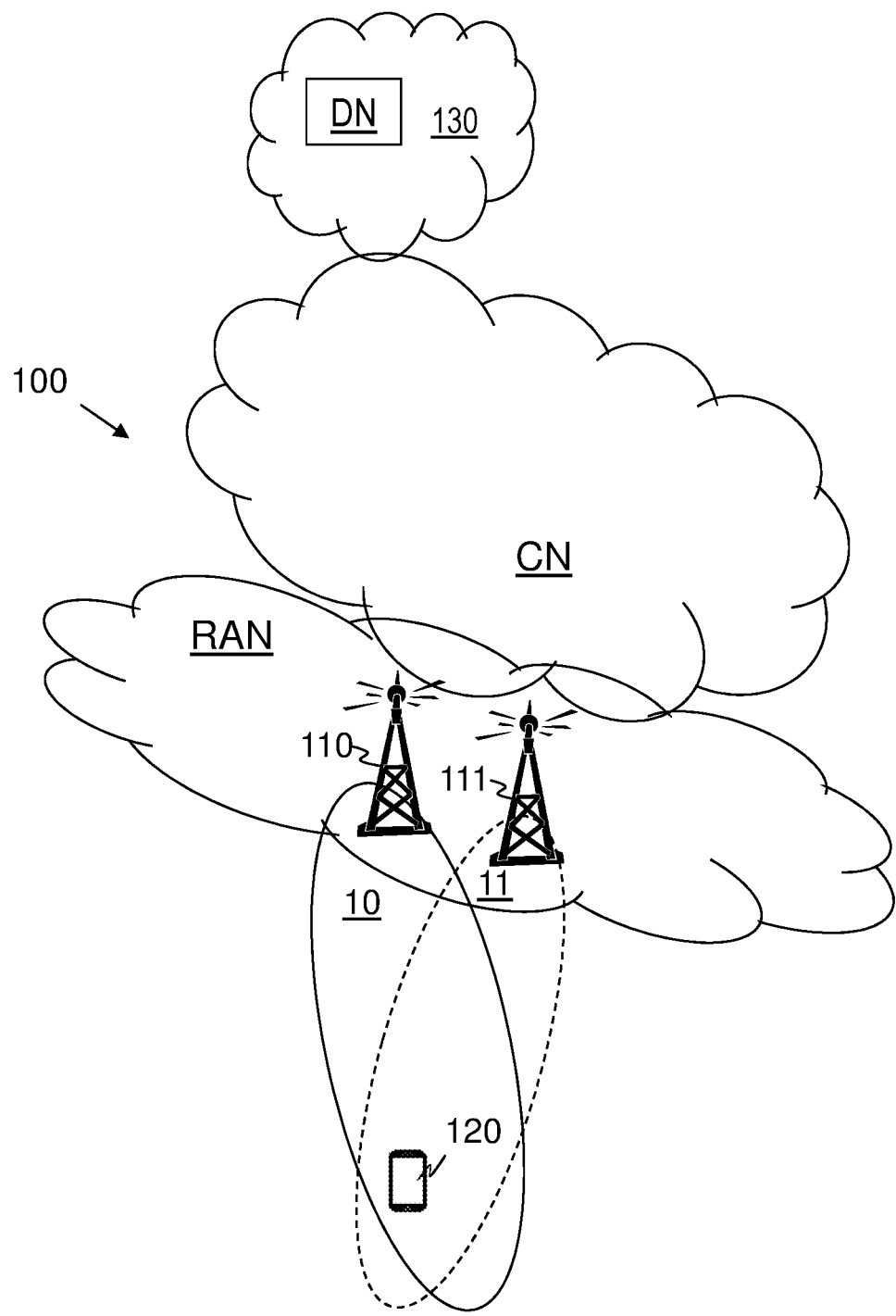
FIG. 11 is a schematic block diagram illustrating embodiments of a wireless communications network.

Embodiments herein relate to wireless communication networks in general. FIG. 11 is a schematic overview depicting a wireless communications network 100. The wireless communications network 100 comprises one or more RANs and one or more CNs. The wireless communications network 100 may use a number of different technologies, such as W-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (MiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such e.g. a network node 110, and a SN. These nodes provide radio coverage in a number of cells which may also be referred to as a beam or a beam group of beams, such as a cell 10 provided by the network node 110 and a cell 11 provided by the SN 111.

The network node 110 may e.g. be acting as a master Node (MN) or an SN when serving a UE 120 in the wireless communications network 100, according to embodiments herein. The SN 111 may e.g. be acting as a source SN when serving the UE 120 in the wireless communications network 100, according to embodiments herein.

The network node 110 and the first SN 111 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The network node 110 may be referred to as a serving radio network node and communicates with a UE 120 with Downlink (DL) transmissions to the UE 120 and Uplink (UL) transmissions from the UE 120.

In the wireless communication network 100, one or more UEs operate, such as e.g. the UE 120. The UE 120 may also referred to as a device, a wireless device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by the UE 120. As an alternative, a Distributed Node (DN) and functionality, e.g. comprised in a cloud 130 as shown in FIG. 1, may be used for performing or partly performing the methods herein.

The above described problem is addressed in a number of embodiments, some of which may be seen as alternatives, while some may be used in combination.

It should be noted that the sections herein may e.g. refer to generic Multi-Radio Dual Connectivity (MR-DC) or a specific Dual Connectivity (DC) option, while example embodiments described herein may be applicable to any MR-DC option but comprise examples of a specific DC option.

Similarly, even though the sections above treat SCG configuration within the concept of suspend/resume, embodiments described here may be also approached in a broader concept as the handling of SCG configuration irrespective of suspend/resume operation, i.e., methods may be used to activate/deactivate SCG configuration instead of referring to it as suspend/resume of SCG.

The terms "activate/activation" and "resume/resumption" are used interchangeably in this disclosure to signify the current SCG and/or SCG configuration(s) that is(are) going to be used at a given time by the UE 120 and the corresponding SN 111. The same is applicable for a reference to an activation or resumption of an MCG and/or MCG configuration.

The terms "deactivate/deactivation" and "suspend/suspension" are used interchangeably to signify the SCG and/or SCG configurations that are not being used but are saved, e.g. stored, by the UE 120 and the corresponding SN 111. The same is applicable for a reference to a deactivation or suspension of an MCG and/or MCG configuration.

The description, specifically the messages and procedures shown, are mostly targeting NR. However, the mechanisms described herein are equally applicable for the case where the MN is LTE, i.e. EN-DC and NGEN-DC cases. In these cases, corresponding changes in the RRCConnectionReconfiguration, RRCConnectionResume messages and UE behaviour on processing these messages will be made in the LTE specifications.

Figure 12:
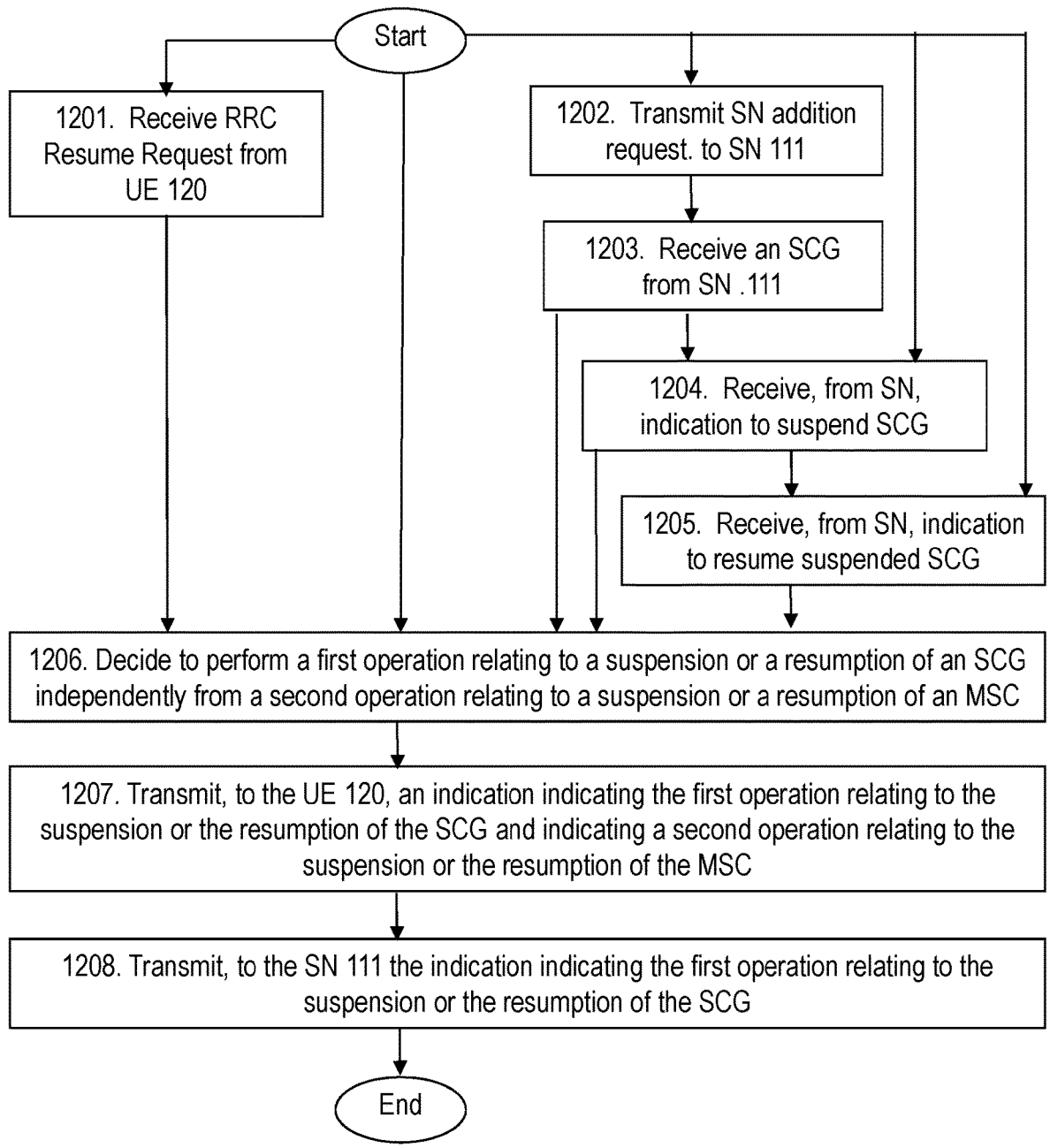
FIG. 12 is a flowchart depicting embodiments of a method in a MN.

FIG. 12 shows example embodiments of a method performed by the MN 110 for handling of a SCG for the UE 120 operable in a dual connectivity mode with the MN 110 and the SN 111 operating in the wireless communication network 100. An MCG is associated with the MN 110 and the SCG is associated with the SN 111.

The method comprises one or more out of the following actions, which actions may be taken in any suitable order. Further, one or more actions may be combined.

A general embodiment relates to Actions 1206-1208 below, and further exemplifying embodiments relate to one or more of Actions 1201-1205 in combination with Actions 1206-1208.

Action 1201

In some first and second exemplifying embodiments, the MN 110 receives a Radio Resource Control (RRC) resume request from the UE 120 that is in an RRC_INACTIVE state with both the SCG and the MCG suspended.

This may for example be the case in some first exemplifying embodiments relating to network initiated RRC Resume from an RRC_INACTIVE state while maintaining suspended SCG configurations as will be described in e.g. section 1.1.2.1. below.

Alternatively, this may be the case in some second exemplifying embodiments relating to network initiated RRC Resume from an RRC_INACTIVE state while resuming SCG configurations as will be described in e.g. section 1.1.2.2. below.

In some third exemplifying embodiments, the MN 110 receives a RRC resume request from the UE 120 that is in an RRC_INACTIVE state with both the SCG and the MCG suspended, wherein the resume request includes an indication to resume the SCG. Thus, in some third exemplifying embodiments, the UE 120 may have detected that the SCG is still valid and that it want the SCG to be resumed. Thus, the UE 120 may transmit in the RRC resume request such a request to resume the SCG. The third exemplifying embodiments relate to UE initiated SCG resume from an RRC INACTIVE state as will be described in e.g. section 1.1.2.3. below.

The first, second and third exemplifying embodiments may comprise Action 1201 in combination with Actions 1206-1208 below.

Action 1202

In some fourth exemplifying embodiments, the MN 110 transmits an SN addition request to initiate dual connectivity. Thereby, a dual connectivity with the MN 110 and the SN 111 may be set up for the UE 120.

This may for example be the case in some fourth exemplifying embodiments relating to MN initiated resume or suspend request as will be described in e.g. section 1.1.3.2. below. The fourth exemplifying embodiment may comprise Actions 1202-1203 in combination with Actions 1206-1208 below.

Action 1203

In some fourth exemplifying embodiments, and in response to the request for SN addition transmitted as described in Action 1202, the MN 110 receives, from the SN 111, the SCG. Thereby, the MN 110 will receive knowledge about the SCG to use in the dual connectivity for the UE 120.

Action 1204

In some fifth exemplifying embodiments, the MN 110 receives, from the SN 111, an indication that the SCG of the UE 120 is to be suspended, wherein the UE 120 is in an RRC_CONNECTED state with both the SCG and the MCG active. For example, the SN 111 may have detected that the signal quality of the SCG has degraded and decided that the SCG should be suspended until the signal quality has improved, and therefore the SN 111 transmits the indication to the MN 110.

This may be the case in some fifth exemplifying embodiments relating to SN initiated SCG resume or suspend request as will be described in more detail in e.g. section 1.1.3.1. below.

The fifth exemplifying embodiment may comprise Action 1204 in combination with Actions 1206-1208 below.

Action 1205

In some sixth exemplifying embodiments also relating to SN initiated SCG resume or suspend request, the MN 110 receives from the SN 111, an indication to resume a suspended SCG of the UE 120 that is in an RRC_CONNECTED state with the MCG active and the SCG suspended. For example, the SN 111 may have determined that DL data intended for the UE 120 has arrived for the suspended bearers terminating in the suspended SCG, and therefore the SN 111 want to resume the suspended SCG in order to be able to deliver the DL data to the UE.

The sixth exemplifying embodiment may comprise Action 1205 in combination with Actions 1206-1208 below.

Action 1206

The MN 110 decides to perform a first operation relating to a suspension or a resumption of the SCG independently from a second operation relating to a suspension or a resumption of the MCG.

For example, this may be case when the MCG and the SCG are suspended and the MN 110 decides whether to resume the MCG and the SCG, or to resume the MCG but keep the SCG suspended. The decision to resume or keep the SCG suspended is taken independent of the decision to resume the MCG. In other words, the decision to resume or keep the SCG suspended is taken independent of the MCG resumption. If only MCG transmissions is necessary the MN 110 may decide to only resume the MCG, or the MN 110 may decide not to resume the SCG when the SN coverage is not suitable for triggering a resumption of the SCG.

As another example, when the MCG is resumed, the MN 110 decides whether to resume a suspended SCG or to suspend a resumed SCG. The former may for example be the case when resources of the SCG are needed for transmission, and the latter may for example be the case when resources of the SCG are not needed for transmission.

As yet another example, when the UE 120 is to transition from an RRC_INACTIVE state to an RRC_CONNECTED state, while prior art would be to resume both the MCG and the SCG, embodiments herein provides for the MN 110 to decide upon keeping the SCG suspended or to resume it. Thus, according to embodiments disclosed herein, the SCG does not have to be resumed just because the MCG is resumed.

As mentioned in Action 1201 above, in some first embodiments the MN 110 receives a RRC resume request from the UE 120 that is in an RRC_INACTIVE state with both the SCG and the MCG suspended. In such first exemplifying embodiments, the deciding to perform the first operation relating to the suspension or the resumption of the SCG independently from the second operation relating to the suspension or the resumption of the MCG may comprise that the MN 110 decides to keep the SCG suspended and to resume the MCG.

In some second exemplifying embodiments, the deciding to perform the first operation relating to the suspension or the resumption of the SCG independently from the second operation relating to the suspension or the resumption of the MCG may comprise that the MN 110 decides to resume the SCG and to resume the MCG.

In some third exemplifying embodiments, the deciding to perform the first operation relating to the suspension or the resumption of the SCG independently from the second operation relating to the suspension or the resumption of the MCG may comprise that the MN 110 decides to resume the MCG and the SCG.

Thus, in both some second and third exemplifying embodiments, both the SCG and the MCG are decided to be resumed but it is the network, e.g. the MN 110, that decides to resume them both and the decision to resume the SCG is taken independent from the decision to resume the MCG.

In some fourth exemplifying embodiments, when the MN 110 has sent an SN addition request to the SN 111 and has received the SCG from the SN 111 as described above in Actions 1202 and 1203, the deciding to perform the first operation relating to the suspension or the resumption of the SCG independently from the second operation relating to the suspension or the resumption of the MCG may comprise that the MN 110 decides to set up the SCG and to keep it suspended.

In some alternative fourth exemplifying embodiments, also relating to MN initiated resume or suspend request as some fourth exemplifying embodiments, the deciding to perform the first operation relating to the suspension or the resumption of the SCG independently from the second operation relating to the suspension or the resumption of the MCG may comprise that the MN 110 decides to resume a suspended SCG. The MN 110 may decide this without having performed Actions 1202-1203 as described in some fourth exemplifying embodiments. Thus, in some alternative fourth embodiments, the MN 110 may perform Actions 1206-1208 without performing Actions 1202-1203.

In some fifth exemplifying embodiments, the deciding to perform the first operation relating to the suspension or the resumption of the SCG independently from the second operation relating to the suspension or the resumption of the MCG may comprise that the MN 110 decides to suspend the SCG and to keep the MCG active.

In some sixth exemplifying embodiments, the deciding to perform the first operation relating to the suspension or the resumption of the SCG independently from the second operation relating to the suspension or the resumption of the MCG may comprise that the MN 110 decides to resume the suspended SCG and to keep the MCG active.

Action 1207

The MN 110 transmits, to the UE 120 an indication indicating the first operation relating to the suspension or the resumption of the SCG and indicating the second operation relating to the suspension or the resumption of the MCG.

Thereby, the UE 120 will be informed about the decision taken by the MN 110 and about what action the UE 120 should take regarding the SCG which action is taken independently from the action taken regarding the MCG.

However, it should be understood that the SCG resumption is not possible if the MCG is suspended and if the MCG is not to be resumed.

In some first exemplifying embodiments, the transmitted indication indicates, to the UE 120, to keep the SCG suspended and to resume the MCG.

In some second exemplifying embodiments, the transmitted indication indicates, to the UE 120, to resume the SCG and to resume the MCG.

In some third exemplifying embodiments, the transmitted indication indicates, to the UE 120, to resume the SCG and the MCG.

In some fourth exemplifying embodiments, when the MN 110 has sent an SN addition request to the SN 111 and has received the SCG from the SN 111 as described above in Actions 1202 and 1203, the transmitted indication may also indicate, to the UE 120, to set up the SCG and to keep it suspended.

In some alternative fourth exemplifying embodiments, the transmitted indication indicates, to the UE 120, to resume the suspended SCG.

In some fifth exemplifying embodiments, the transmitted indication indicates, to the UE 120, to suspend the SCG and to keep the MCG active.

In some sixth exemplifying embodiments, the transmitted indication indicates, to the UE 120, to resume the suspended SCG and to keep the MCG active.

It should be understood that the MN 110 may transmit the indication in several ways. For example, the MN 110 may transmit the indication as a separate message or the indication may be comprised in a message by setting a flag to indicate whether or not the SCG should be resumed or kept suspended.

Action 1208

The MN 110 transmits, to the SN 111, an indication indicating the first operation relating to the suspension or the resumption of the SCG.

Thereby, the SN 111 will be informed about the decision taken by the MN 110 and about what action the UE 120 should take regarding the SCG.

Figure 13:
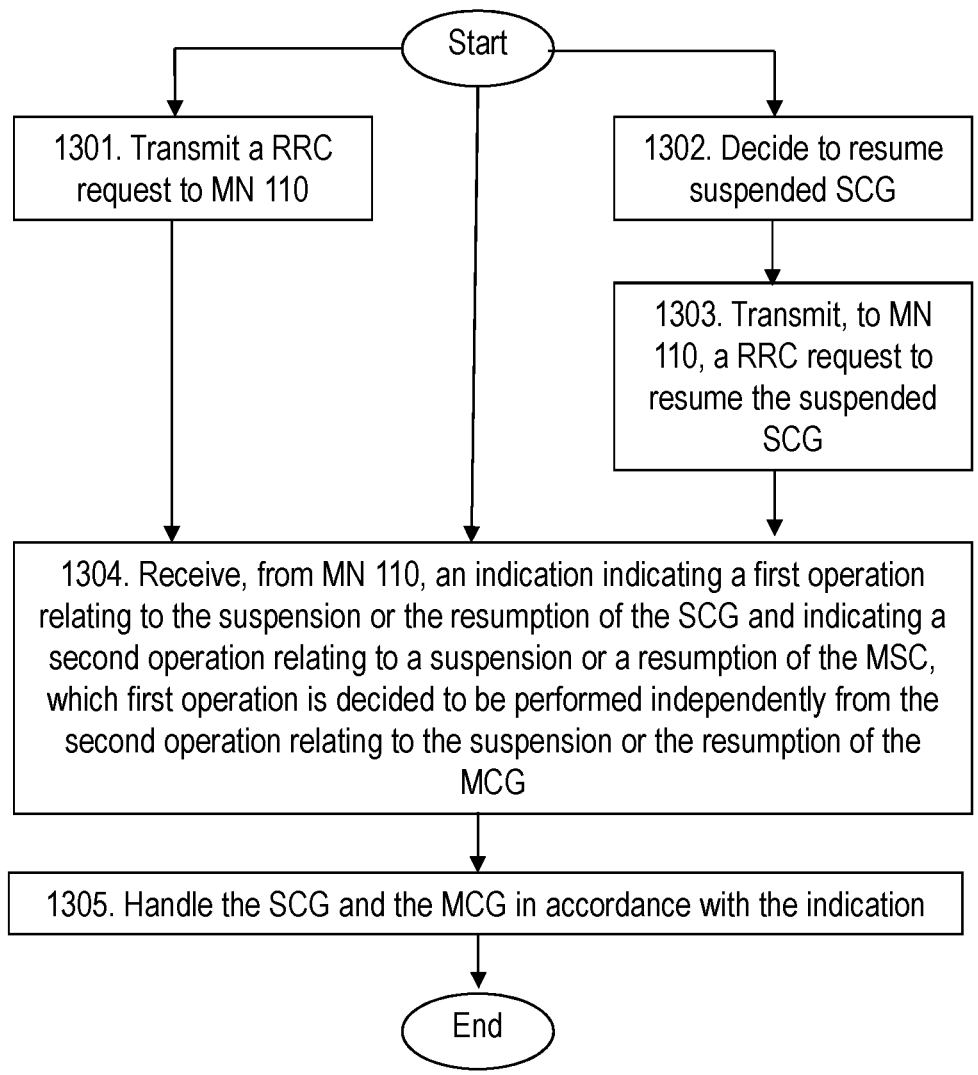
FIG. 13 is a flowchart depicting embodiments of a method in a UE.

FIG. 13 shows example embodiments of a method performed by the UE 120 for handling of a SCG. The UE 120 is operable in a dual connectivity mode with the MN 110 and the SN 111 operating in the wireless communication network 100. An MCG is associated with the MN 110 and the SCG is associated with the SN 111.

The method comprises one or more out of the following actions, which actions may be taken in any suitable order. Further, one or more actions may be combined.

A general embodiment relates to Actions 1304-1305 below, and further exemplifying embodiments relate to one or more of Actions 1301-1303 in combination with Actions 1304-1305.

Action 1301

In some embodiments, e.g. in some first and second exemplifying embodiments mentioned above, when the UE 120 is in an RRC_I NACTIVE state with both the SCG and the MCG suspended, the UE 120 transmits an RRC resume request to the MN 110.

Action 1302

In some embodiments, e.g. in some third exemplifying embodiments mentioned above, when the UE 120 is in an RRC_I NACTIVE state with both the SCG and the MCG suspended, the UE 120 may decide to resume the SCG.

Action 1303

In some third exemplifying embodiments, when the UE 120 has decided to resume the SCG, the UE 120 may transmit, to the MN 110, an RRC resume request comprising an indication to resume the SCG.

Action 1304

The UE 120 receives, from the MN 110, an indication indicating an operation relating to a suspension or a resumption of the SCG and indicating a second operation relating to a suspension or a resumption of the MCG. The first operation is decided to be performed independently from the second operation relating to the suspension or the resumption of the MCG.

However, it should be understood that the SCG resumption is not possible if the MCG is suspended and if the MCG is not to be resumed.

In some embodiments, e.g. in some first and second exemplifying embodiments mentioned above, the indication received by the UE 120 in response to the transmitted RRC resume request, cf. Action 1301 above, may indicates, to the UE 120, to keep the SCG suspended and to resume the MCG. Alternatively, the received indication may indicate, to the UE 120, to resume both the SCG and the MCG.

In some embodiments, e.g. in some third exemplifying embodiments described above, and in response to the transmitted RRC resume request comprising the indication to resume the SCG, the received indication indicates, to the UE 120, to resume the SCG and the MCG.

In some embodiments, e.g. in some fourth exemplifying embodiments described above, the received indication indicates, to the UE 120, to set up the SCG and to keep it suspended.

In some embodiments, e.g. in some alternative fourth exemplifying embodiments described above, the received indication indicates, to the UE 120, to resume the suspended SCG.

In some embodiments, e.g. in some fifth exemplifying embodiments described above, when the UE 120 is in an RRC_CONNECTED state with both the SCG and the MCG active, the received indication may indicate, to the UE 120, to suspend the SCG and to keep the MCG active.

In some embodiments, e.g. in some sixth exemplifying embodiments described above, when the UE 120 is in an RRC_CONNECTED state with the MCG active and the SCG suspended, the received indication indicates, to the UE 120, to resume the suspended SCG.

Action 1305

The UE 120 handles the SCG and the MCG in accordance with the received indication.

Figure 14:
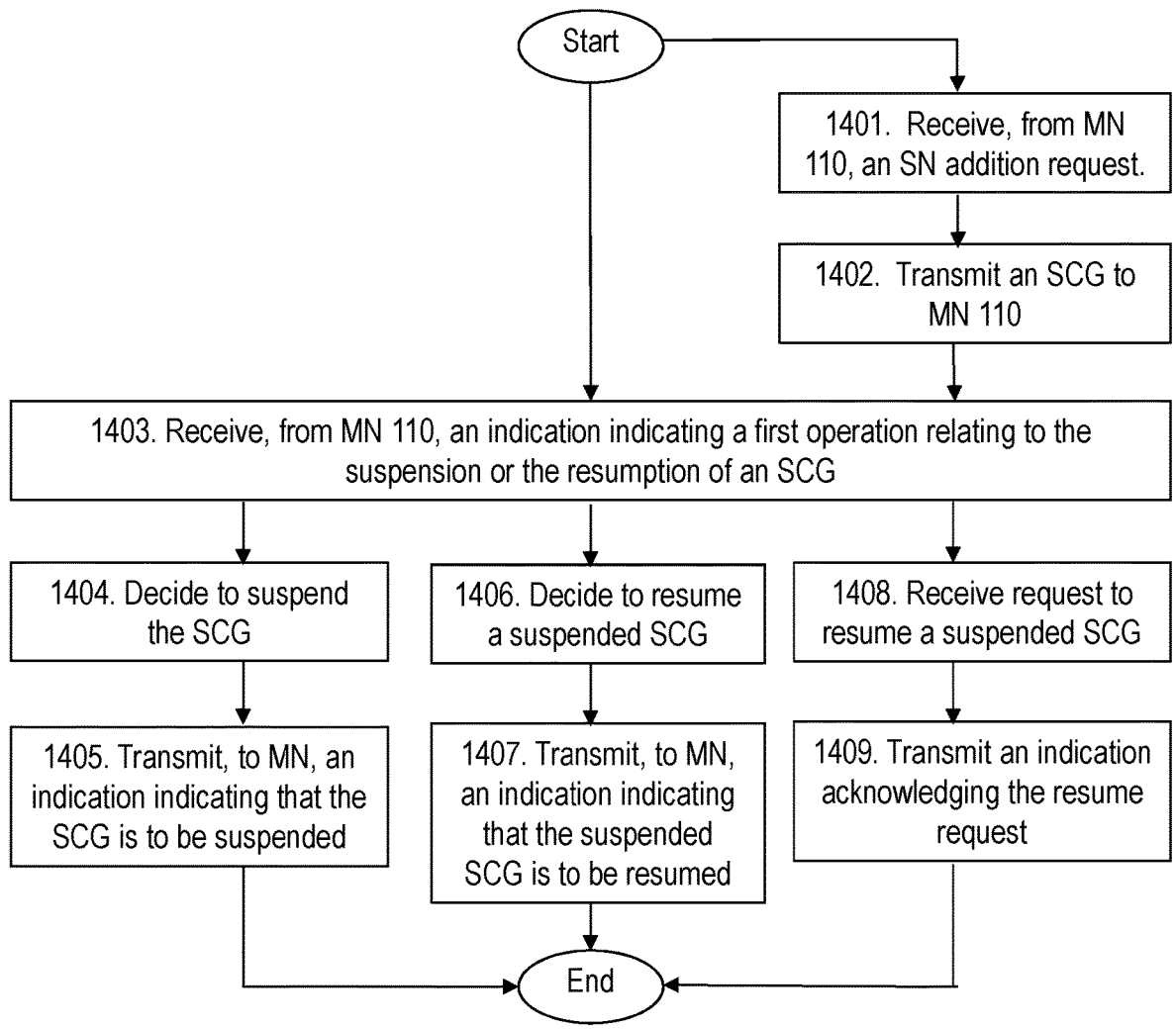
FIG. 14 is a flowchart depicting embodiments of a method in a SN.

FIG. 14 shows example embodiments of a method performed by the MN 110 for assisting the MN 110 in handling of a SCG for the UE 120 operable in a dual connectivity mode with the MN 110 and the SN 111 operating in the wireless communication network 100. An MCG is associated with the MN 110 and the SCG is associated with the SN 111.

The method comprises one or more out of the following actions, which actions may be taken in any suitable order. Further, one or more actions may be combined.

A general embodiment relates to Action 1403 in combination with one or more out of Actions 1401-1402 and 1404-1409.

Action 1401

In some embodiments, e.g. in some fourth exemplifying embodiments described above, the SN 111 receives, from the MN 110, an SN addition request to initiate dual connectivity.

Action 1402

In some embodiments, e.g. in some fourth exemplifying embodiments described above, when in receipt of the SN addition request as mentioned in Action 1401, the SN 111 transmits the SCG to the MN 110.

Action 1403

The SN 111 receives, from the MN 110, an indication indicating an operation relating to a suspension or a resumption of the SCG.

Action 1404

In some embodiments, e.g. in some fifth exemplifying embodiments described above, and when in receipt of the indication from the MN 110 as described in Action 1403 above, the SN 111 decides to suspend the SCG of the UE 120 that is in an RRC_CONNECTED state with both the SCG and the MCG active.

Action 1405

In some embodiments, and when the SN 111 has decided to suspend the SCG as described in Action 1404, the SN 111 transmits, to the MN 110, an indication that the SCG of the UE 120 is to be suspended.

Action 1406

In some embodiments, e.g. in some sixth exemplifying embodiments described above, and when in receipt of the indication from the MN 110 as described in Action 1403 above, the SN 111 decides to resume a suspended SCG of the UE 120 that is in an RRC_CONNECTED state with the MCG active and the SCG suspended.

Action 1407

In some embodiments, and when the SN 111 has decided to resume the suspended SCG as described in Action 1406, the SN 111 transmits, to the MN 110, an indication to resume the suspended SCG of the UE 120.

Action 1408

In some embodiments, the SN 111 receives a request to resume a suspended SCG. The request may be transmitted from any of the network nodes operating the communications network 100, and thus the request may be received from the MN 110, the UE 120 or from another SN.

Action 1409

In some embodiments, and when the SN 111 has received the request to resume the suspended SCG as described in Action 1408, the SN 111 transmits an indication acknowledging the resume request. The indication acknowledging the resume request is transmitted to the network nodes sending the request.

1.1. Suspend and/or Resume Operations for the SCG 1.1.1. Overall Behavior

To achieve suspending and/or resuming operations for the SCG configuration only, the network (NVV) 100, e.g. the MN 110, should be able to:

When the UE 120 transitions from an RRC INACTIVE state to an RRC_CONNECTED state, send an indication of whether or not the SCG should be resumed, released or kept suspended. The NW, e.g. the MN 110, should be able to transmit the indication to the UE 120 and to the SN 111.

While the UE 120 is in an RRC_CONNECTED state, send an indication of whether or not the SCG should be suspended, i.e. deactivated, released or resumed, i.e. activated if previously suspended, i.e. deactivated. The NW 100, e.g. by means of the MN 110, should be able to transmit the indication to the UE 120 and to the SN 111.

The behavior may be further enhanced to account for the possibility to apply RRC reconfiguration messages concerning the SCG even when the SCG configurations are suspended. For instance, this may be done while the UE 120 is in the RRC_CONNECTED state or when the UE 120 resumes from the RRC_INACTIVE state to the RRC_CONNECTED state so that the SCG configurations are modified without resuming them. It should be noted that since an RRC reconfiguration message may comprise the setup of a new configuration, e.g. establish a radio bearer, the described enhancement implies that the NW, e.g. the MN 110, would be able to not only modify, e.g. release suspended SCG configurations, but also setup new configurations that should be kept as suspended. In this manner, the described enhancement also enables early SCG configuration for SN addition/change procedures.

Examples of the overall behavior between the NW 100, e.g. by means of the MN 110, and the UE 120 is depicted below for different cases of resume or suspend of the SCG.

1.1.2. SCG Resume from an RRC_INACTIVE State

In some embodiments, if the UE 120 being in an RRC_CONNECTED state and configured with both MCG and SCG configurations, is suspended to an RRC_INACTIVE state it shall suspend both the MCG and SCG configurations. When the UE 120 resumes the connection in either the same cell as before or in a different cell, the network 100, e.g. the MN 110, may decide whether the UE 120 should also resume, release or maintain the suspended SCG configurations. In the following sections, different embodiments for how to decide what to do will be described.

Figure 15:
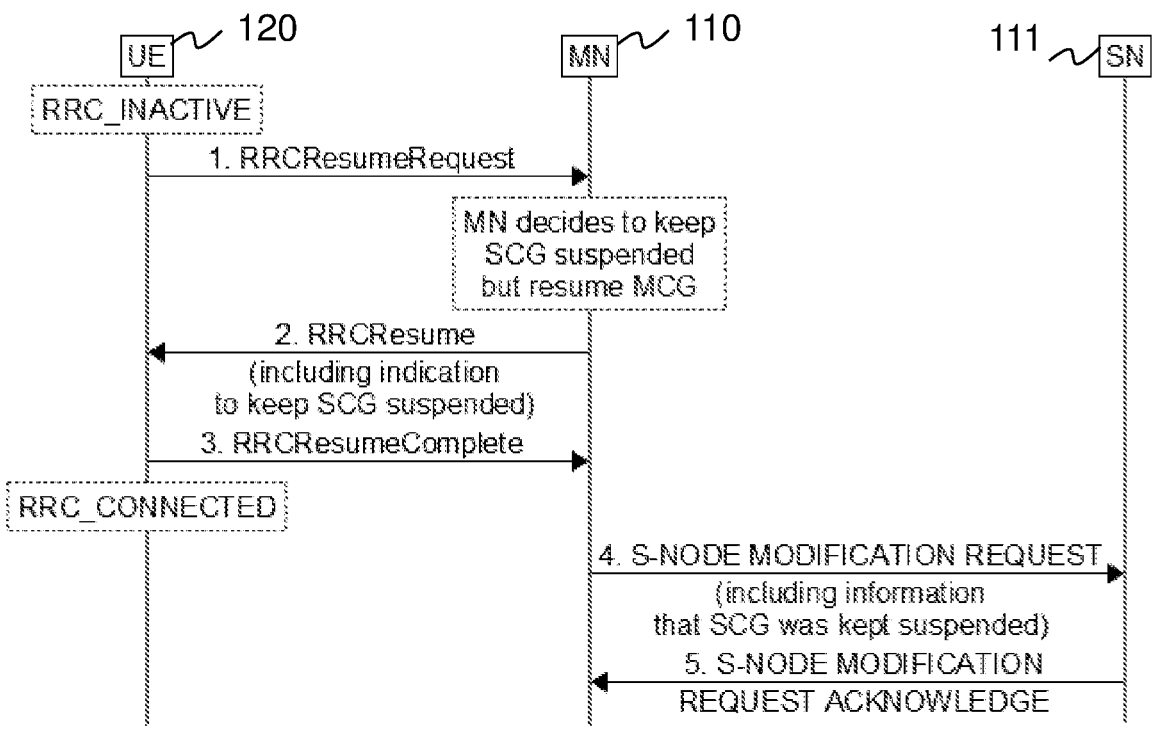
FIG. 15 schematically illustrates a combined block diagram and flowchart illustrating exemplifying signaling in a communications system for RRC Resume from an RRC_INACTIVE state while maintaining suspended SCG configurations.

1.1.2.1. Network Initiated RRC Resume from an RRC INACTIVE State while Maintaining Suspended SCG Configurations FIG. 15 schematically illustrates a combined block diagram and flowchart illustrating exemplifying signaling in a communications system for RRC Resume from an RRC_INACTIVE state while maintaining suspended SCG configurations.

In some embodiments, the UE 120 in an RRC_INACTIVE state with both suspended MCG and SCG configurations initiates an RRC Resume procedure e.g. due to UL data, arrival, RNA update, voice call, emergency call, or paging from the network 100. Cf. Action 1.

The target node, e.g. the MN 110, may decide that the UE 120 should not immediately resume the SCG. This could e.g. be because:

The target node, e.g. the MN 110, is unaware of the signal quality to the SN 111, e.g. due to long inactivity time, or that the UE 120 has moved during the RRC_INACTIVE state.

Pending UE traffic, i.e. UL traffic and/or DL traffic, is small and may be fully served by the MCG until the need for the SCG arises. This would also apply in case of a voice call or an emergency call where the traffic would only be carried by the MCG bearer anyway.

In Action 2, the network 100, e.g. the MN 110, responds to the UE 120 e.g. with an RRCResume message with an indication to suspend the SCG (i.e. to keep the SCG suspended). It should be understood that this indication to suspend the SCG may also be signalled as the absence of an indication to resume the SCG. In Action 3, the UE 120 transmits an RRCResumeComplete message to the MN 110 and enters into the RRC_CONNECTED state.

Additionally, as an optional action 4, the network 100, e.g. the MN 110, may notify the SN 111, 112 that the UE 120 is now in the RRC_CONNECTED state, but the SCG was kept suspended. From the SN perspective the UE 120 may be in a condition similar to the RRC_INACTIVE sate even though in practice there may be a single state for the UE 120. With the indication that the UE 120 is in the RRC_CONNECTED state, but the SCG was kept suspended, the SN 111, 112 may e.g. decide to move QoS flows to the MN 110. In Action 5, the SN 111 may transmit an acknowledgement of the S-NODE MODIFICATION REQUEST.

Figure 16:
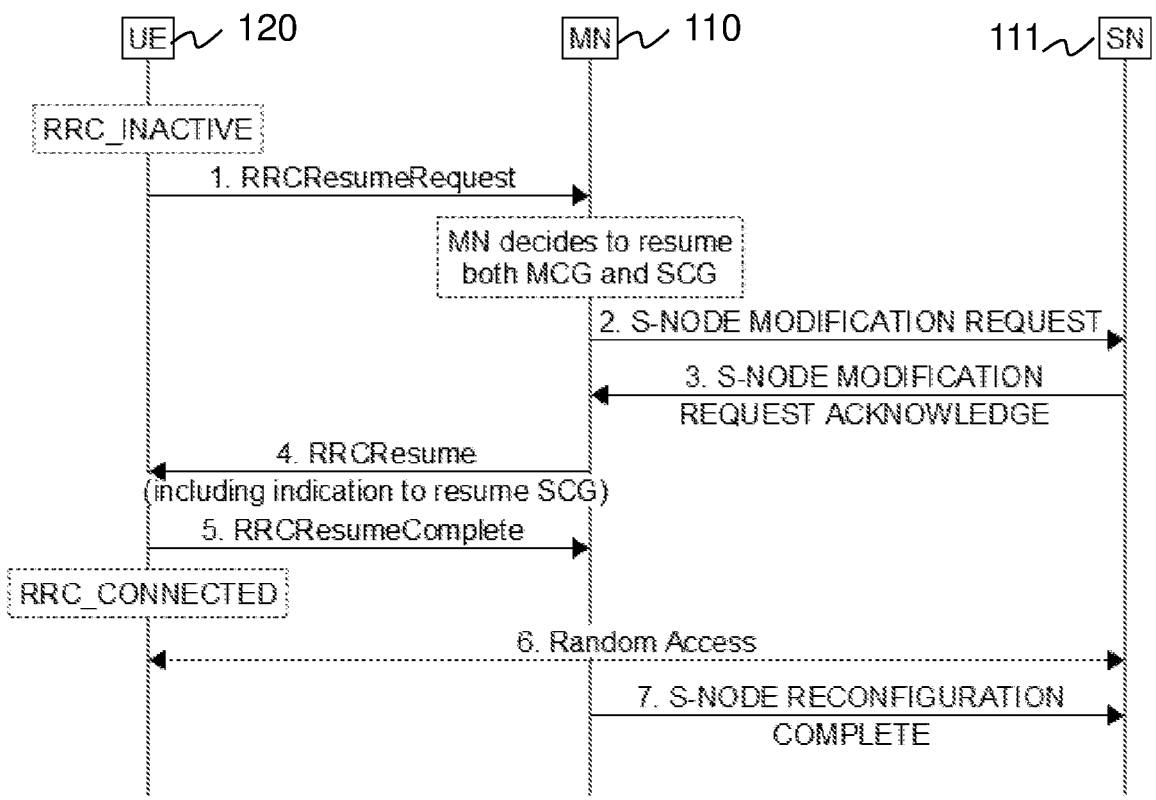
FIG. 16 schematically illustrates a combined block diagram and flowchart illustrating exemplifying signaling in a communications system for RRC Resume from an RRC_INACTIVE with resuming both MCG and SCG configurations.

1.1.2.2. Network Initiated RRC Resume from an RRC INACTIVE State Including Resuming SCG Configurations FIG. 16 schematically illustrates a combined block diagram and flowchart illustrating exemplifying signaling in a communications system for RRC Resume from an RRC_INACTIVE with resuming both MCG and SCG configurations.

In some embodiments, a UE 120 in RRC_INACTIVE with both suspended MCG and SCG configurations initiate an RRC Resume procedure, by transmitting an RRCResumeRequest to the MN 110, cf. Action 1.

When the target node, e.g. the MN 110, receives the resume request from the UE 120, it may decide that the SCG configurations are still valid and that the UE 120 shall resume them. This may e.g. be because:

The UE 120 has recently been suspended to the RRC_INACTIVE state, when a large DL data arrives in the node, e.g. the SN 111. This may e.g. happen during web browsing, where the UE 120 would occasionally download small packets, e. g.web pages, with fairly long intermittent inactive periods. During these inactive periods, the UE 120 may go to the RRC_INACTIVE state, to be resumed once a new web page is to be loaded. If the UE 120 initiates a large file download during the web browsing, this may be initiated shortly after the UE 120 has entered the RRC_INACTIVE state. Same logic applies to video streaming, it is unpredictable when the UE 120 will request new streaming content.

The UE 120 has provided measurements of the SCG, providing the network 100, e.g. the MN 110, an opportunity to assess the quality of the SCG.

Since the network 100, e.g. the MN 110, has suspended the SCG, the target node, e.g. the MN 110, must inform the SN 111 that it should resume the transmission using inter-node messages e.g. S-NODE MODIFICATION REQUEST. This is done in Action 2 nd in Action 3 the SN 111 acknowledge the request by transmitting e.g. an S-NODE MODIFICATION REQUEST ACKNOWLEDGEMENT.

In Action 4, the MN 110 transmits an RRCResume to the UE 120. In the RRCResume message, the UE 120 may receive an indication that the SCG should be resumed. This indication to resume the SCG may also be signalled as the absence of an indication to suspend the SCG. In Action 5, the UE 120 may transmit the RRCResumeComplete message to the MN 110. The MN 110 may in turn forward it to the SN 111, 112 by an inter-node message such as an S-NODE RECONFIGURATION COMPLETE message, and perform a Random Access to the SN 111, 112, if configured with lower layer SCG resources, cf. Actions 6 and 7. The successful Random Access procedure towards the SCG is not required for a successful completion of the RRC Connection Reconfiguration procedure.

It should be noted that the resumption of the MCG and the SCG in the same procedure is part of the previously discussed background section. However, the background features a case where, if the network 100, e.g. the MN 110, decides to resume the UE 120 with the MCG, the SCG is either released or resumed—no possibility to resume SCG only. However, embodiments disclosed herein enable the MN 110 to decide upon resuming the SCG.

NOTE: Unless stated otherwise in this disclosure, the explanation of each action in FIG. 15 is also valid for the other cases depicted henceforth.

1.1.2.3. UE Initiated SCG Resume from RRC INACTIVE

In some embodiments, the UE 120 upon initiating RRC Resume has detected that the stored SCG configurations are still valid. The UE 120 may for example detect this through configured INACTIVE mode measurements of neighboring cells or through location positioning determining that the UE 120 has not moved since it was suspended. Regardless of how the UE 120 determines that the SCG may still be in good signal quality, the UE 120 notifies the network 100, e.g. the MN 110, during the RRC Resume that it wants to resume also the SCG. This decision by the UE 120 may also be influenced by what the reason for the resumption is. If the UE 120 has significant UL data waiting or is paged by the network 100, e.g. the MN 110, with an indication that the SCG should be resumed. On the other hand, if the UE 120 initiates a voice call, or performs an RNA update, there may be little benefit to resume the SCG as this will not primarily be used. In other words, it would make sense to utilize the SCG if there is a data aggregation and/or latency benefits or if a service is only provided by the SN/SCG.

The indication from the UE 120 to resume the SCG may be provided in either:

Random Access Preamble: A new RA Preamble is introduced which indicates that the SCG should be resumed;

RRCResumeRequest: A new RRCResumeRequest message is introduced which includes an indication that the SCG should be resumed. Since Msg.3 is size limited, the current structure of the RRCResumeRequest is not possible to modify. However, the introduction of RRCResumeRequestl, which is transmitted on a different logical channel CCCH1 and has a larger size, enables introduction of a new indication. Alternatively, a new message/indication may be introduced for that one as well; or a new cause value may be defined for when the UE 120 requests for the resumption of SCG, by using the resumeCause field present in RRCResumeRequest message (an example for this case is show in section 1.1.5 below).

RRCResumeComplete: Since this message is transmitted after verification of the UE identity, it allows for unbounded message sizes and may easily be extended to include a new indication to resume the SCG.

Figure 17:
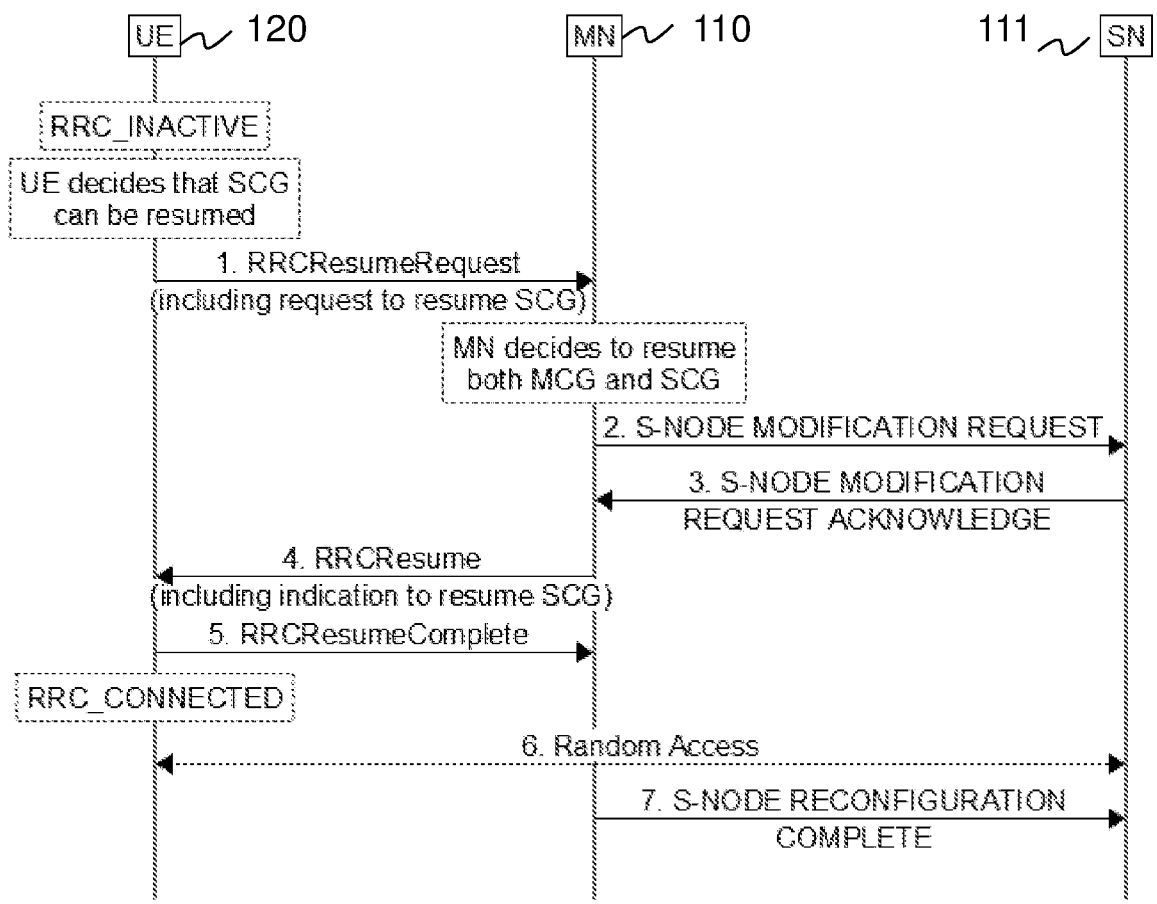
FIG. 17 schematically illustrates a combined block diagram and flowchart illustrating exemplifying signaling in a communications system for RRC Resume from an RRC_INACTIVE where the UE request SCG resume in RRCResumeRequest.
Figure 18:
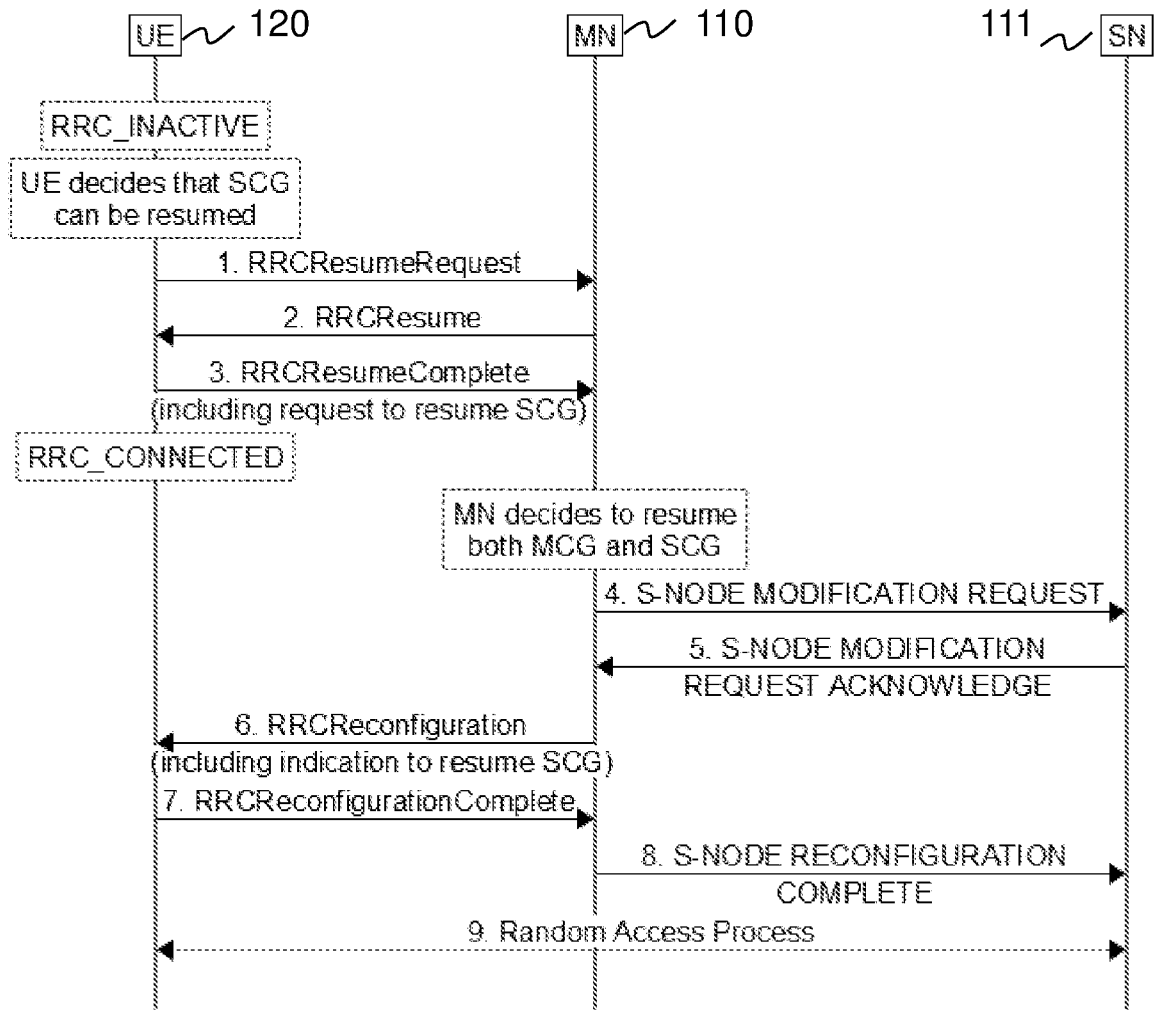
FIG. 18 schematically illustrates a combined block diagram and flowchart illustrating exemplifying signaling in a communications system for RRC Resume from RRC_INACTIVE where the UE request SCG resume in RRCResumeComplete.

In FIGS. 17 and 18 the scenario where the UE 120 indicates to resume the SCG in RRCResumeRequest and in RRCResumeComplete messages, respectively. The main difference is that in case the request to resume the SCG is included in the RRCResumeComplete message, the network 100, e.g. the MN 110, must transmit a new RRCReconfiguration message to the UE 120 to indicate that it shall resume the SCG.

FIG. 17 schematically illustrates a combined block diagram and flowchart illustrating exemplifying signaling in a communications system for RRC Resume from an RRC_INACTIVE where the UE request SCG resume in RRCResumeRequest.

FIG. 18 schematically illustrates a combined block diagram and flowchart illustrating exemplifying signaling in a communications system for RRC Resume from RRC_INACTIVE where the UE request SCG resume in RRCResumeComplete.

1.1.3. SCG Suspend/Resume from an RRC_CONNECTED State

In some embodiments, the UE 120 in an RRC_CONNECTED state configured with both the MCG and SCG configurations may suspend the SCG configurations and transmission, and later resume the SCG configurations and transmission with minimal signaling. In the following sections different alternatives how this may be achieved will be described.

1.1.3.1. SN Initiated Resume/Suspend Request

In some embodiments, the UE 120 is configured with both MCG and SCG while in the RRC_CONNECTED state.

At some point, the SN 111,112 decides that the SCG should be suspended. This may for example be because:

Measurement reports indicate that the signal quality of the SCG is intermittently degraded, and instead of releasing or changing to another SN, the SN decides that the SCG should be suspended until the degradation has recovered;

SN 111, 112 notices that the radio bearers terminating in the SN 111 have not transmitted and/or received any data for some time and the SN 111 decides that the UE 120 may suspend the SCG to save battery by not monitoring the SCG until needed.

Figure 19:
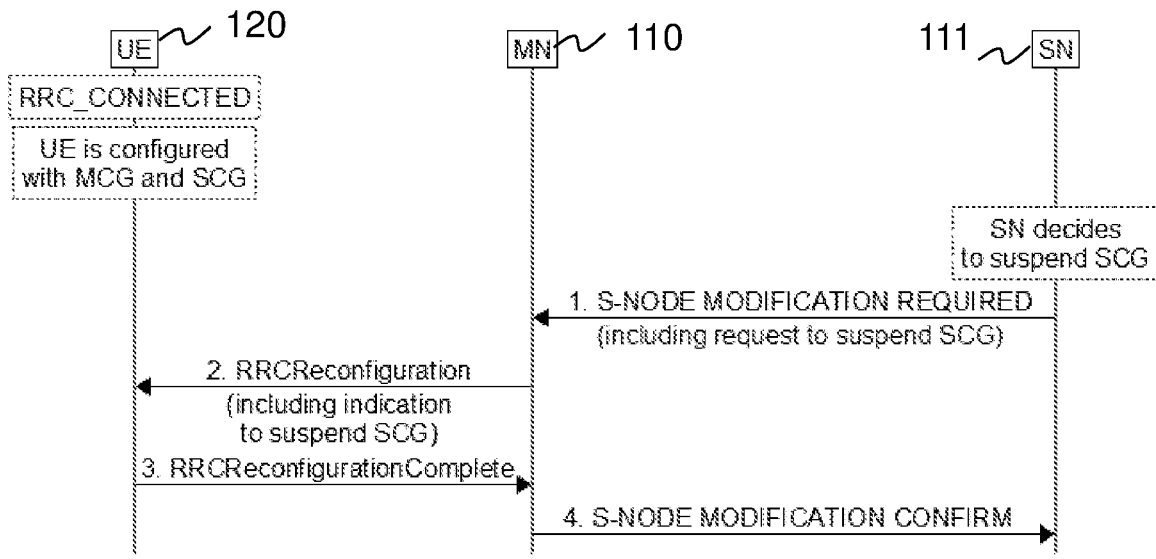
FIG. 19 schematically illustrates a combined block diagram and flowchart illustrating exemplifying signaling in a communications system for SN initiated suspension of the SCG for a UE 120 in the RRC_CONNECTED state.

The SN 111 then sends a message to the MN 110, e.g. an S-NODE MODIFICATION REQUIRED message indicating that the SCG should be suspended and the MN 110 sends a message e.g. an RRCReconfiguration message to the UE 120 indicating that the SCG shall be suspended. If RRCReconfigurationComplete message is received, the MN 110 then sends a confirmation to the SN 111, using e.g. S-NODE MODIFICATION CONFIRM. This is schematically illustrated in e.g. Actions 1-4 of FIG. 19. FIG. 19 schematically illustrates a combined block diagram and flowchart illustrating exemplifying signaling in a communications system for SN initiated suspension of the SCG for a UE 120 in the RRC_CONNECTED state.

Figure 20:
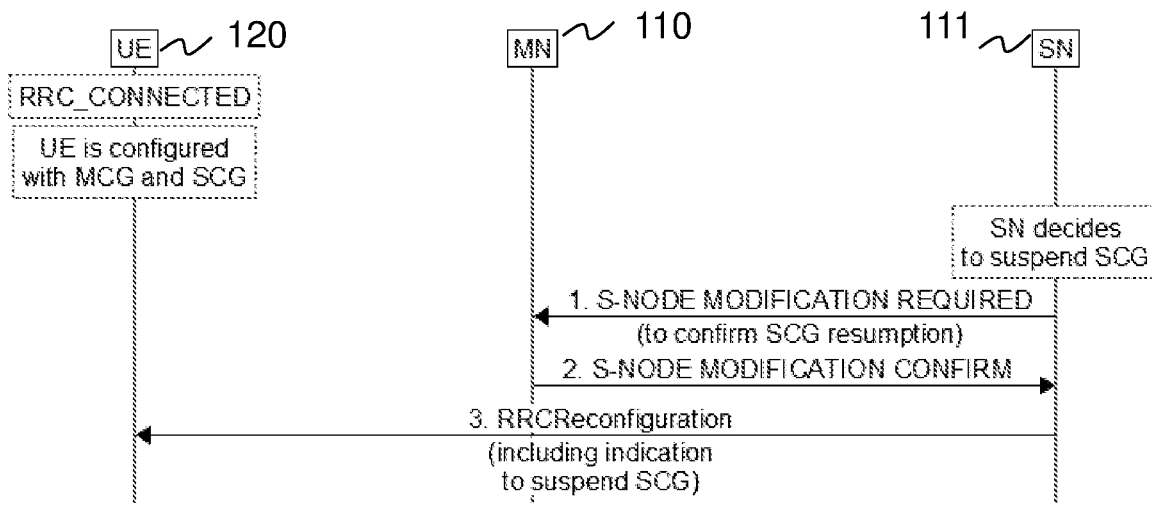
FIG. 20 schematically illustrates a combined block diagram and flowchart illustrating exemplifying signaling in a communications system for SN initiated suspension of the SCG for a UE 120 in the RRC_CONNECTED state.

In some embodiments, the SN 111 may send an indication to suspend SCG directly to the UE 120, via SRB3, if available/applicable. In this case, the SN 111 informs the MN 110 that it would suspend SCG, using e.g. S-NODE MODIFICATION REQUIRED. The MN 110 may reject the suspension if, for instance, it decides to move more QoS flows to the SN 111. If the MN 110 accepts the suspension, e.g., by sending an S-NODE MODIFICATION CONFIRM, the SN 111 sends an RRCReconfiguration message to the UE 120 via SRB3, indicating to the UE to suspend the SCG. This is schematically illustrated in e.g. Actions 1-3 of FIG. 19. FIG. 20 schematically illustrates a combined block diagram and flowchart illustrating exemplifying signaling in a communications system for SN initiated suspension of the SCG for a UE 120 in the RRC_CONNECTED state.

In some embodiments, after the UE 120 has received an indication to suspend the SCG and has suspended the SCG, the SN 111 may determine that the UE 120 should resume the SCG. This may for example be because DL data has arrived for suspended bearers terminating in the SCG.

Figure 21:
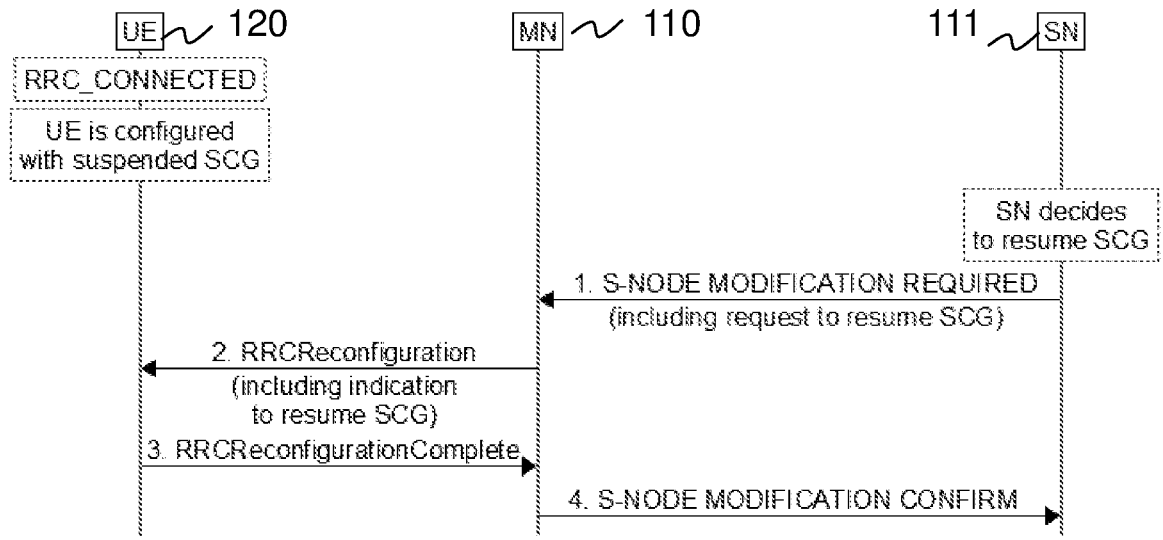
FIG. 21 schematically illustrates a combined block diagram and flowchart illustrating exemplifying signaling in a communications system for SN initiated resumption of the SCG for the UE 120 in the RRC_CONNECTED state.

The SN 111 may then send a message to the MN 110 indicating that the SCG should be resumed and the MN 110 sends a message to the UE 120 indicating that the SCG shall be resumed. This is schematically illustrated in e.g. Actions 1-4 of FIG. 21. FIG. 21 schematically illustrates a combined block diagram and flowchart illustrating exemplifying signaling in a communications system for SN initiated resumption of the SCG for the UE 120 in the RRC_CONNECTED state.

Figure 22:
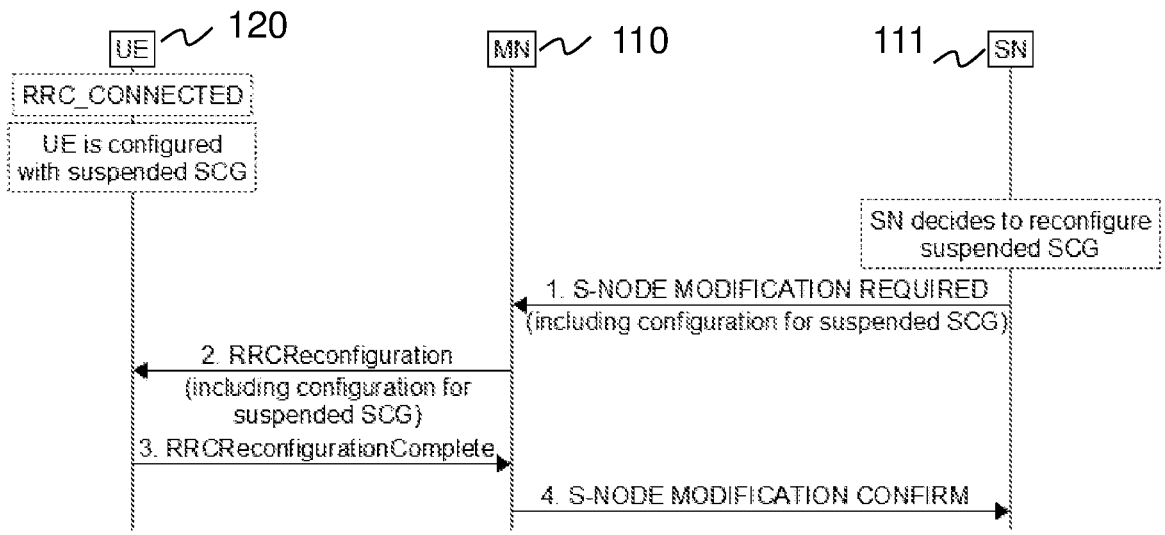
FIG. 22 schematically illustrates a combined block diagram and flowchart illustrating exemplifying signaling in a communications system for SN initiated reconfiguration of suspended SCG for the UE 120 in the RRC_CONNECTED state.

In some embodiments, the SN 111 may determine that the stored suspended SCG configurations need to be modified. This may e.g. be because: the MN 110 decides to move currently inactive QoS flows to the SN 111 or move bearers in case of EN-DC, or the SN 111 receives an indication from CN that a PDU session or a QoS flow should be released. After the UE 120 has received the modified reconfigurations of the SCG, the UE 120 may not need to maintain the former configurations but the new ones. In some embodiments, the UE 120 may release the suspended SCG configurations and optionally replace it with a new configuration, e.g. if the SCG may no longer keep the earlier resources reserved. This is schematically illustrated in e.g. Actions 1-4 of FIG. 22. FIG. 22 schematically illustrates a combined block diagram and flowchart illustrating exemplifying signaling in a communications system for SN initiated reconfiguration of suspended SCG for the UE 120 in the RRC_CONNECTED state.

1.1.3.2. MN Initiated Resume/Suspend Request

Figure 23:
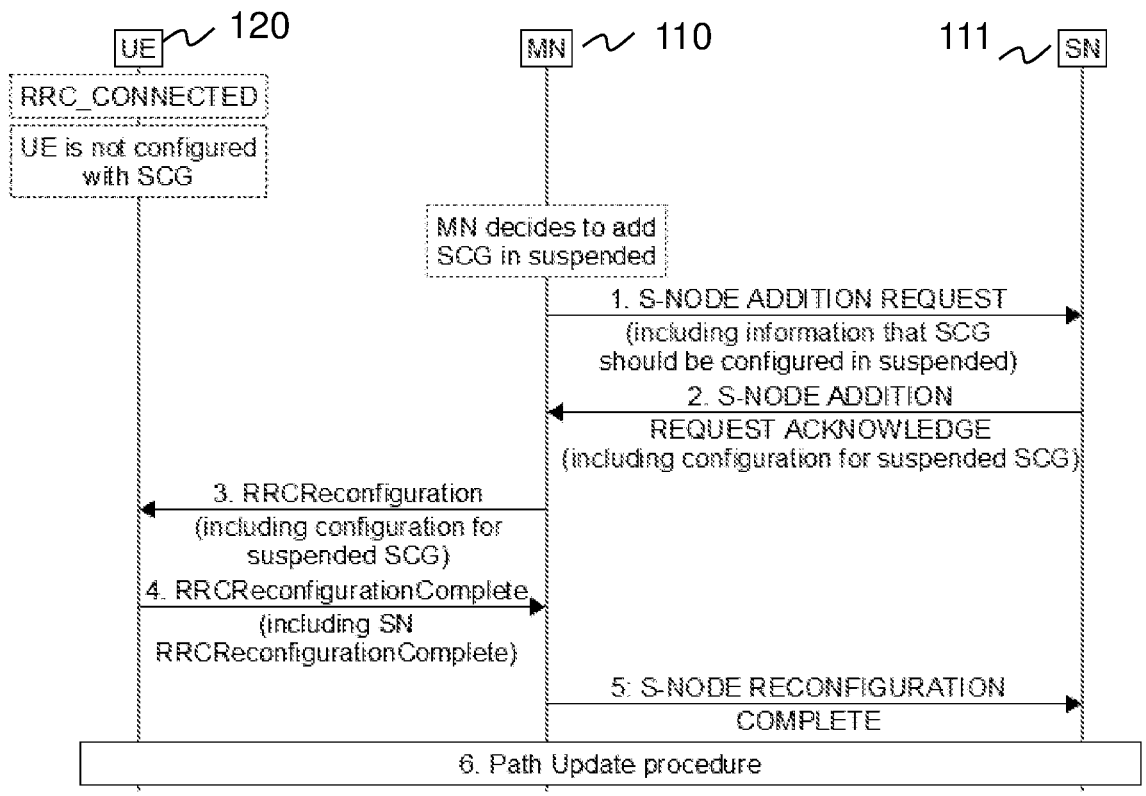
FIG. 23 schematically illustrates a combined block diagram and flowchart illustrating exemplifying signaling in a communications system for MN initiated addition of suspended SCG for a UE in the RRC_CONNECTED state.

FIG. 23 schematically illustrates a combined block diagram and flowchart illustrating exemplifying signaling in a communications system for MN initiated addition of suspended SCG for a UE in the RRC_CONNECTED state. In some embodiments, a UE 120 in an RRC_CONNECTED state is only configured with an MCG, and thus not with an SCG. At some point, the MN 110 may decide that the UE 120 shall add an SCG in a suspended state. This may be e.g. because:

- The UE 120 has reported measurements for a cell which fulfil some criteria. The current UE traffic does not require the bandwidth of both the MCG and the SCG, but the MN 110 decides to pre-emptively add the SCG in case the traffic increases.
- The MN 110 and the SN 111 are co-located and have similar coverages. The MN 110 is aware that if the UE 120 has an MCG coverage, it will likely also have an SCG coverage and the MN 110 may pre-emptively configure a suspended SCG even if the current traffic load does not require both the MCG and the SCG.
- If role switch is supported (as discussed in e.g. 3GPP contribution R2-1817395), the MN 110 may decide to configure an SCG pre-emptively. If the UE 120 need2 to handover to the SN 111, the MN 110 may resume the SCG configurations and initiate the role switch. This will enable a faster handover with smaller handover messages.

In order for the MN 110 to configure the UE 120 with the suspended SCG, the MN 110 needs to communicate with the SN 111 to request for SN addition in suspended, using e.g. S-NODE ADDITION REQUEST, cf. Action 1. In Action 2, the SN 111 may respond e.g. with an S-NODE ADDITION REQUEST ACKNOWLEDGE, including the SCG configuration to be applied in suspended. In Action 3, the MN 110 transmits an RRCReconfiguration Request to the UE 120, and in Action 4, the UE 120 transmits and RRCConfigurationComplete message to the MN 110. In Action 5, the MN 110 transmits an S-NODE RECONFIGURATION complete message to the SN 111. Afterwards, in Action 6, a path update procedure as typically defined for SN addition procedure (as defined in section 10.2 from TS 37.340) should be performed, and also configure the UE 120 with the suspended SCG configurations.

Figure 24:
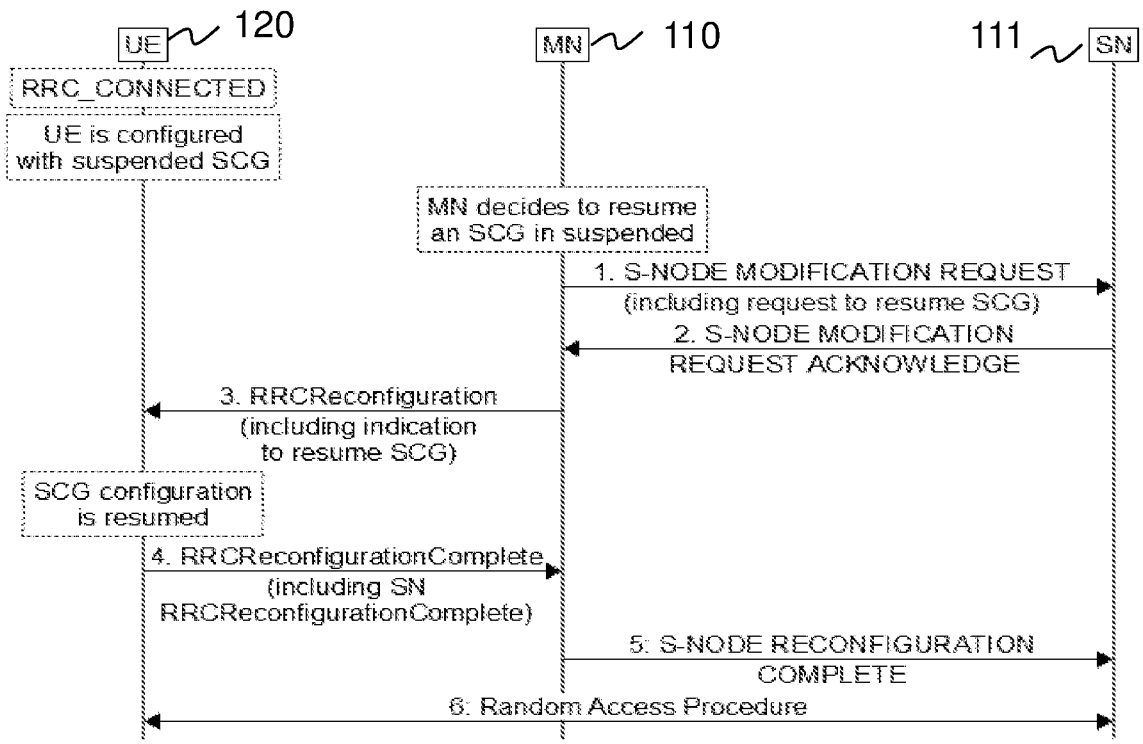
FIG. 24 schematically illustrates a combined block diagram and flowchart illustrating exemplifying signaling in a communications system for MN initiated resumption of suspended SCG for the UE 120 in the RRC_CONNECTED state.

FIG. 24 schematically illustrates a combined block diagram and flowchart illustrating exemplifying signaling in a communications system for MN initiated resumption of suspended SCG for the UE 120 in the RRC_CONNECTED state.

In some embodiments, a UE 120 in an RRC_CONNECTED state and configured with a suspended SCG configuration may be instructed to resume the SCG configurations. This may e.g. be because:

- The UL or DL traffic increases, requiring some traffic to be offloaded to the SN 111;
- The MN 110 receives a measurement report from the UE 120, indicating that the signal strength and/or signal quality of the MCG and/or the SCG fulfill one or more criteria.

The MN 110 sends a request to the SN 111 to resume SCG, using e.g. S-NODE MODIFICATION REQUEST, cf. Action 1. The SN 111, may reply with e.g. S-NODE MODIFICATION REQUEST ACKNOWLEDGE, which may comprise an RRCReconfiguration message to the UE 120, cf. Action 2. In Action 3, the MN 110 transmits an RRCReconfiguration Request to the UE 120, and in Action 4, the UE 120 may then transmit the RRCResumeComplete message to the MN 110, which in turn forwards it to the SN 111 by S-NODE RECONFIGURATION COMPLETE message, and performs a Random Access to the SN 111, if configured with lower layer SCG resources, cf. Actions 5 and 6. The successful Random Access procedure towards the SCG is not required for a successful completion of the RRC Connection Reconfiguration procedure.

In some embodiments, a UE 120 in the RRC_CONNECTED state and configured with a resumed SCG configuration may be instructed to suspend the SCG configurations. This may e.g. be because:

The configured TDM pattern have a small number of subframes allocated to SCG transmissions compared to MCG ones.

The target MN 110 is unaware of the signal quality to the SN 111, e.g. due to long inactivity time The MN 110 performs similar procedures as the ones defined for MN initiated resume request. It may also decide to reconfigure the TDM pattern while the SCG is suspended or it may be implicit UE behavior to consider all subframes configured for MCG and SCG transmissions to be available for MCG transmissions only, while the SCG is suspended. Another possibility is the reconfiguration of MCG and SCG maximum transmission power, while the SCG is suspended which may also be an implicit UE behavior.

1.1.3.3. UE Initiated Resume Request

In some embodiments, the UE 120 decides to request for the resumption of stored SCG configurations. This may e.g. be due to UL data arrival to an SCG terminated bearer.

The indication from the UE 120 to resume the SCG, in RRC_CONNECTED, may be related to the sending of the data volume, e.g. a Buffer Status Report (BSR), to the MN 110 with an indication that the BSR is related to the SN 111.

This indication from the UE 120 may also be provided in RRCResumeRequest: A new RRCResumeRequest message is introduced which comprises an indication that the SCG should be resumed. The current structure of the RRCResumeRequest is not possible to modify, however, with the introduction of RRCResumeRequest1, which is transmitted on a different logical channel CCCH1, has a larger size, which enables introduction of a new indication. Alternatively, a new message or an indication may be introduced for that one as well; or a new cause value may be defined for when the UE 120 requests for the resumption of the SCG, by using the resumeCause field present in RRCResumeRequest message (an example for this case is show in section 1.1.5 below).

Since the UE 120 is already in the RRC_CONNECTED state, this RRC Resume request does not need to be conveyed by SRB0, and thus may be conveyed by SRB1.

Figure 25:
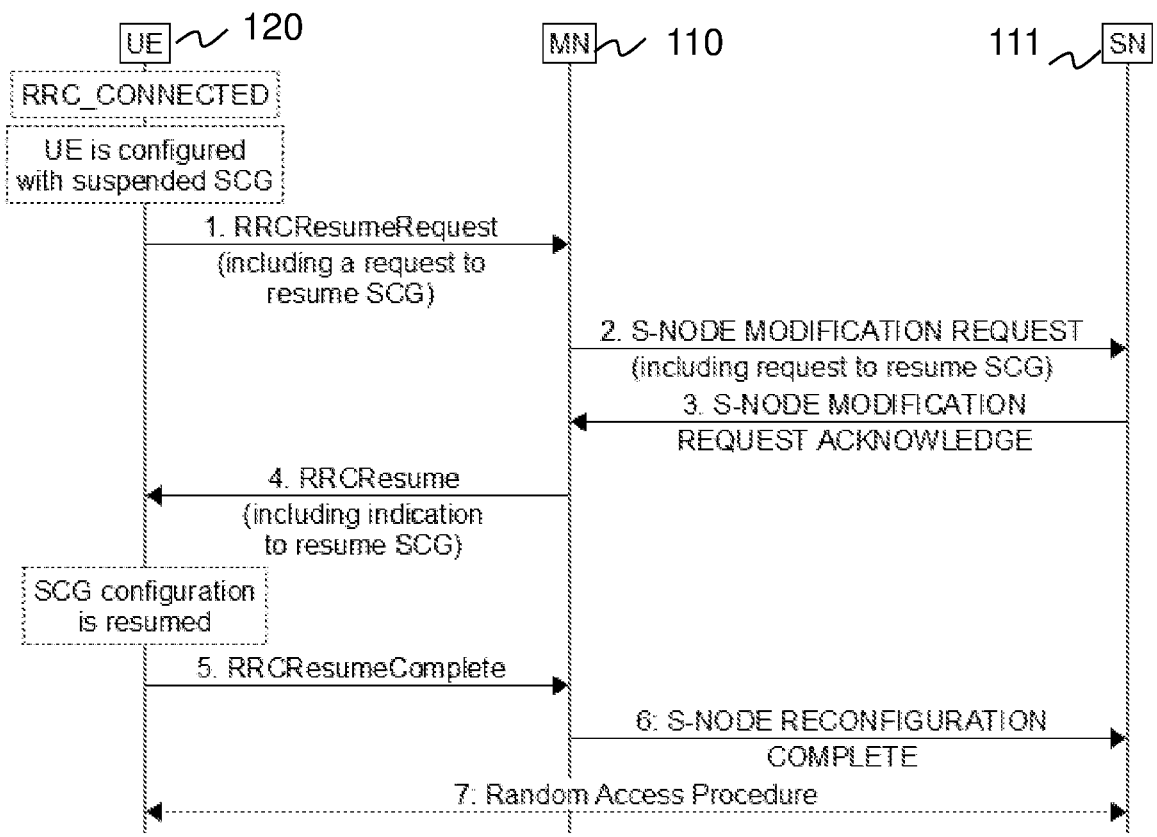
FIG. 25 schematically illustrates a combined block diagram and flowchart illustrating exemplifying signaling in a communications system for UE initiated resume request.

Following a request message to resume the SCG, the MN 110 may reject the request or release the SCG. However, the MN 110 may also accept the request and resume the SCG. Thus, it is depicted below the case where the MN 110 accepts to resume the SCG and follows similar procedures as described for MN initiated resumption of SCG, cf. section 1.1.3.2 above, with the difference that the messages exchanged by the UE 120 and MN 110 are not related to RRCReconfiguration message, but to RRCResumeRequest message, i.e., RRCResume and RRCResumeComplete message. This is schematically illustrated in FIG. 25. FIG. 25 schematically illustrates a combined block diagram and flowchart illustrating exemplifying signaling in a communications system for UE initiated resume request.

1.1.4 SCG Suspend from the RRC_CONNECTED State to the RRC_INACTIVE State

In some embodiments, a UE 120 in the RRC_CONNECTED state configured with both MCG and SCG configurations may receive an RRCRelease message from the network 100, e.g. from the MN 110, with suspendConfig field to transit to the RRC_INACTIVE state.

As the suspension of the MCG and the SCG in the same procedure is part of discussed background section, if SCG is resumed when RRCRelease message with suspendConfig was received, the behavior from background section applies. For the case when the SCG is suspended when the RRCRelease message with suspendConfig was received, the procedures to suspend the UE configurations would not affect the SCG configurations, since this one was already suspended. Alternatively, suspendConfig only applies to the MCG configurations, whereas a new indication for the SCG such as suspendConfigSCG or suspendSCG may refer to whether the SCG configuration is suspended or not. This indication may be incorporated into one or more of RRC Release, RRC resume and RRC re-configuration messages.

Alternatively, the UE 120 is configured with a suspended SCG configurations when it receives the RRCRelease message with suspendConfig, it releases the suspended SCG configurations and only maintains the suspended MCG configurations.

In either case, possible inter node messages to be used for coordination between the MN 110 and the SN 111 may be the same as the ones expected to be needed for the background section.

1.1.5 Modified Messages

An example of the possible message modifications (underlined in the excerpts below) in the TS 38.331 to account for the behaviour above is captured below. A similar modification may be performed for the TS 36.331 messages. Note, the new field is shown to be added to the Rel-15 extension RRCResume-v15xx. However, if the feature is included in a later release, the field would be included in a further extension of the message, e.g. RRCResume-v16xx.

| RRCResume message |
|---|
| -- ASN1START |
| -- TAG-RRCRESUME-START |
| RRCResume ::=                SEQUENCE { |
|    rrc-TransactionIdentifier     RRC-TransactionIdentifier, |
|    criticalExtensions            CHOICE { |
|       rrcResume                   RRCResume-IEs, |
|       criticalExtensionsFuture    SEQUENCE { } |
|    } |
| } |
| RRCResume-IEs ::=            SEQUENCE { |
|    radioBearerConfig            RadioBearerConfig |
| OPTIONAL, -- Need M |
|    masterCellGroup              OCTET STRING (CONTAINING |
| CellGroupConfig)                                 OPTIONAL, -- Need M |
|    measConfig                   MeasConfig |
| OPTIONAL, -- Need M |
|    fullConfig                   ENUMERATED {true} |
| OPTIONAL, -- Need N |
|    lateNonCriticalExtension     OCTET STRING |
| OPTIONAL, |
|    nonCriticalExtension         RRCResume-v15xx-IEs |
| OPTIONAL |
| } |
| RRCResume-v15xx-IEs ::=      SEQUENCE { |
|    radioBearerConfig2-r15x      OCTET STRING (CONTAINING |
| RadioBearerConfig)                               OPTIONAL, -- Need M |
|    sk-Counter-r15x              INTEGER (0..65535) |

| RRCResume message | |
|---|---|
| OPTIONAL, -- Need N | |
| mrdc-SecondaryCellGroup | CHOICE { |
| nr-SCG | OCTET STRING, |
| eutra-SCG | OCTET STRING |
| } | |
| OPTIONAL, -- Need M | |
| suspendSCG | ENUMERATED {true} |

| RRCResume message | |
|---|---|
| OPTIONAL, -- Need N | |
| nonCriticalExtension | SEQUENCE{ } |
| OPTIONAL | |
| } | |
| -- TAG-RRCRESUME-STOP | |
| -- ASN1STOP | |

| RRCReconfiguration message | |
|---|---|
| -- ASN1START | |
| -- TAG-RRCRECONFIGURATION-START | |
| RRCReconfiguration ::= | SEQUENCE { |
| rrc-TransactionIdentifier | RRC-TransactionIdentifier, |
| criticalExtensions | CHOICE { |
| rrcReconfiguration | RRCReconfiguration-IEs, |
| criticalExtensionsFuture | SEQUENCE { } |
| } | |
| } | |
| RRCReconfiguration-IEs ::= | SEQUENCE { |
| radioBearerConfig | RadioBearerConfig |
| OPTIONAL, -- Need M | |
| secondaryCellGroup | OCTET STRING (CONTAINING |
| CellGroupConfig) | OPTIONAL, -- Need M |
| measConfig | MeasConfig |
| OPTIONAL, -- Need M | |
| lateNonCriticalExtension | OCTET STRING |
| OPTIONAL, | |
| nonCriticalExtension | RRCReconfiguration- |
| v1530-IEs | OPTIONAL |
| } | |
| RRCReconfiguration-v1530-IEs ::= | SEQUENCE { |
| masterCellGroup | OCTET STRING (CONTAINING |
| CellGroupConfig) | OPTIONAL, -- Need M |
| fullConfig | ENUMERATED {true} |
| OPTIONAL, -- Cond FullConfig | |
| dedicatedNAS-MessageList | SEQUENCE |
| (SIZE(1..maxDRB)) OF DedicatedNAS-Message | OPTIONAL, -- |
| - Cond nonHO | |
| masterKeyUpdate | MasterKeyUpdate |
| OPTIONAL, -- Cond MasterKeyChange | |
| dedicatedSIB1-Delivery | OCTET STRING (CONTAINING |
| SIB1) | OPTIONAL, -- Need N |
| dedicatedSystemInformationDelivery | OCTET STRING (CONTAINING |
| SystemInformation) | OPTIONAL, -- Need N |
| otherConfig | OtherConfig |
| OPTIONAL, -- Need N | |
| nonCriticalExtension | RRCReconfiguration- |
| v15xy-IEs | |
| OPTIONAL | |
| } | |
| RRCReconfiguration-v15xy-IEs ::= | SEQUENCE { |
| mrdc-SecondaryCellGroup | CHOICE { |
| nr-SCG | OCTET STRING, |
| eutra-SCG | OCTET STRING |
| } | |
| OPTIONAL, -- Need M | |
| radioBearerConfig2 | OCTET STRING (CONTAINING |
| RadioBearerConfig) | OPTIONAL, -- Need M |
| sk-Counter | INTEGER (0..65535) |
| OPTIONAL, -- Cond S-KeyChange | |
| suspendSCG | ENUMERATED {true} |
| OPTIONAL, -- Need N | |
| nonCriticalExtension | SEQUENCE { } |

```
                    RRCReconfiguration message
OPTIONAL
    }
    MasterKeyUpdate ::=                         SEQUENCE {
        keySetChangeIndicator                   BOOLEAN,
        nextHopChainingCount                    NextHopChainingCount,
        nas-Container                           OCTET STRING
                        OPTIONAL,    -- Cond securityNASC
        ...
    }
-- TAG-RRCRECONFIGURATION-STOP
-- ASN1STOP
```

In both messages above, the suspendSCG field would give the possibility to inform whether the SCG should be suspended or resumed. For the RRCResume message, additional cell group configuration is enabled by the mrdc-SecondaryCellGroup (as contained in RRCReconfiguration message), in order to have the possibility to resume with a different SCG configuration (e.g. different PSCell, added and/or removed SCG SCells, etc.).

In some embodiments, the indication to suspend or resume the SCG is comprised in the CellGroupConfig as shown below:

CellGroupConfig

The CellGroupConfig IE is used to configure a Master Cell Group (MCG) or Secondary Cell Group (SCG). A cell group comprises one MAC entity, a set of logical channels with associated RLC entities and a primary cell (SPCell) and one or more secondary cells (SCells).

```
                                    CellGroupConfig information element
-- ASN1START
-- TAG-CELL-GROUP-CONFIG-START
-- Configuration of one Cell-Group:
CellGroupConfig ::=                             SEQUENCE {
    cellGroupId                                 CellGroupId,
    rlc-BearerToAddModList                      SEQUENCE
(SIZE(1..maxLC-ID)) OF RLC-BearerConfig                 OPTIONAL,  --
Need N
    rlc-BearerToReleaseList                     SEQUENCE
(SIZE(1..maxLC-ID)) OF LogicalChannelIdentity           OPTIONAL,  --
Need N
    mac-CellGroupConfig                         MAC-CellGroupConfig
OPTIONAL,    --Need M
    physicalCellGroupConfig
PhysicalCellGroupConfig                                 OPTIONAL,
-- Need M
    spCellConfig                                SpCellConfig
OPTIONAL,    -- Need M
    sCellToAddModList                           SEQUENCE (SIZE
(1..maxNrofSCells)) OF SCellConfig              OPTIONAL,  -- Need N
    sCellToReleaseList                          SEQUENCE (SIZE
(1..maxNrofSCells)) OF SCellIndex               OPTIONAL,  -- Need N
    ...,
    [[
    reportUplinkTxDirectCurrent-v1530           ENUMERATED {true}
OPTIONAL    -- Cond BWP-Reconfig
    ]]
    [[
    suspendSCG                                  ENUMERATED {true}
OPTIONAL    -- Cond SCG
    ]]
}
-- Serving cell specific MAC and PHY parameters for a SpCell:
SpCellConfig ::=                                SEQUENCE {
    servCellIndex                               ServCellIndex
OPTIONAL,    -- Cond SCG
    reconfigurationWithSync                     ReconfigurationWithSync
OPTIONAL, -- Cond ReconfWithSync
    rlf-TimersAndConstants                      SetupRelease { RLF-
TimersAndConstants }                                    OPTIONAL,  -- Need
M
    rlmInSyncOutOfSyncThreshold                 ENUMERATED {n1}
OPTIONAL,    -- Need S
    spCellConfigDedicated                       ServingCellConfig
```

-continued

| CellGroupConfig information element |
|---|

```
OPTIONAL,    -- Need M
    ...
  }
  ReconfigurationWithSync ::=          SEQUENCE {
    spCellConfigCommon                   ServingCellConfigCommon
OPTIONAL,    -- Need M
    newUE-Identity                       RNTI-Value,
    t304                                 ENUMERATED {ms50, ms100,
ms150, ms200, ms500, ms1000, ms2000, ms10000},
        rach-ConfigDedicated                 CHOICE {
            uplink                               RACH-
ConfigDedicated,
            supplementaryUplink              RACH-ConfigDedicated
        }
OPTIONAL,    -- Need N
    ...,
    [[
    smtc                                 SSB-MTC
OPTIONAL  -- Need S
    ]]
  }
  SCellConfig ::=                      SEQUENCE {
    sCellIndex                           SCellIndex,
    sCellConfigCommon                    ServingCellConfigCommon
OPTIONAL,    -- Cond SCellAdd
    sCellConfigDedicated                 ServingCellConfig
OPTIONAL,    -- Cond SCellAddMod
    ...,
    [[
    smtc                                 SSB-MTC
OPTIONAL  -- Need S
    ]]
  }
  -- TAG-CELL-GROUP-CONFIG-STOP
  -- ASN1STOP
```

| Conditional Presence | Explanation |
|---|---|
| SCG | The field is optionally present, Need N, if the secondary cell group is configured or reconfigured. Otherwise it is absent. |

In this case, since the field is included in an extension of the IE, there are several options how to minimize the overhead, depending on what the default behavior should be.

If the default behavior should be that the SCG is not suspended, then the field suspendSCG should only be included in case SCG should be suspended, and also if the SCG should remain suspended even if the configurations are updated. This may e.g. be achieved by using a single valued enumerated (true) with the optionality flag Need N (i.e. do nothing if not included).

If the default behavior should be that the SCG is suspended, then the field should only be included in case SCG is not suspended, and also if the SCG should remain active even if the configurations are updated. This may e.g. be achieved by using a single valued enumerated (false) with the optionality flag Need N (i.e. do nothing if not included).

If there is no default value (true or false), but the SCG configurations are changed frequently without changing the state of the SCG (suspended or active), then the field should only be included when changing the state of the SCG. This may e.g. be achieved by using a Boolean (true/false) with the optionality flag Need M (i.e. keep the same value as previously). However, this will mean that the field must always be included at the setup of the SCG.

In either case, the suspension of the SCG is irrelevant for the MCG; and the field should never be included in the CellGroupConfig of the MCG. This may e.g. be achieved by setting a condition on the field that it is optional to include if the secondary cell group is reconfigure, but is absent otherwise.

In some embodiments, the indication to suspend or resume the SCG is provided in a MAC Control Element (MAC CE). This may either be an extended use of an existing MAC CE, or by introducing a new MAC CE.

If an existing MAC CEs is used, the most likely candidate is the 'SCell Activation/Deactivation MAC CEs'. The current behavior for that MAC CE is that for an SCell indicated as deactivated, the UE 120 stops monitoring the PDSCH and PDCCH and stops performing CQI measurements on that cell. However, these MAC CEs are always set to active for the PCell and the PSCell as can be seen in e.g. TS 36.300.

In DC, the serving cells of the MCG other than the PCell can only be activated or deactivated by the MAC Control Element received on the MCG, and the serving cells of the SCG other than PSCell can only be activated or deactivated by the MAC Control Element received on the SCG. The MAC entity applies the bitmap for the associated cells of either the MCG or the SCG. PSCell in the SCG is always activated like the PCell (i.e. deactivation timer is not applied to PSCell).

In NR, the definition of the SCell is modified so that it doesn't even include the PSCell but if the PSCell is configured, it is always active.

This MAC CE would be extended to be allowed to deactivate the PSCell. If the PSCell is deactivated, the UE 120 would still stop the monitoring of the PDSCH and PDCCH and possibly the CQI measurements, but it would also suspend any radio bearers transmitting over the SCG and suspend or release any configurations limiting the transmission of the MCG, e.g. the TDM pattern or maximum transmission power of the MCG.

An example of a resume request initiated by the UE 120 may be given by using the resumeCause field present in RRCResumeRequest message, as shown below.

| RRCResumeRequest message |
|---|
| -- ASN1START |
| -- TAG-RRCRESUMEREQUEST-START |
| RRCResumeRequest ::=      SEQUENCE { |
|    rrcResumeRequest      RRCResumeRequest-IEs |
| } |
| RRCResumeRequest-IEs ::=      SEQUENCE { |
|    resumeIdentity       ShortI-RNTI-Value, |
|    resumeMAC-I          BIT STRING (SIZE (16)), |
|    resumeCause          ResumeCause, |
|    spare                BIT STRING (SIZE (1)) |
| } |
| -- TAG-RRCRESUMEREQUEST-STOP |
| -- ASN1STOP |

| ResumeCause information element |
|---|
| -- ASN1START |
| -- TAG-RESUME-CAUSE-START |
| ResumeCause ::=      ENUMERATED {emergency, highPriorityAccess, mt-Access, mo-Signalling, |
|              mo-Data, mo-VoiceCall, mo-VideoCall, mo-SMS, rna-Update, mps-PriorityAccess, mcs-PriorityAccess, |
| resumeSCG-v1600, spare2, spare3, spare4, spare5 } |
| -- TAG-RESUME-CAUSE-STOP |
| -- ASN1STOP |

1.1.6. UE Behaviour

To handle extra inserted fields in RRCResume and RRCReconfiguration messages, behaviors below may be applied in the 3GPP RRC specifications TS 38.331, with underlined changes. 5.3.13.4 Reception of the RRCResume by the UE, e.g. the UE 120.

The UE shall:

1> stop timer T319;
1> if the RRCResume includes the fullConfig:
   2> perform the full configuration procedure as specified in 5.3.5.11; 1> else:
   2> restore the PDCP state and reset COUNT value for SRB2 and all DRBs associated to MCG;
   2> restore the cellGroupConfig associated to MCG from the stored UE AS context;
   2> indicate to lower layers that stored UE AS context associated to MCG is used;
1> discard the fullI-RNTI, shortI-RNTI and the stored UE AS context, except ran-NotificationAreaInfo;
1> if the RRCResume includes the masterCellGroup:
   2> perform the cell group configuration for the received masterCellGroup according to 1.3.5.5;
1> if the RRCReconfiguration includes the mrdc-SecondaryCellGroup:
   2> if the received mrdc-SecondaryCellGroup contains nr-SCG:
      3> perform the RRC reconfiguration according to 5.3.5.3 for the RRCReconfiguration message included in nr-SCG;
   2> if the received mrdc-SecondaryCellGroup contains eutra-SCG:
      3> perform the RRC connection reconfiguration message according to the 3GPP RRC specifications TS 36.331 [10], clause 5.3.5.3 for the RRCConnectionReconfiguration message included in eutra-SCG;
1> if the RRCResume message includes the sk-Counter
   2> perform security key update procedure as specified in 5.3.5.7;
1> if the RRCResume includes the radioBearerConfig:
   2> perform the radio bearer configuration according to 5.3.5.6;
1> if the RRCResume message includes the radioBearerConfig2:
   2> perform the radio bearer configuration according to 5.3.5.6;
1> resume SRB2 and all DRBs associated with the MCG;
1> if the RRCResume message includes the suspendSCG:
   2> suspend SRB3, if configured, and all DRBs associated with the SCG;
   2> suspend SCG transmission for all SRBs and DRBs;
1> else if the UE has a suspended SCG configuration:
   2> restore the PDCP state and reset COUNT value for all DRBs associated to SCG;
   2> restore the cellGroupConfig associated to SCG from the stored UE AS context;
   2> indicate to lower layers that stored UE AS context associated to SCG is used;
   2> resume SRB3, if configured, and all DRBsassociated with the SCG;
   2> resume SCG transmission for all SRBs and DRBs;
1> if stored, discard the cell reselection priority information provided by the cellReselectionPriorities or inherited from another RAT;
1> stop timer T320, if running;
1> if the RRCResume message includes the measConfig:
   2> perform the measurement configuration procedure as specified in 5.5.2;
1> resume measurements if suspended;
Editor's Note: FFS Whether there is a need to define UE actions related to access control timers (equivalent to T302, T303, T305, T306, T308 in LTE). For example, informing upper layers if a given timer is not running.
1> enter RRC_CONNECTED;
1> indicate to upper layers that the suspended RRC connection has been resumed;
1> stop the cell re-selection procedure;
1> consider the current cell to be the PCell;
1> set the content of the of RRCResumeComplete message as follows:
   2> if the upper layer provides NAS PDU, set the dedicatedNAS-Message to include the information received from upper layers;
   2> if the upper layer provides a PLMN, set the selectedPLMN-Identity to PLMN selected by upper layers (3GPP specifications TS 24.501 [23]) from the PLMN(s) included in the plmn-IdentityList in SIB1;
   2> if the masterCellGroup contains the reportUplinkTxDirectCurrent:
      3> include the uplinkTxDirectCurrentList;
1> submit the RRCResumeComplete message to lower layers for transmission;
1> the procedure ends.

5.3.5.3 Reception of an RRCReconfiguration by the UE, e.g. the UE 120.

The UE shall perform the following actions upon reception of the RRCReconfiguration:
1> if the RRCReconfiguration includes the fullConfig:
   2> perform the radio configuration procedure as specified in 5.3.5.11;
1> if the RRCReconfiguration includes the masterCellGroup:
   2> perform the cell group configuration for the received masterCellGroup according to 5.3.5.5;
1> if the RRCReconfiguration includes the masterKeyUpdate, or;
1> if the RRCReconfiguration includes the sk-Counter:
   2> perform security key update procedure as specified in 5.3.5.7;
1> if the RRCReconfiguration includes the secondaryCellGroup:
   2> perform the cell group configuration for the SCG according to 5.3.5.5;
1> if the RRCReconfiguration includes the mrdc-SecondaryCellGroup:
   2> if the received mrdc-SecondaryCellGroup contains nr-SCG:
      3> perform the RRC reconfiguration according to 5.3.5.3 for the RRCReconfiguration message included in nr-SCG;
   2> if the received mrdc-SecondaryCellGroup contains eutra-SCG:
      3> perform the RRC connection reconfiguration message according to TS 36.331 [10], clause 5.3.5.3 for the RRCConnectionReconfiguration message included in eutra-SCG;
1> if the RRCReconfiguration message contains the radioBearerConfig:
   2> perform the radio bearer configuration according to 5.3.5.6;
1> if the RRCReconfiguration message contains the radioBearerConfig2:
   2> perform the radio bearer configuration according to 5.3.5.6;
1> if the RRCReconfiguration message includes the measConfig:
   2> perform the measurement configuration procedure as specified in 5.5.2;
1> if the RRCReconfiguration message includes the dedicatedSIB1-Delivery:
   2> perform the action upon reception of SIB1 as specified in 5.2.2.4.2;
1> if the RRCReconfiguration message includes the dedicatedSystemInformationDelively
   2> perform the action upon reception of System Information as specified in 5.2.2.4;
1> if the RRCReconfiguration message includes the suspendSCG:
   2> suspend SRB3, if configured, and all DRBs associated with the SCG;
   2> suspend SCG transmission for all SRBs and DRBs;
1> else, if the UE has a suspended SCG configuration:
   2> resume SRB3, if configured, and all DRBs associated with the SCG;
   2> resume SCG transmission for all SRBs and DRBs;
1> set the content of RRCReconfigurationComplete message as follows:
   2> if the RRCReconfiguration includes the masterCellGroup containing the reportUplinkTxDirectCurrent, or;
   2> if the RRCReconfiguration includes the secondaryCellGroup containing the reportUplinkTxDirectCurrent:
      3> include the uplinkTxDirectCurrentList;
1> if the UE is configured with E-UTRA nr-SecondaryCellGroupConfig (MCG is E-UTRA):
   2> if RRCReconfiguration was received via SRB1:
      3> submit the RRCReconfigurationComplete via the EUTRA MCG embedded in E-UTRA RRC message RRCConnectionReconfigurationComplete as specified in TS 36.331 [10];
      3> if reconfigurationWithSync was included in spCellConfig of an SCG:
         4> initiate the random access procedure on the SpCell, as specified in TS 38.321 [3];
      3> else:
         4> the procedure ends;
NOTE: The order the UE sends the RRCConnectionReconfigurationComplete message and performs the Random Access procedure towards the SCG is left to UE implementation.
   2> else (RRCReconfiguration was received via SRB3):
      3> submit the RRCReconfigurationComplete message via SRB3 to lower layers for transmission using the new configuration;
NOTE: For EN-DC, in the case of SRB1, the random access is triggered by RRC layer itself as there is not necessarily other UL transmission. In the case of SRB3, the random access is triggered by the MAC layer due to arrival of RRCReconfigurationComplete.
1> else:
   2> submit the RRCReconfigurationComplete message via SRB1 to lower layers for transmission using the new configuration;
1> if reconfigurationWithSync was included in spCellConfig of an MCG or SCG, and when MAC of an NR cell group successfully completes a random access procedure triggered above;
   2> stop timer T304 for that cell group;
   2> apply the parts of the CQI reporting configuration, the scheduling request configuration and the sounding RS configuration that do not require the UE to know the SFN of the respective target SpCell, if any;
   2> apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;
   2> if the reconfigurationWithSync was included in spCellConfig of an MCG:
      3> if the active downlink BWP, which is indicated by the firstActiveDownlinkBWP-Id for the target SpCell of the MCG, has a common search space configured:
         4> acquire the SIB1 of the target SpCell of the MCG, as specified in 5.2.2.3.1;
   2> the procedure ends.

NOTE: The UE is only required to acquire broadcasted SIB1 if the UE can acquire it without disrupting unicast data reception, i.e. the broadcast and unicast beams are quasi co-located.

Even though SCG transmission of all bearers is suspended as shown above, the PDCP of split bearers might still push data down the lower layers associated with the SCG leg (e.g. if PDCP pre-processing is applied) even before an UL grant becomes available for that leg. The downside of this is that data may end up pending on the SCG leg until SCG gets resumed. Thus, some changes are required at PDCP level to prevent that from happening. This comprises:

For non split bearers:
  Ensuring data is not sent down the protocol stack if the RLC is associated with the SCG and the SCG is suspended
  If CA duplication is configured:
    Ensuring that for the SCG CA duplicated bearers, data is not sent down the protocol stack if SCG is suspended
For the case of split bearers:
  Deactivation of duplication:
    Data is sent only to the MCG leg if the SCG is suspended.
  Switching of the primary path to the MCG:
    If there is a split bearer and primary path was the SCG, it is changed to the MCG to ensure data transmission is not suspended for the split bearer.

One way of implicitly capturing this in the PDCP transmission and data volume calculation operations is shown below. [Changes in 3GPP specifications TS 38.323]

1.2.1 Transmit Operation

At reception of a PDCP SDU from upper layers, the transmitting PDCP entity shall:
  start the discard Timer associated with this PDCP SDU (if configured). For a PDCP SDU received from upper layers, the transmitting PDCP entity shall:
  associate the COUNT value corresponding to TX_NEXT to this PDCP SDU;
  NOTE 1: Associating more than half of the PDCP SN space of contiguous PDCP SDUs with PDCP SNs, when e.g., the PDCP SDUs are discarded or transmitted without acknowledgement, may cause HFN desynchronization problem. How to prevent HFN desynchronization problem is left up to UE implementation.
  perform header compression of the PDCP SDU as specified in the subclause 5.7.4;
  perform integrity protection, and ciphering using the TX_NEXT as specified in the subclause 5.9 and 5.8, respectively;
  set the PDCP SN of the PDCP Data PDU to TX_NEXT modulo $2^{[pdcp\text{-}SN\text{-}Size]}$;
  increment TX_NEXT by one;
  submit the resulting PDCP Data PDU to lower layer as specified below.

When submitting a PDCP Data PDU to lower layer, the transmitting PDCP entity shall:
  if the transmitting PDCP entity is associated with one RLC entity:
    if SCG is not suspended due to a network indication or the RLC entity is not associated with the SCG:
      submit the PDCP PDU to the associated RLC entity;
  else, if the transmitting PDCP entity is associated with two RLC entities:
    if the PDCP duplication is activated
      if the PDCP PDU is a PDCP Data PDU:
        if SCG is not suspended due to a network indication or neither RLC entity is associated with the SCG:
          duplicate the PDCP Data PDU and submit the PDCP Data PDU to both associated RLC entities;
        else (i.e. SCG is suspended due to a network indication and at least one of the RLC entities is associated with the SCG):
          if the two associated RLC entities belong to the different Cell Groups:
            submit the PDCP Data PDU to the MCG RLC entity;
      else:
        if SCG is not suspended due to a network indication or the primary RLC entity is not associated with the SCG:
          submit the PDCP Control PDU to the primary RLC entity;
        else:
          if the two associated RLC entities belong to the different Cell Groups:
            submit the PDCP Control PDU to the MCG RLC entity;
    else:
      if the two associated RLC entities belong to the different Cell Groups; and
      if the total amount of PDCP data volume and RLC data volume pending for initial transmission (as specified in TS 38.322 [5]) in the two associated RLC entities is equal to or larger than ul-D ata Split Threshold:
        if SCG is suspended due to a network indication:
          submit the PDCP PDU to the MCG RLC entity;
        else
          submit the PDCP PDU to either the primary RLC entity or the secondary RLC entity;
      else:
        if SCG is suspended due to a network indication:
          if the two associated RLC entities belong to the different Cell Groups:
            submit the PDCP PDU to the MCG RLC entity:
          else:
            submit the PDCP PDU to the primary RLC entity.

NOTE: The SCG may also be suspended due to SCG failure.

1.6 Data Volume Calculation

For the purpose of the MAC buffer status reporting, the transmitting PDCP entity shall consider the following as PDCP data volume:
  the PDCP SDUs for which no PDCP Data PDUs have been constructed;
  the PDCP Data PDUs that have not been submitted to lower layers;
  the PDCP Control PDUs;
  for AM DRBs, the PDCP SDUs to be retransmitted according to subclause 5.1.2;
  for AM DRBs, the PDCP Data PDUs to be retransmitted according to subclause 5.5.

If the transmitting PDCP entity is associated with two RLC entities, when indicating the PDCP data volume to a MAC entity for BSR triggering and Buffer Size calculation (as specified in 3GPP specifications TS 38.321 [4] and TS 36.321 [12]), the transmitting PDCP entity shall:
  if the PDCP duplication is activated:
    if SCG is suspended due to a network indication and the primary RLC entity is associated with the SCG:
      indicate the PDCP data volume as 0 to the MAC entity associated with the primary RLC entity;
    else:
      indicate the PDCP data volume to the MAC entity associated with the primary RLC entity;
    if SCG is suspended due to a network indication and the secondary RLC entity is associated with the SCG:
      indicate the PDCP data volume as 0 to the MAC entity associated with the secondary RLC entity;

else:
  ndicate the PDCP data volume excluding the PDCP Control PDU to the MAC entity associated with the secondary RLC entity;
else:
  if the two associated RLC entities belong to the different Cell Groups; and
  if the total amount of PDCP data volume and RLC data volume pending for initial transmission (as specified in 3GPP RRC specification 38.322 [5]) in the two associated RLC entities is equal to or larger than ul-D ata Split Threshold:
    if SCG is not suspended due to a network indication:
      indicate the PDCP data volume to both the MAC entity associated with the primary RLC entity and the MAC entity associated with the secondary RLC entity;
    else:
      indicate the PDCP data volume to the MAC entity associated with the MCG;
      indicate the PDCP data volume as 0 to the MAC entity associated with the SCG;
  else:
    if SCG is suspended due to a network indication:
      if the two associated RLC entities belong to the different Cell Groups:
        indicate the PDCP data volume to the MAC entity associated with the MCG;
        indicate the PDCP data volume as 0 to the MAC entity associated with the SCG;
      else if the two associated RLC entities belong to the MCG:
        indicate the PDCP data volume to the MAC entity associated with the primary RLC entity;
        indicate the PDCP data volume as 0 to the MAC entity associated with the secondary RLC entity
      else: (i.e. both are SCG, CA duplication)
        indicate the PDCP data volume as 0 to the MAC entity associated with the primary RLC entity;
        indicate the PDCP data volume as 0 to the MAC entity associated with the secondary RLC entity
    else:
      indicate the PDCP data volume to the MAC entity associated with the primary RLC entity;
      indicate the PDCP data volume as 0 to the MAC entity associated with the secondary RLC entity
NOTE: The SCG may also be suspended due to SCG failure.

In the above, the PDCP handled the suspension of the SCG implicitly by switching primary path to MCG, if needed, by implicitly turning off duplication, etc. Another alternative would be for the network 100, e.g. the MN 110, to reconfigure the affected bearers explicitly when SCG is suspended, i.e. explicitly switch the primary path of all split bearers to MCG, deactivate duplication for split bearers, etc. However, this will require for the network to reconfigure all the bearers back to their original setting when the SCG is resumed. Thus, the implicit handling may be considered as a clean solution, e.g. as a reconfiguration message with just the resumeSCG or suspendSCG flags set may do the work in this case.

1.2 Activation or Deactivation of the SCG

Although the UE behavior, interactions between the MN 110 and the SN 111, and message names are described with respect to suspend/resume operations, embodiments disclosed herein do not need to be tightly related to it, since irrespective of whether SCG is suspended or not, the RRC state of the UE 120 would be defined by having the MCG configurations suspended or not.

Therefore, embodiments herein mail also be formulated as activate/deactivate operations for the SCG, that may be combined with either resume/suspend operations or RRCReconfiguration message.

To perform the method actions above, the MN 110 is for handling of an SCG for the UE 120 configured to operate in a dual connectivity mode with the MN 110 and the SN 111 configured to operate in the wireless communication network 100. The MN 110 may comprise an arrangement depicted in FIGS. 26a and 26b. As mentioned above, an MCG is associated with the MN 110 and the SCG is associated with the SN 111.

The MN 110 may comprise an input and output interface 500 configured to communicate with network nodes such as the UE 120 and/or the SN 111. The input and output interface may comprise a wireless receiver (not shown) and a wireless transmitter (not shown).

The MN 110 may further be configured to, e.g. by means of a receiving unit 510 in the MN 110, receive an indication, information, a signal and/or a message from another network node such as the UE 120 and/or the SN 111.

In some first and second exemplifying embodiments, the MN 110 is configured to receive, e.g. by means of the receiving unit 510, a Radio Resource Control (RRC) resume request from the UE 120 that is in an RRC_INACTIVE state with both the SCG and the MCG suspended.

As previously mentioned, this may for example be the case in some first exemplifying embodiments relating to network initiated RRC Resume from an RRC_INACTIVE state while maintaining suspended SCG configurations as described in e.g. section 1.1.2.1.

Alternatively and as also previously mentioned, this may be the case in some second exemplifying embodiments relating to network initiated RRC Resume from an RRC_I-NACTIVE state while resuming SCG configurations as described in e.g. section 1.1.2.2.

In some third exemplifying embodiments, the MN 110 is configured to receive, e.g. by means of the receiving unit 510, a RRC resume request from the UE 120 that is in an RRC_INACTIVE state with both the SCG and the MCG suspended, wherein the resume request includes an indication to resume the SCG. Thus, in some third exemplifying embodiments, the UE 120 may have detected that the SCG is still valid and that it want the SCG to be resumed. Thus, it may transmit such a request to resume the SCG in the RRC resume request. As previously mentioned, the third exemplifying embodiments relate to UE initiated SCG resume from an RRC_INACTIVE state as described in e.g. section 1.1.2.3.

In some fourth exemplifying embodiments, and in response to a transmitted request for SN addition, the MN 110 is configured to receive, e.g. by means of the receiving unit 510, the SCG from the SN 111.

In some fifth exemplifying embodiments, the MN 110 is configured to receive, e.g. by means of the receiving unit 510, an indication from the SN 111, which indication indicates that the SCG of the UE 120 is to be suspended. The UE 120 is in an RRC_CONNECTED state with both the SCG and the MCG active. This may be the case in some fifth exemplifying embodiments relating to SN initiated SCG resume or suspend request as described in e.g. section 1.1.3.1.

In some sixth exemplifying embodiments also relating to SN initiated SCG resume or suspend request, the MN 110 is configured to receive, e.g. by means of the receiving unit

510, an indication from the SN 111. The indication is an indication to resume a suspended SCG of the UE 120 that is in an RRC_CONNECTED state with the MCG active and the SCG suspended.

The MN 110 may further be configured to, e.g. by means of a transmitting unit 520 in the MN 110, transmit an indication, information, a signal and/or a message to another network node, e.g. to the UE 120 or the SN 111.

The MN 110 is configured to transmit, e.g. by means of the transmitting unit 520, an indication to the UE 120. The indication indicates the first operation relating to the suspension or the resumption of the SCG and indicates the second operation relating to the suspension or the resumption of the MCG. Thereby, the UE 120 will be informed about the decision taken by the MN 110 and about what action the UE 120 should take regarding the SCG which action is taken independently from the action taken regarding the MCG.

Further, the MN 110 is configured to transmit, e.g. by means of the transmitting unit 520, an indication to the SN 111. The indication indicates the first operation relating to the suspension or the resumption of the SCG. Thereby, the SN 111 will be informed about the decision taken by the MN 110 and about what action the UE 120 should take regarding the SCG.

In some first exemplifying embodiments, the transmitted indication indicates, to the UE 120, to keep the SCG suspended and to resume the MCG.

In some second exemplifying embodiments, the transmitted indication indicates, to the UE 120, to resume the SCG and to resume the MCG.

In some third exemplifying embodiments, the transmitted indication indicates, to the UE 120, to resume the SCG and the MCG.

In some fourth exemplifying embodiments, the MN 110 is configured to transmit, e.g. by means of the transmitting unit 520, an SN addition request to initiate dual connectivity to the SN 111. This may for example be the case in some fourth exemplifying embodiments relating to MN initiated resume or suspend request as described in e.g. section 1.1.3.2.

In some fourth exemplifying embodiments, when the MN 110 has sent an SN addition request to the SN 111 and has received the SCG from the SN 111 as described above in Actions 1202 and 1203, the transmitted indication may also indicate, to the UE 120, to set up the SCG and to keep it suspended.

In some alternative fourth exemplifying embodiments, the transmitted indication indicates, to the UE 120, to resume the suspended SCG.

In some fifth exemplifying embodiments, the transmitted indication indicates, to the UE 120, to suspend the SCG and to keep the MCG active.

In some sixth exemplifying embodiments, the transmitted indication indicates, to the UE 120, to resume the suspended SCG and to keep the MCG active.

It should be understood that the MN 110 may be configured to transmit the indication in several ways. For example, the MN 110 may transmit the indication as a separate message or the indication may be comprised in a message by setting a flag to indicate whether or not the SCG should be resumed or kept suspended.

The MN 110 may further be configured to, e.g. by means of a deciding unit 530 in the MN 110, decide to perform a first operation relating to a suspension or a resumption of the SCG independently from a second operation relating to a suspension or a resumption of the MCG. For example, and as previously mentioned, this may be case when the MCG and the SCG are suspended and the MN 110 is configured to decide whether to resume the MCG and the SCG, or to resume the MCG but keep the SCG suspended. The decision to resume or keep the SCG suspended is taken independent of the decision to resume the MCG. If only MCG transmissions is necessary the MN 110 may decide to only resume the MCG, or the MN 110 may decide not to resume the SCG when the SN coverage is not suitable for triggering a resumption of the SCG.

As another example, when the MCG is resumed, the MN 110 is configured to decide, e.g. by means of the deciding unit 530, whether to resume a suspended SCG or to suspend a resumed SCG. The former may for example be the case when resources of the SCG are needed for transmission, and the latter may for example be the case when resources of the SCG are not needed for transmission.

As yet another example, when the UE 120 is to transition from an RRC_INACTIVE state to an RRC_CONNECTED state, while prior art would be to resume both the MCG and the SCG, embodiments herein provides for the MN 110 being configured to decide, e.g. by means of the deciding unit 530, upon keeping the SCG suspended or to resume it. Thus, according to embodiments disclosed herein, the SCG does not have to be resumed just because the MCG is resumed.

As mentioned above, in some first embodiments the MN 110 is configured to receive a RRC resume request from the UE 120 that is in an RRC_I NACTIVE state with both the SCG and the MCG suspended. In such first exemplifying embodiments, the deciding to perform the first operation relating to the suspension or the resumption of the SCG independently from the second operation relating to the suspension or the resumption of the MCG may comprise that the MN 110 is configured to decide, e.g. by means of the deciding unit 530, to keep the SCG suspended and to resume the MCG.

As mentioned above, in some second exemplifying embodiments, the deciding to perform the first operation relating to the suspension or the resumption of the SCG independently from the second operation relating to the suspension or the resumption of the MCG may comprise that the MN 110 is configured to decide, e.g. by means of the deciding unit 530, to resume the SCG and to resume the MCG.

As mentioned above, in some third exemplifying embodiments, the deciding to perform the first operation relating to the suspension or the resumption of the SCG independently from the second operation relating to the suspension or the resumption of the MCG may comprise that the MN 110 is configured decide, e.g. by means of the deciding unit 530, to resume the MCG and the SCG.

Thus, in both some second and third exemplifying embodiments, both the SCG and the MCG are decided to be resumed but it is the network, e.g. the MN 110, that decides to resume them both and the decision to resume the SCG is taken independent from the decision to resume the MCG.

As mentioned above, in some fourth exemplifying embodiments, when the MN 110 has sent an SN addition request to the SN 111 and has received the SCG from the SN 111 as described above, the deciding to perform the first operation relating to the suspension or the resumption of the SCG independently from the second operation relating to the suspension or the resumption of the MCG may comprise that the MN 110 is configured to decide, e.g. by means of the deciding unit 530, to set up the SCG and to keep it suspended.

As mentioned above, in some alternative fourth exemplifying embodiments, also relating to MN initiated resume or suspend request as some fourth exemplifying embodiments, the deciding to perform the first operation relating to the suspension or the resumption of the SCG independently from the second operation relating to the suspension or the resumption of the MCG may comprise that the MN 110 is configured to decide, e.g. by means of the deciding unit 530, to resume a suspended SCG.

As mentioned above, in some fifth exemplifying embodiments, the deciding to perform the first operation relating to the suspension or the resumption of the SCG independently from the second operation relating to the suspension or the resumption of the MCG may comprise that the MN 110 is configured to decide, e.g. by means of the deciding unit 530, to suspend the SCG and to keep the MCG active.

As mentioned above, in some sixth exemplifying embodiments, the deciding to perform the first operation relating to the suspension or the resumption of the SCG independently from the second operation relating to the suspension or the resumption of the MCG may comprise that the MN 110 is configured to decide, e.g. by means of the deciding unit 530, to resume the suspended SCG and to keep the MCG active.

Figure 26A:
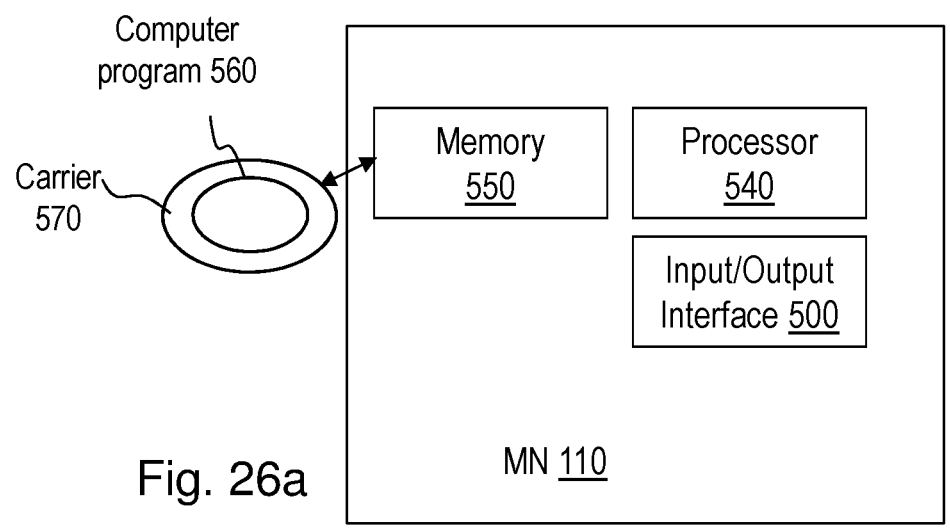
FIGS. 26a and 26b are schematic block diagrams illustrating embodiments of MN.
Figure 26B:
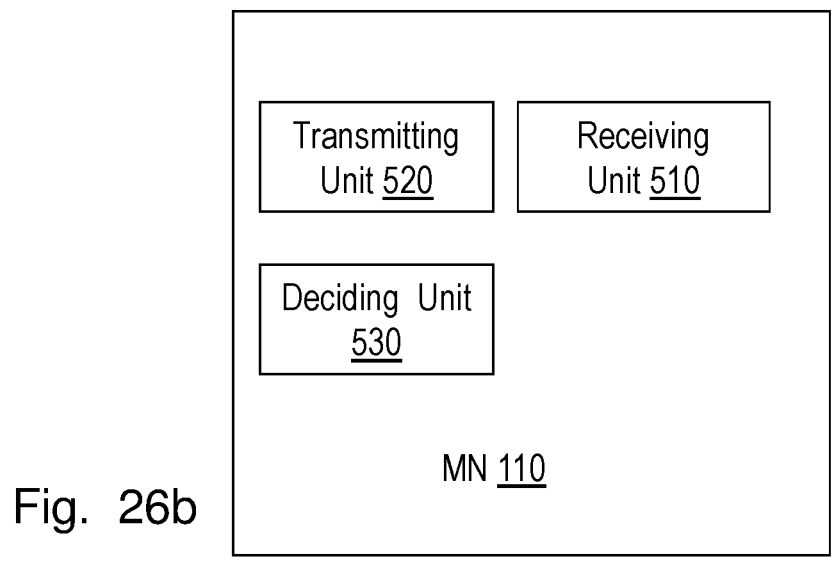

The embodiments herein may be implemented through a processor or one or more processors, such as the processor 540 of a processing circuitry in the the MN 110 depicted in FIG. 26a, together with respective computer program code for performing the functions and actions of the embodiments herein. The program code mentioned above may also be provided as a computer program product, for instance in the form of a data carrier carrying computer program code for performing the embodiments herein when being loaded into the MN 110. One such carrier may be in the form of a CD ROM disc. It is however feasible with other data carriers such as a memory stick. The computer program code may furthermore be provided as pure program code on a server and downloaded to the MN 110.

The MN 110 may further comprise a memory 550 comprising one or more memory units. The memory 550 comprises instructions executable by the processor in MN 110. The memory 550 is arranged to be used to store e.g. information, indications, cause codes, data, configurations, and applications to perform the methods herein when being executed in the MN 110.

In some embodiments, a computer program 560 comprises instructions, which when executed by the respective at least one processor 540, cause the at least one processor 540 of the MN 110 to perform the actions above.

In some embodiments, a carrier 570 comprises the respective computer program 560, wherein the carrier is one of an electronic signal, an optical signal, an electromagnetic signal, a magnetic signal, an electric signal, a radio signal, a microwave signal, or a computer-readable storage medium.

Those skilled in the art will appreciate that the units in the MN 110 described above may refer to a combination of analog and digital circuits, and/or one or more processors configured with software and/or firmware, e.g. stored in the MN 110, that when executed by the respective one or more processors such as the processor described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 27A:
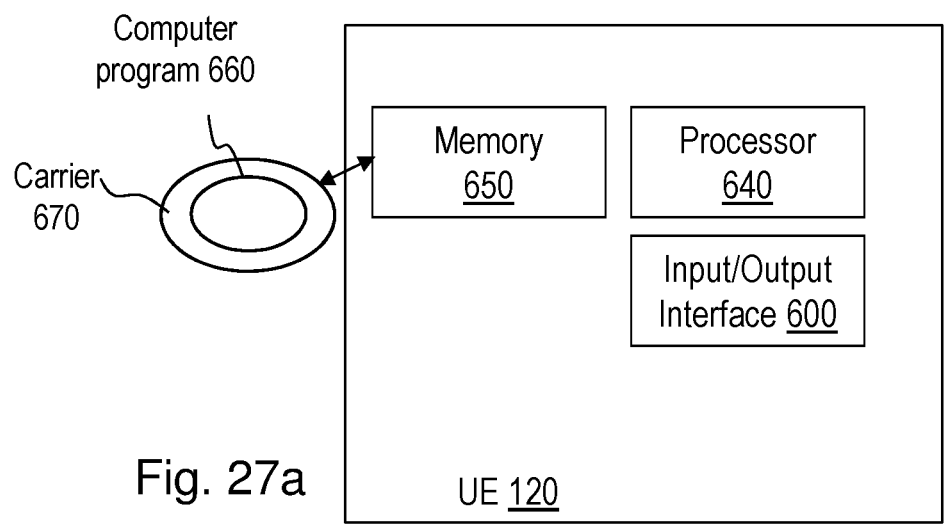
FIGS. 27a and 27b are schematic block diagrams illustrating embodiments of a UE.
Figure 27B:
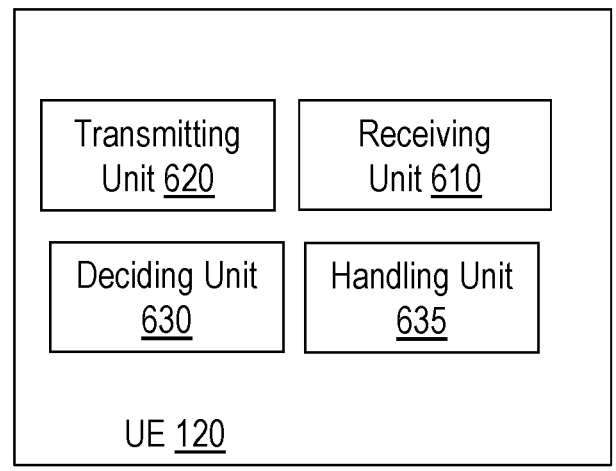

To perform the method actions above for handling of a SCG, the UE 120 may comprise an arrangement depicted in FIGS. 27a and 27b. As mentioned above, the UE 120 is configured to operate in a dual connectivity mode with the MN 110 and the SN 111 configured to operate in the wireless communication network 100. An MCG is associated with the MN 110 and the SCG is associated with the SN 111.

The UE 120 may comprise an input and output interface 600 configured to communicate with network nodes such as the network node 110 and the network node 130. The input and output interface may comprise a wireless receiver (not shown) and a wireless transmitter (not shown).

The UE 120 is configured to, e.g. by means of a receiving unit 610 in the UE 120, receive an indication, information, a signal, and/or a message from a network node, e.g. from the MN 110 and/or from the SN 111. The UE 120 may be configured to receive, e.g. by means of the receiving unit 610, an indication from the MN 110. The indication indicates an operation relating to a suspension or a resumption of the SCG and indicates a second operation relating to a suspension or a resumption of the MCG. The first operation is decided to be performed independently from the second operation relating to the suspension or the resumption of the MCG.

In some embodiments, e.g. in some first and second exemplifying embodiments mentioned above, the indication received by the UE 120 in response to the transmitted RRC resume request, cf. Action 1301 above, may indicates, to the UE 120, to keep the SCG suspended and to resume the MCG. Alternatively, the received indication may indicate, to the UE 120, to resume both the SCG and the MCG.

In some embodiments, e.g. in some third exemplifying embodiments described above, and in response to the transmitted RRC resume request comprising the indication to resume the SCG, the received indication indicates, to the UE 120, to resume the SCG and the MCG.

In some embodiments, e.g. in some fourth exemplifying embodiments described above, the received indication indicates, to the UE 120, to set up the SCG and to keep it suspended.

In some embodiments, e.g. in some alternative fourth exemplifying embodiments described above, the received indication indicates, to the UE 120, to resume the suspended SCG.

In some embodiments, e.g. in some fifth exemplifying embodiments described above, when the UE 120 is in an RRC_CONNECTED state with both the SCG and the MCG active, the received indication may indicate, to the UE 120, to suspend the SCG and to keep the MCG active.

In some embodiments, e.g. in some sixth exemplifying embodiments described above, when the UE 120 is in an RRC_CONNECTED state with the MCG active and the SCG suspended, the received indication indicates, to the UE 120, to resume the suspended SCG.

The UE 120 is further configured to, e.g. by means of a transmitting unit 620 in the UE 120, transmit an indication, information, a signal, and/or a message to a network node, e.g. to the MN 110 and/or to the SN 111.

In some embodiments, e.g. in some first and second exemplifying embodiments mentioned above, when the UE 120 is in an RRC_INACTIVE state with both the SCG and the MCG suspended, the UE 120 is configured to transmit, e.g. by means of the transmitting unit 620, an RRC resume request to the MN 110.

In some third exemplifying embodiments, when the UE 120 has decided to resume the SCG, the UE 120 may be configured to transmit, e.g. by means of the transmitting unit 620, an RRC resume request to the MN 110. The RRC resume request comprises an indication to resume the SCG.

The UE 120 may further configured to, e.g. by means of a deciding unit 630 in the UE 120, decide to resume or suspend the SCG.

In some embodiments, e.g. in some third exemplifying embodiments mentioned above, when the UE 120 is in an RRC_I NACTIVE state with both the SCG and the MCG suspended, the UE 120 may be configured to decide, e.g. by means of the deciding unit 630, to resume the SCG.

The UE 120 is further configured to, e.g. by means of a handling unit 635 in the UE 120, handle the SCG and the MCG in accordance with the received indication. The UE 120 is configured to handle the SCG by resuming or suspending the SCG or by keeping the SCG resumed or suspended. Further, the UE 120 is configured to handle the MCG by resuming or suspending MCG or by keeping the MCG resumed or suspended. The action relating to the resumption or suspension of the SCG is independent of the action relating to the resumption or suspension of the MCG.

The embodiments herein may be implemented through a respective processor or one or more processors, such as the processor 640 of a processing circuitry in the UE 120 depicted in FIG. 27a, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 650 comprising one or more memory units. The memory 650 comprises instructions executable by the processor in UE 120. The memory 650 is arranged to be used to store e.g. information, indications, cause codes, data, configurations, and applications to perform the methods herein when being executed in the UE 120.

In some embodiments, a computer program 660 comprises instructions, which when executed by the respective at least one processor 640, cause the at least one processor of the UE 120 to perform the actions above.

In some embodiments, a respective carrier 670 comprises the respective computer program 660, wherein the carrier 670 is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

To perform the method actions above, the SN 111 is configured to assist the MN 110 in handling of a SCG for the UE 120 operable in a dual connectivity mode with the MN 110 and the SN 111 configured to operate in the wireless communication network 100. An MCG is associated with the MN 110 and the SCG is associated with the SN 111. The SN 111 may comprise an arrangement depicted in FIGS. 28a and 28b.

The SN 111 may comprise an input and output interface 700 configured to communicate with network nodes such as the MN 110 and/or the UE 120. The input and output interface may comprise a wireless receiver (not shown) and a wireless transmitter (not shown).

The SN 111 is configured to, e.g. by means of a receiving unit 710 in the SN 111, receive an indication, information, a signal or a message from a network node e.g. from the MN 110 and/or the UE 120.

The SN 111 is configured to receive, e.g. by means of the receiving unit 710, an indication from the MN 110. The indication indicates an operation relating to a suspension or a resumption of the SCG.

In some embodiments, e.g. in some fourth exemplifying embodiments described above, the SN 111 is configured to receive, e.g. by means of the receiving unit 710, an SN addition request to initiate dual connectivity from the MN 110.

In some embodiments, the SN 111 is configured to receive, e.g. by means of the receiving unit 710, a request to resume a suspended SCG. The request may be transmitted from any of the network nodes operating the communications network 100, and thus the request may be received from the MN 110, the UE 120 or from another SN.

The SN 111 may be configured to, e.g. by means of a transmitting unit 720 in the SN 111, transmit an indication, information, a signal or a message to a network node e.g. to the MN 110 and/or the UE 120.

In some embodiments, e.g. in some fourth exemplifying embodiments described above, when in receipt of the SN addition request, the SN 111 is configured to transmit, e.g. by means of the transmitting unit 720, the SCG to the MN 110.

In some embodiments, and when the SN 111 has decided to suspend the SCG as described in Action 1404, the SN 111 is configured to transmit, e.g. by means of the transmitting unit 720, to the MN 110, an indication that the SCG of the UE 120 is to be suspended.

In some embodiments, and when the SN 111 has decided to resume the suspended SCG as described in Action 1406, the SN 111 is configured to transmit, e.g. by means of the transmitting unit 720, to the MN 110, an indication to resume the suspended SCG of the UE 120.

In some embodiments, and when the SN 111 has received the request to resume the suspended SCG as described in Action 1408, the SN 111 is configured to transmit, e.g. by means of the transmitting unit 720, an indication acknowledging the resume request. The indication acknowledging the resume request is transmitted to the network nodes sending the request.

The SN 111 may further be configured to, e.g. by means of a deciding unit 730 in the SN 111, decide to suspend or resume a SCG.

In some embodiments, e.g. in some fifth exemplifying embodiments described above, and when in receipt of the indication from the MN 110 as described in Action 1403 above, the SN 111 is configured to decide, e.g. by means of the deciding unit 730, to suspend the SCG of the UE 120 that is in an RRC_CONNECTED state with both the SCG and the MCG active.

In some embodiments, e.g. in some sixth exemplifying embodiments described above, and when in receipt of the indication from the MN 110 as described in Action 1403 above, the SN 111 is configured to decide, e.g. by means of the deciding unit 730, to resume a suspended SCG of the UE 120 that is in an RRC_CONNECTED state with the MCG active and the SCG suspended.

Figure 28A:
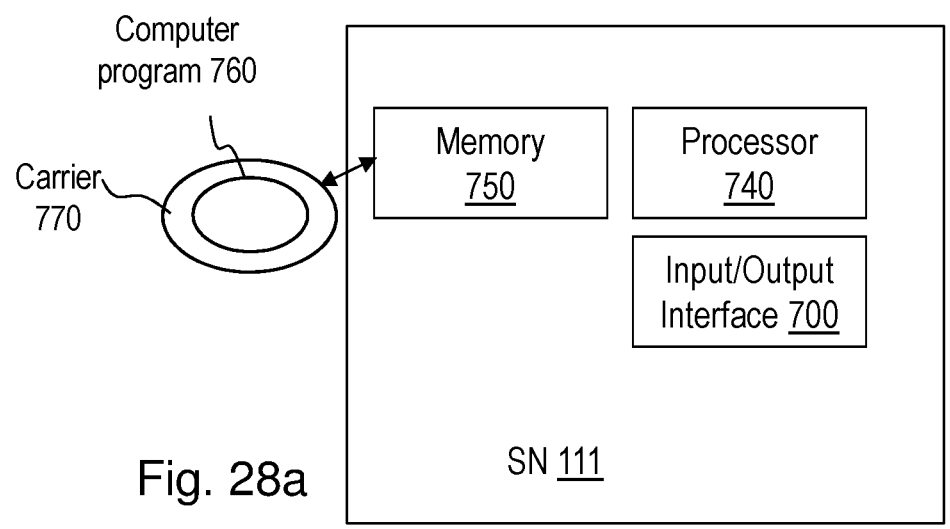
FIGS. 28a and 28b are schematic block diagrams illustrating embodiments of SN.
Figure 28B:
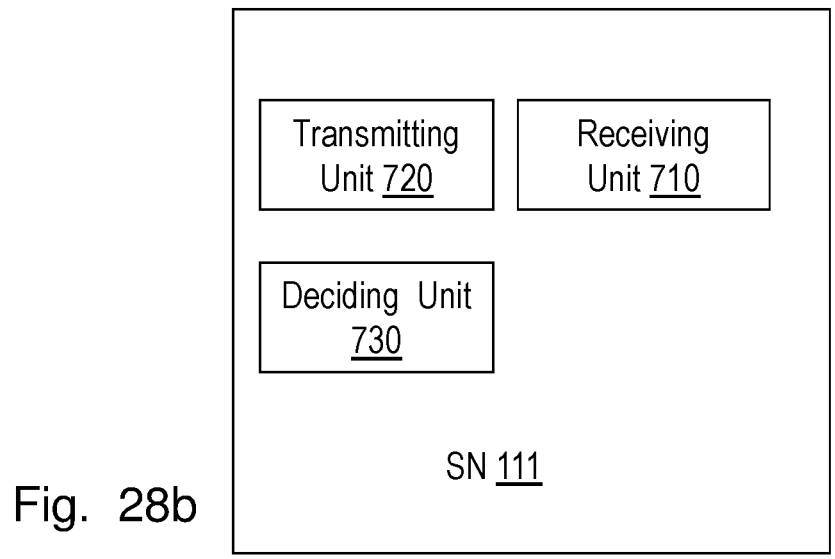

The embodiments herein may be implemented through a respective processor or one or more processors, such as the processor 740 of a processing circuitry in the SN 111 depicted in FIG. 28a, together with respective computer program code for performing the functions and actions of the embodiments herein. The program code mentioned above may also be provided as a computer program product, for instance in the form of a data carrier carrying computer program code for performing the embodiments herein when being loaded into the SN 111. One such carrier may be in the form of a CD ROM disc. It is however feasible with other data carriers such as a memory stick. The computer program code may furthermore be provided as pure program code on a server and downloaded to the SN 111.

The SN 111 may further comprise a memory 750 comprising one or more memory units. The memory 1050 comprises instructions executable by the processor in SN 111. The memory 640 is arranged to be used to store e.g. information, indications, cause codes, data, configurations, and applications to perform the methods herein when being executed in the SN 111.

In some embodiments, a computer program 760 comprises instructions, which when executed by the respective at least one processor 750, cause the at least one processor of the SN 111 to perform the actions above.

In some embodiments, a respective carrier 770 comprises the respective computer program 760, wherein the carrier 770 is one of an electronic signal, an optical signal, an electromagnetic signal, a magnetic signal, an electric signal, a radio signal, a microwave signal, or a computer-readable storage medium.

Those skilled in the art will appreciate that the units in the SN 111 described above may refer to a combination of analog and digital circuits, and/or one or more processors configured with software and/or firmware, e.g. stored in the SN 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 29:
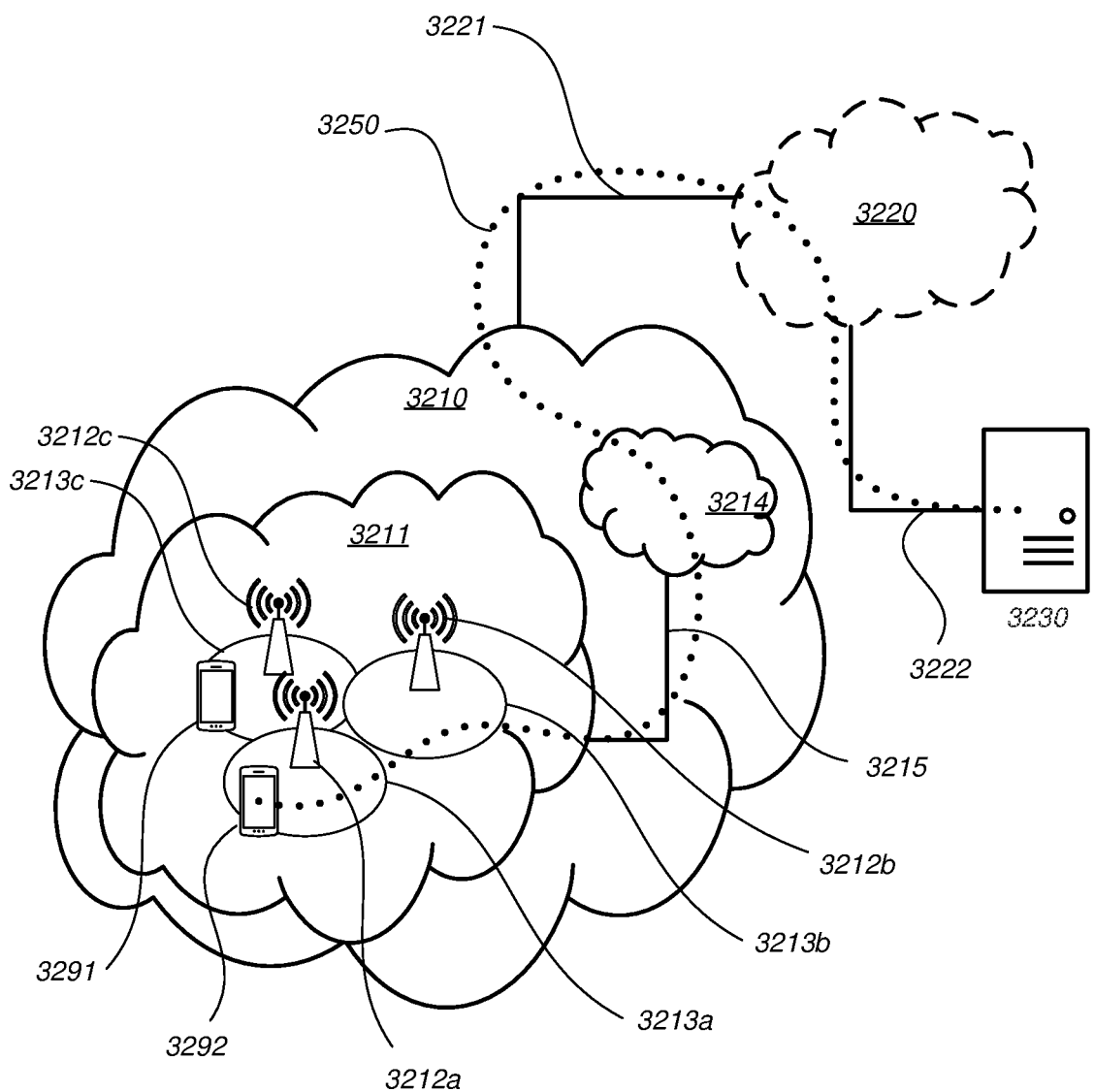
FIG. 29 schematically illustrates a telecommunication network connected via an intermediate network to a host computer.

With reference to FIG. 29, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as AP STAs NBs, eN Bs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 29 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 30. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

Figure 8:
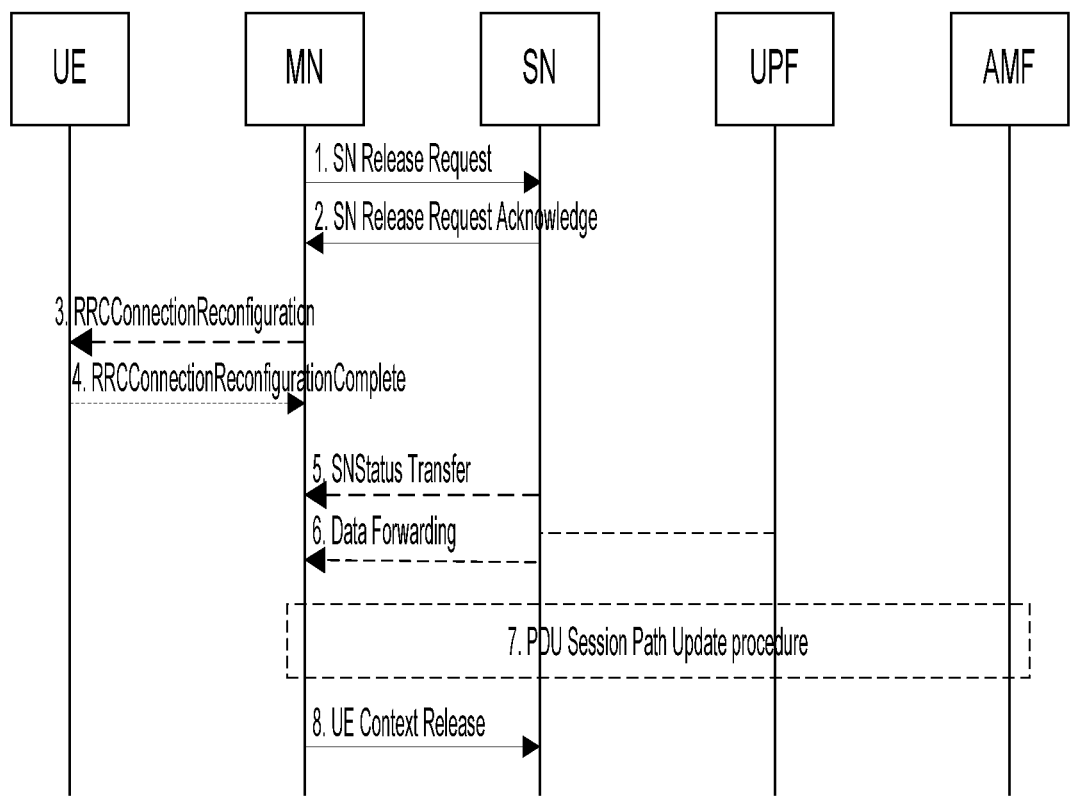
FIG. 8 is a combined block diagram and flowchart illustrating exemplifying signaling in a communications system for Secondary Node release.
Figure 9:
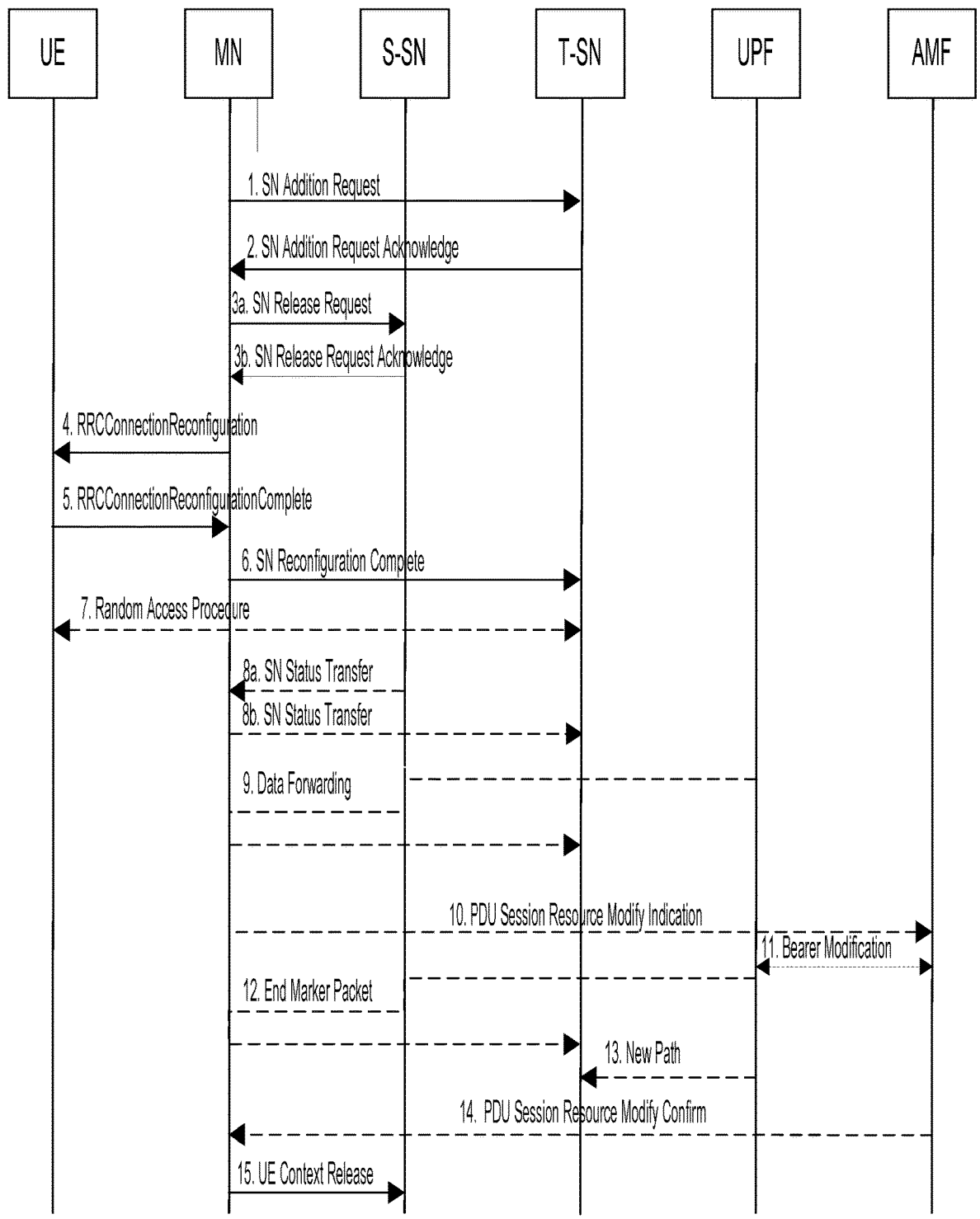
FIG. 9 is a combined block diagram and flowchart illustrating exemplifying signaling in a communications system for Master Node initiated Secondary Node change.
Figure 10:
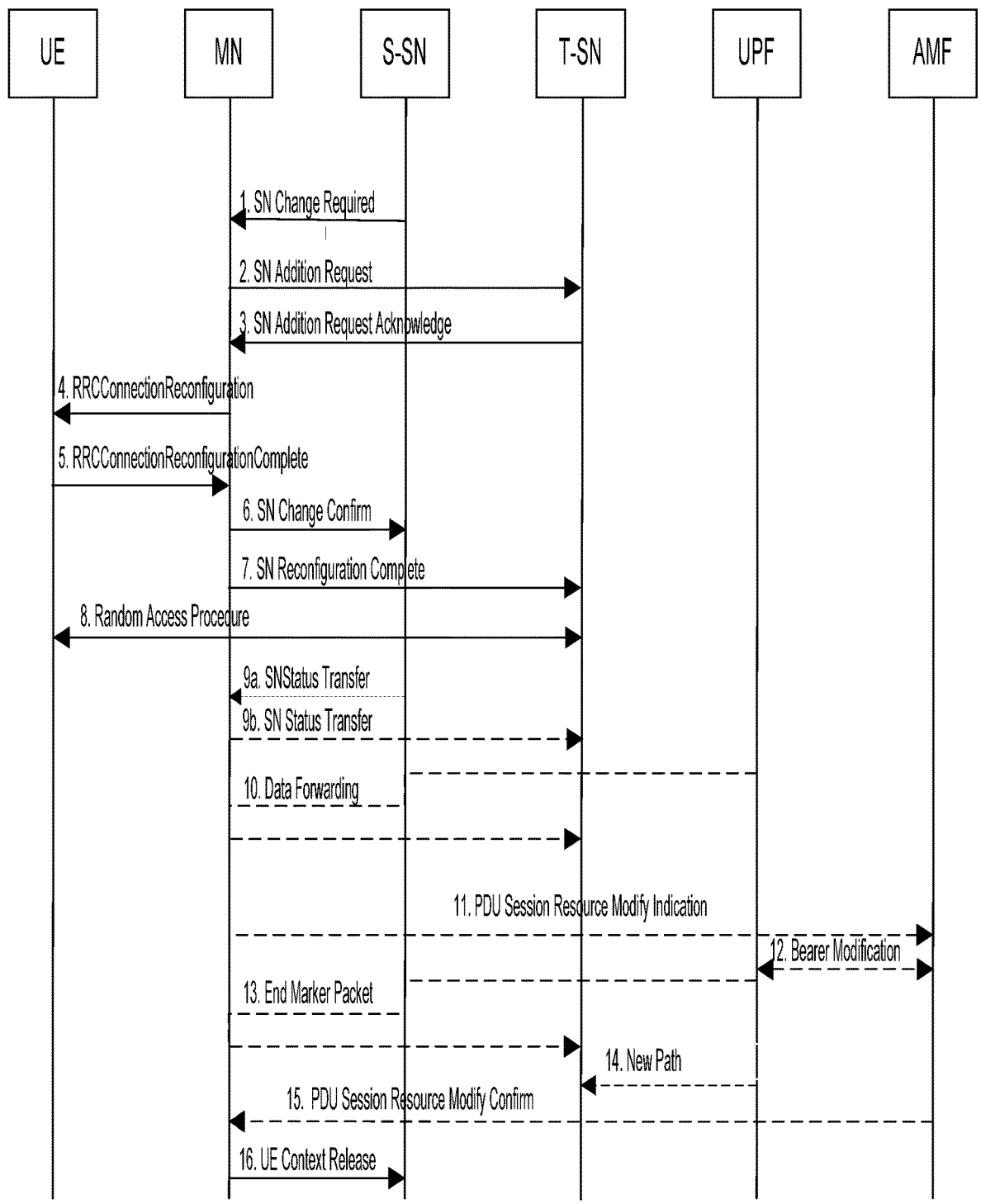
FIG. 10 is a combined block diagram and flowchart illustrating exemplifying signaling in a communications system for Secondary Node initiated Secondary Node change.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 30) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 30 may be identical to the host computer 3230, one of the base stations 3212a, 3212b, 3212c and one of the UEs 3291, 3292 of FIG. 29, respectively. This is to say, the inner workings of these entities may be as shown in FIG. 30 and independently, the surrounding network topology may be that of FIG. 29.

Figure 30:
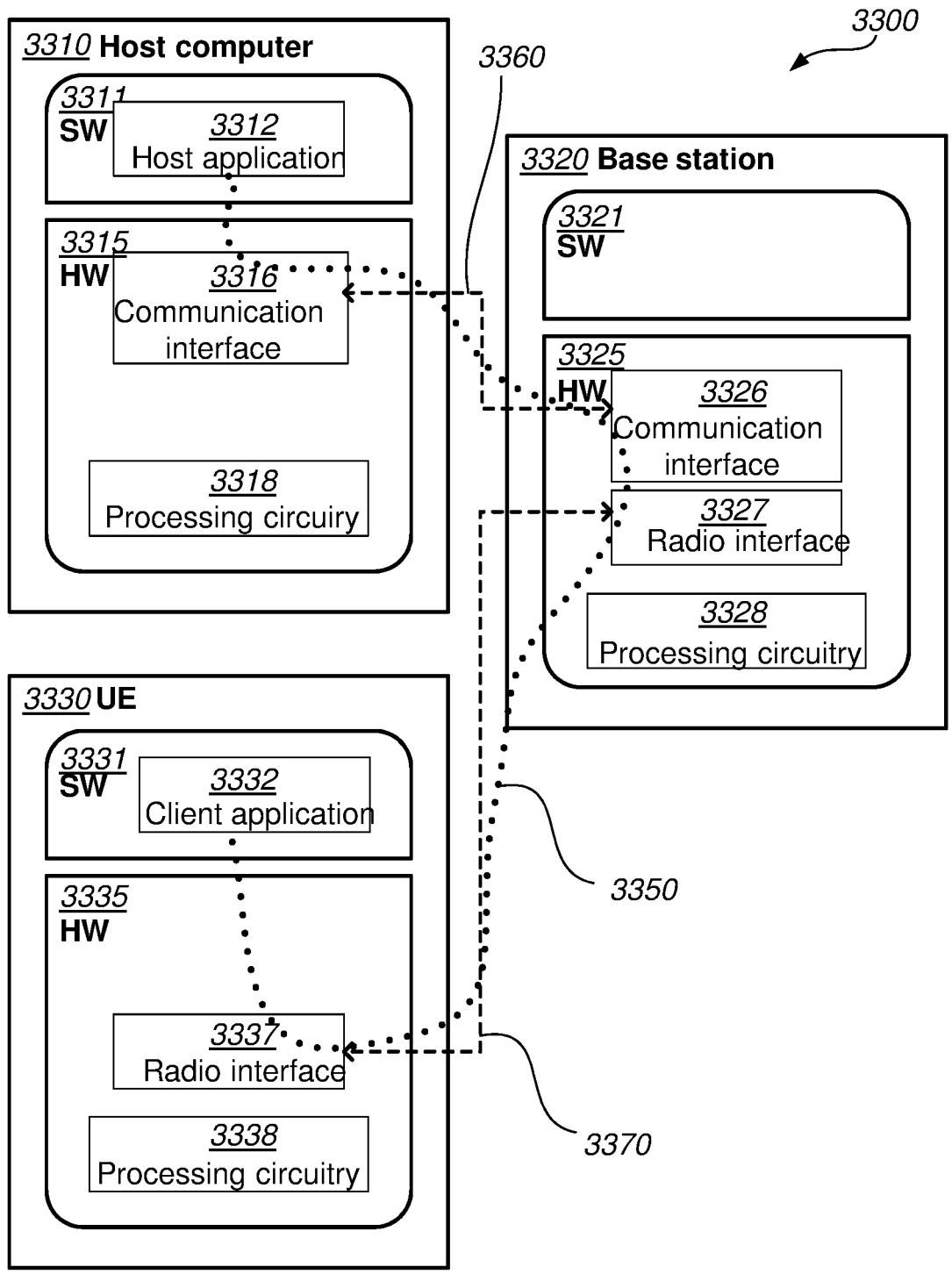
FIG. 30 is a generalized block diagram of a host computer communicating via a base station with a user equipment over a partially wireless connection.

In FIG. 30, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve one or more out of the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 31 is a flowchart illustrating a method implemented in a communication system, in accordance with one embodiment. The communication system includes a host computer, a base station such as a AP STA, and a UE such as a Non-AP STA which may be those described with reference to FIG. 29 and FIG. 30. For simplicity of the present disclosure, only drawing references to FIG. 31 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 32 is a flowchart illustrating a method implemented in a communication system, in accordance with one embodiment. The communication system includes a host computer, a base station such as a AP STA, and a UE such as a Non-AP STA which may be those described with reference to FIG. 29 and FIG. 30. For simplicity of the present disclosure, only drawing references to FIG. 32 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 33:
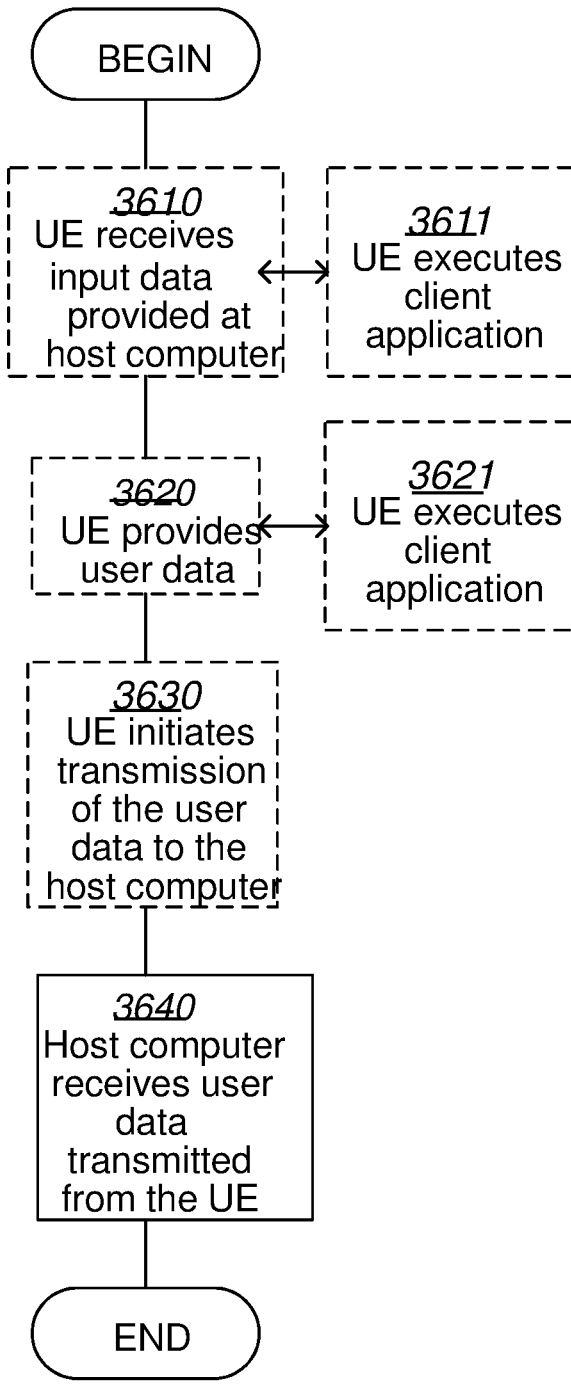

FIG. 33 is a flowchart illustrating a method implemented in a communication system, in accordance with one embodiment. The communication system includes a host computer, a base station such as a AP STA, and a UE such as a Non-AP STA which may be those described with reference to FIG. 29 and FIG. 30. For simplicity of the present disclosure, only drawing references to FIG. 33 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 34:
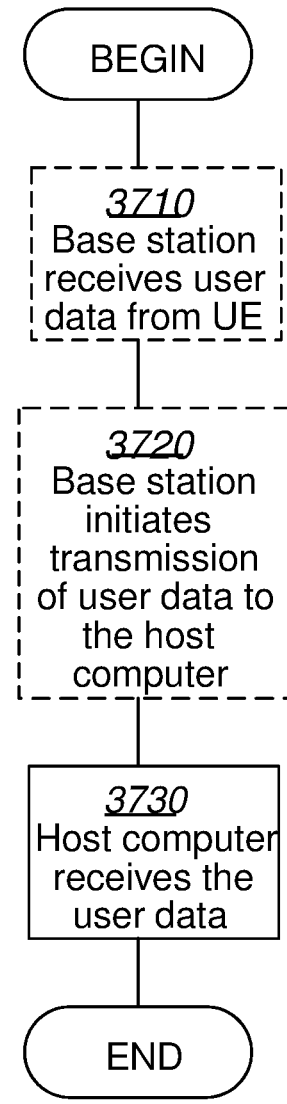

FIG. 34 is a flowchart illustrating a method implemented in a communication system, in accordance with one embodiment. The communication system includes a host computer, a base station such as a AP STA, and a UE such as a Non-AP STA which may be those described with reference to FIG. 29 and FIG. 30. For simplicity of the present disclosure, only drawing references to FIG. 34 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

| Abbreviation | Explanation |
|---|---|
| DC | Dual Connectivity |
| EN-DC | E-UTRA NR Dual Connectivity |
| LTE | Long Term Evolution |
| MN | Master Node |
| MR-DC | Multi-Radio Dual Connectivity |
| NR | New Radio |
| RRC | Radio Resource Control |
| SN | Secondary Node |
| UE | User Equipment |

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed in a Master Node (MN) for handling of a Secondary Cell Group (SCG) for a User Equipment (UE) operable in a dual connectivity mode with the MN and a Secondary Node (SN) operating in a wireless communication network, a Master Cell Group (MCG) associated with the MN and the SCG associated with the SN, and the method comprising:
   transmitting, to the SN, an SN addition request to initiate dual connectivity, the initiation of dual connectivity occurring prior to a connection being established with the SN;
   receiving, from the SN, the SCG;
   deciding to perform a first operation relating to a suspension or a resumption of the SCG independently from a second operation relating to a suspension or a resumption of the MCG;
   transmitting, to the UE, an indication indicating the first operation relating to the suspension or the resumption of the SCG and indicating the second operation relating to the suspension or the resumption of the MCG;
   transmitting, to the SN, an indication indicating the first operation relating to the suspension or the resumption of the SCG; and
   the indication transmitted to the UE indicating, to the UE, to, during the initiation of the dual connectivity, set up the SCG and to keep the SCG suspended.

2. The method of claim 1, wherein the deciding to perform the first operation relating to the suspension or the resumption of the SCG independently from the second operation relating to the suspension or the resumption of the MCG comprises deciding to resume a suspended SCG, wherein the indication transmitted to the UE indicates, to the UE, to resume the suspended SCG and wherein the indication transmitted to the SN indicates, to the SN, to resume the suspended SCG.

3. A method performed in a User Equipment (UE) for handling of a Secondary Cell Group (SCG), the UE operable in a dual connectivity mode with a Master Node (MN) and a Secondary Node (SN) operating in a wireless communication network, a Master Cell Group (MCG) being associated with the MN and the SCG associated with the SN, and the method comprising:
   receiving, from the MN, an indication indicating an operation relating to a suspension or a resumption of the SCG and indicating a second operation relating to a suspension or a resumption of the MCG, which first operation is decided to be performed independently from the second operation relating to the suspension or the resumption of the MCG;
   handling the SCG and the MCG in accordance with the received indication; and
   the indication transmitted to the UE indicating, to the UE, to, during initiation of dual connectivity, set up the SCG and keep the SCG suspended, and the initiation of dual connectivity occurring prior to a connection being established with the SN.

4. The method of claim 3, wherein, when the UE is in an RRC_CONNECTED state with the MCG active and the SCG suspended, the received indication indicates, to the UE, to resume the suspended SCG.

5. A Master Node (MN) for handling of a Secondary Cell Group (SCG) for a User Equipment (UE) configured to operate in a dual connectivity mode with the MN and a Secondary Node (SN) configured to operate in a wireless communication network, a Master Cell Group (MCG) associated with the MN and the SCG associated with the SN, and the MN comprising:

processing circuitry and a memory, the memory comprising instructions executable by the processing circuitry whereby the MN is configured to:
  transmit, to the SN, an SN addition request to initiate dual connectivity, the initiation of dual connectivity occurring prior to a connection being established with the SN;
  receive, from the SN, the SCG;
  decide to perform a first operation relating to a suspension or a resumption of the SCG independently from a second operation relating to a suspension or a resumption of the MCG;
  transmit, to the UE, an indication indicating the first operation relating to the suspension or the resumption of the SCG and indicating the second operation relating to the suspension or the resumption of the MCG;
  transmit, to the SN, an indication indicating the first operation relating to the suspension or the resumption of the SCG; and
  the indication transmitted to the UE indicating, to the UE, to, during the initiation of the dual connectivity, set up the SCG and to keep the SCG suspended.

6. The MN of claim 5, the memory comprising instructions executable by the processing circuitry whereby the MN is configured to:
  receive, from the SN, an indication to resume a suspended SCG of the UE that is in an RRC_CONNECTED state with the MCG active and the SCG suspended; and
  decide to perform the first operation relating to the suspension or the resumption of the SCG independently from the second operation relating to the suspension or the resumption of the MCG, by deciding to resume the suspended SCG and to keep the MCG active;
  wherein the indication transmitted to the UE indicates, to the UE, to resume the suspended SCG and to keep the MCG active.

7. A User Equipment (UE) for handling of a Secondary Cell Group (SCG), the UE configured to operate in a dual connectivity mode with a Master Node (MN) and a Secondary Node (SN) configured to operate in a wireless communication network, a Master Cell Group (MCG) associated with the MN and the SCG associated with the SN, and the UE comprising:
  processing circuitry and a memory, the memory comprising instructions executable by the processing circuitry whereby the UE is configured to:
    receive, from the MN, an indication indicating a first operation relating to a suspension or a resumption of the SCG and indicating a second operation relating to a suspension or a resumption of the MCG, which first operation is decided to be performed independently from the second operation relating to the suspension or the resumption of the MCG;
    handle the SCG and the MCG in accordance with the received indication; and
    the indication received by the UE indicating, to the UE, to, during initiation of dual connectivity, set up the SCG and to keep the SCG suspended, and the initiation of dual connectivity occurring prior to a connection being established with the SN.

* * * * *